(12) United States Patent
Kitts et al.

(10) Patent No.: US 12,062,070 B2
(45) Date of Patent: *Aug. 13, 2024

(54) AD SERVING WITH MULTIPLE GOALS USING CONSTRAINT ERROR MINIMIZATION

(71) Applicant: Adap.tv, Inc., San Mateo, CA (US)

(72) Inventors: Brendan Kitts, Seattle, WA (US); Garrett James Badeau, Redwood City, CA (US); Michael Krishnan, San Mateo, CA (US); Yongbo Zeng, Covina, CA (US); Ishadulta Yadav, San Mateo, CA (US); Ruofeng Chen, San Mateo, CA (US); Andrew George Potter, Mountain View, CA (US); Liang Wei, Foster City, CA (US); Ethan James Thornburg, Danville, CA (US); Sergey Tolkachov, Belmont, CA (US)

(73) Assignee: ADAP.TV, INC., San Mateo, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 17/087,062

(22) Filed: Nov. 2, 2020

(65) Prior Publication Data
US 2021/0073867 A1  Mar. 11, 2021

Related U.S. Application Data

(63) Continuation of application No. 15/784,001, filed on Oct. 13, 2017, now Pat. No. 10,825,061.
(Continued)

(51) Int. Cl.
G06Q 30/00 (2023.01)
G06Q 30/0272 (2023.01)
G06Q 30/0273 (2023.01)

(52) U.S. Cl.
CPC ..... *G06Q 30/0272* (2013.01); *G06Q 30/0275* (2013.01)

(58) Field of Classification Search
CPC .............. G06Q 30/0272; G06Q 30/0275
See application file for complete search history.

(56) References Cited

U.S. PATENT DOCUMENTS

| 10,460,348 | B1 * | 10/2019 | Peddinti | G06Q 30/0277 |
| 2009/0037210 | A1 * | 2/2009 | Shimoni | G06Q 10/101 |
| | | | | 705/300 |

(Continued)

OTHER PUBLICATIONS

Zhang, W., Rong, Y., Wang, J., Zhu, T., & Wang, X. (2016). Feedback Control of Real-Time Display Advertising, arXiv, 2016 (Year: 2016).*

*Primary Examiner* — Matthew L Hamilton
(74) *Attorney, Agent, or Firm* — Cooper Legal Group LLC

(57) ABSTRACT

The present disclosure describes a system that attempts to reconcile diverse goals and re-cast the goals into something that is quantifiable and optimizable. One way to reconcile diverse goals is by converting these "constraints"—with the huge problems of feasibility—into errors that can be minimized. This disclosure also presents solutions for rate constraints which previously have not been dealt with. The resulting system enables advertisers to dynamically adjust their campaign based on the needs of the moment. Such a system can have advantages in terms of controllability, smoothness, as well as avoiding hard stop conditions that plague the constraint-based approach. In order to achieve this result, solutions are presented for problems of pacing, viewability prediction, and most particularly, error minimization.

20 Claims, 31 Drawing Sheets

Related U.S. Application Data

(60) Provisional application No. 62/408,678, filed on Oct. 14, 2016.

(56) References Cited

U.S. PATENT DOCUMENTS

| | | | |
|---|---|---|---|
| 2018/0276718 A1* | 9/2018 | Thomas | G06Q 30/0276 |
| 2022/0326665 A1* | 10/2022 | Matsumoto | G05B 13/0265 |

* cited by examiner

Marketplace Bid Optimization

Bid Optimization ● Automatic ○ Manual ○ Off

Target eCPM * $ 12 USD | Ad Spend ▼ |
Ad Spend
Gross Revenue
Media Spend

Available Objectives

Audience Exposure
In Target Impressions | × Remove |

Brand Awareness
Completion Rate | × Remove |

Consideration
CTR | + Add |

My Selections

✥ Primary Objective, Audience Exposure ✖

In Target Impressions | Female ▼ | 35 ▼ | + | Nielsen OCR ▼ |

✥ Secondary Objective, Brand Awareness ✖

Completion Rate | ≥ | 80 | % |

FIG. 1

Marketplace Bid Optimization

Bid Optimization  ● Automatic  ○ Manual  ○ Off

Target eCPM *  $ | 12.01 | USD | Gross Spend ◆

Priority  ○ Delivery First  ● Performance First  ○ Equal Priority

Objectives

● Overall Viewable Rate  ≥ | 70 | %  Moat

● In Target Impressions  ≥ | 80 | %  Female ◆  All ◆  All ◆  Nielsen DAR ◆

○ Completion Rate

○ CTR

FIG. 27

AD SERVING WITH MULTIPLE GOALS USING CONSTRAINT ERROR MINIMIZATION

CROSS-REFERENCE TO RELATED APPLICATIONS

This application claims priority to and is a continuation of U.S. application Ser. No. 15/784,001, filed on Oct. 13, 2017, and entitled "AD SERVING WITH MULTIPLE GOALS USING CONSTRAINT ERROR MINIMIZATION", which is a nonprovisional of provisional U.S. application Ser. No. 62/408,678, filed on Oct. 16, 2016, and entitled "AD SERVING WITH MULTIPLE GOALS USING CONSTRAINT ERROR MINIMIZATION." U.S. application Ser. No. 15/784,001 is incorporated herein by reference in its entirety, and provisional U.S. application Ser. No. 62/408,678 is incorporated herein by reference in its entirety.

BACKGROUND

There has been a significant amount of research on computational advertising over the past twenty years. Since the first early display ads and search systems, Overture and Google, the computational advertising problem has been generally defined fairly similarly. The typical definition is usually something like "deliver as many acquisitions as possible, within my budget and at or better a cost per acquisition constraint." Acquisitions here can mean sales, revenue, or other events that the advertiser is trying to promote.

Despite this long-standing body of work and academic work built up around it, however, computational advertisers in practice, routinely express the desire to achieve multiple metrics. This often doesn't fit neatly into the classical computational model for optimization objectives and constraints. For example, in addition to delivering impressions that are at or better than a given cost per acquisition, the IAB in 2014 has introduced an industry standard, that impressions should also be at least 70% viewable on average, in order to be measurable (which is a term of art which generally is interpreted as meaning "billable"). This is a new metric to achieve in addition to the revenue objective described above. Advertisers may also request that at least 50% of impressions for which a charge is incurred be in the correct age-gender category. Levels of bot activity usually need to remain below a particular threshold such as 5%. Usually this kind of assumption is not formally expressed, but if high levels of bot activity are detected, then this is generally deemed unacceptable and the advertiser may shift their budget elsewhere. Advertisers may also require that the ad be viewed to completion at least 70% of the time.

These multiple requirements are usually handled in practice by adding them as constraints or pre-filters to the campaign. In many cases, however, the desired combination of key performance indicators may be infeasible or so severely restrict delivery as to mean that an advertiser has little reason to engage with the overhead of running a campaign.

SUMMARY

The present disclosure describes a system that attempts to reconcile these diverse goals and re-cast the goals into something that is quantifiable and optimizable. One way to reconcile diverse goals is by converting these "constraints"—with the huge problems of feasibility—into errors that can be minimized. This disclosure also presents solutions for rate constraints which previously have not been dealt with.

The resulting system enables advertisers to dynamically adjust their campaign based on the needs of the moment. Such a system can have advantages in terms of controllability, smoothness, as well as avoiding hard stop conditions that plague the constraint-based approach.

In order to achieve this result, solutions are presented for problems of pacing, viewability prediction, and most particularly, error minimization.

BRIEF DESCRIPTION OF THE DRAWINGS

The present invention is described in detail below with reference to the attached drawing figures, wherein:

FIG. 1 is a user interface display showing one way that multiple KPIs can be selected, in accordance with embodiments of the present invention;

FIG. 27 illustrates another example of a graphical user interface that may be utilized in implementations, in accordance with embodiments of the present invention.

DETAILED DESCRIPTION

Figure 2:
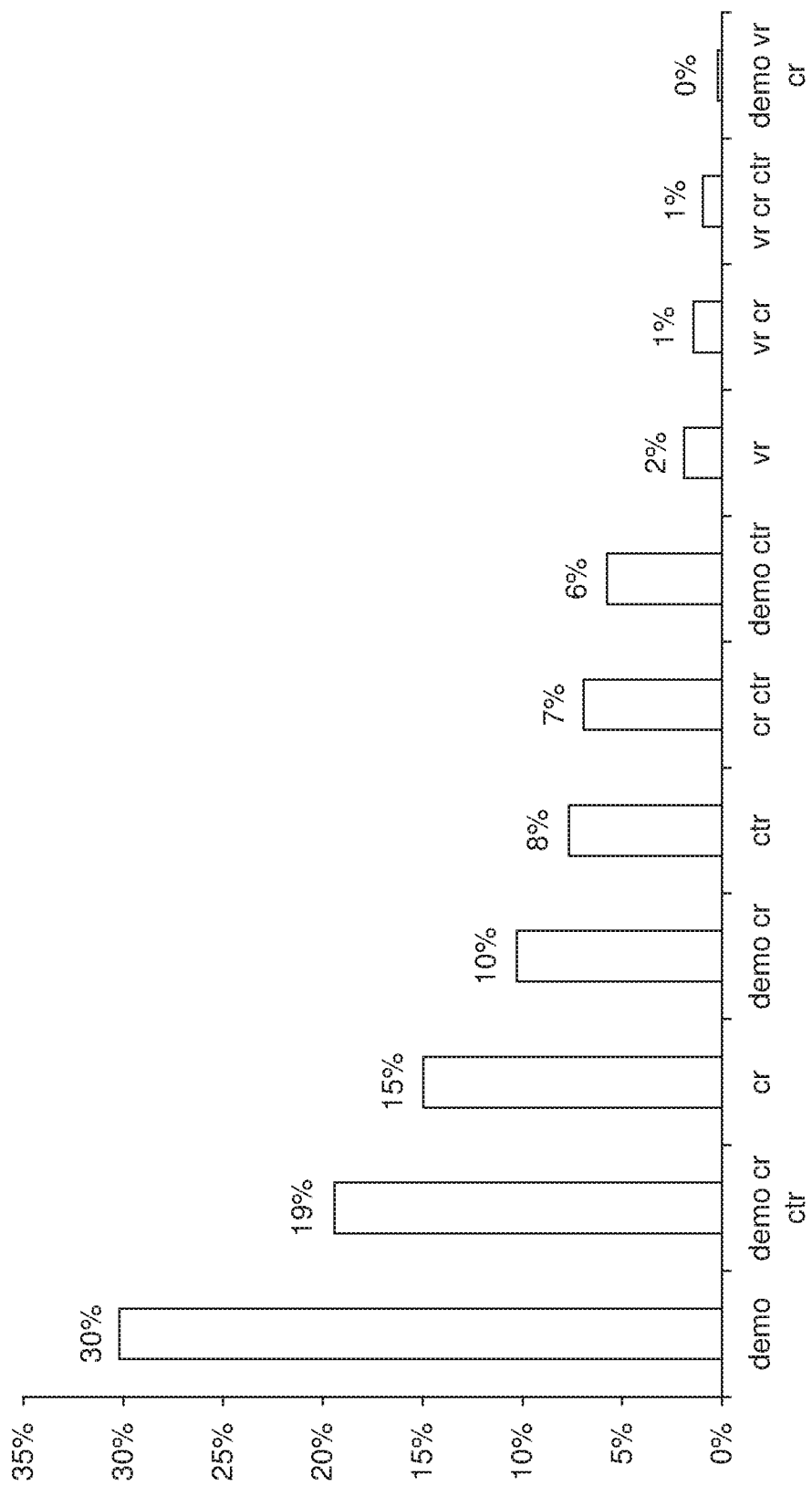
FIG. 2 provides a chart showing the probability of KPI combinations being selected.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A. The Ad Serving Problem

Consider an advertiser that has a budget B and wishes to spend it on an ad auction across T discrete periods of time. Let's also say the advertisers objective is to create an event of value or acquisition. The acquisition event could be a subscription, purchase, form entry, or anything else of interest that the advertiser might use for tracking value.

The probability of an acquisition event occurring depends upon the particulars of the impression and is equal to $v_{i,t}$. The ad-server calculates a bid price $b_{i,t}$ for each incoming impression i. Given that bid price, the advertiser will "win" the impression at a rate given by $W(b_{i,t})$.

The task for the advertiser is to set bid prices for every impression i and time period t such that marginal utility to the advertiser is maximized. The classic definition for this problem is found in much prior literature and can be formulated as follows:

$$b_{i,t} : \max \sum_{t=1}^{T} \sum_{i=1}^{I} W(b_{i,t}) \cdot I_{i,t} \cdot v_{i,t} \tag{1}$$

where the advertiser does not exceed their budget:

$$\sum_{t=1}^{T} \sum_{i=1}^{I} W(b_{i,t}) \cdot I_{i,t} \cdot b_{i,t} \leq B \tag{2}$$

There may also be requirements that the price paid per event (Cost Per Click, Cost Per Acquisition, Cost Per Viewable) not exceed an advertiser-defined CPA price. We define that as follows:

$$\frac{\sum_{t=1}^{T} \sum_{i=1}^{I} (W(b_{i,t}) \cdot I_{i,t} \cdot b_{i,t})}{\sum_{t=1}^{T} \sum_{i=1}^{I} (W(b_{i,t}) \cdot I_{i,t} \cdot v_{i,t})} \leq CPA \tag{3}$$

In practice, we also typically add an additional constraint for "smooth delivery". It is generally expected by advertisers that spend will be spread evenly throughout the period. In practice, smooth delivery is an important feature expected by advertisers, and is supported by most ad servers. The smooth delivery constraint requires that the system spend the same amount in every period t. We therefore introduce:

$$\sum_{i=1}^{I} W(b_{i,t}) \cdot I_{i,t} \cdot b_{i,t} = \frac{B}{T} \tag{4}$$

In practice, advertisers routinely add additional requirements for their campaign. These tend to be handled in practice as filters or hard constraints. The following are examples of additional requirements or metrics often included in campaigns:

Viewability: Viewability refers to whether the ad was visible on-screen for a minimum amount of time. Viewability has become a huge issue in online advertising, and the IAB has mandated that impressions should now be at least 70% viewable—meaning the ad is on-screen for at least 2 contiguous seconds—in order for the ads to be billable. Therefore, advertisers routinely request their impressions to have at least 70% that are viewable—and sometimes advertisers seek higher viewability rates. Viewability can either be measured by the ad-servers own ad script, or it can be measured by "trusted" third party measurement companies such as Moat, Double Verify or Integral Ad Sciences. When third parties are used, a call to the third party is embedded in the ad-servers ad-script. In One Video, viewability is the second-most-selected KPI.

Completion Rate: Advertisers often require Completion Rate—the percentage of video ads that are viewed for the full 30 seconds—to be greater than a given threshold. For advertisers using One Video platform, completion rate is the most popular KPI.

In-Target Demographics: Many advertisers target their ads to demographics in a similar way to advertisers on television. In-target refers to the percentage of traffic that matches the demographics defined by the advertiser, for example, Male18to24. Typically, the demographics are measured using Nielsen or Comscore panels, and are often in the form of age-gender brackets, e.g. Males18to24 or Adults25to54.

Non-Bot(Human)-Rate: Non-bot-rate refers to the percentage of traffic that is not bot. Bots are often defined by third parties such as White Ops, Telemetry, or others. If third parties are used, then often there is a call to a third party engine who will assess the traffic. While it is obvious that platforms shouldn't bill for definite bot traffic, the reality is that most assessments of bot traffic are probabilistic in nature. Therefore, as a matter of practicality, some rate of bot traffic is expected to occur. In practice, advertisers require the bot rate to remain lower than a threshold in order to continue to transact on the platform.

Click-through Rate: Click-through rate generally refers to the percentage of traffic that generates clicks. Click events are captured by the ad server script, which calls back when the ad is clicked on.

In order to cover all of the KPIs above, we will refer to there being K additional constraint equations, where the value for each impression for KPI k is equal to $v_{i,t,k}$, and the required KPI for k is $V_k$.

$$\frac{\sum_{t=1}^{T}\sum_{i=1}^{I} W(b_{i,t}) \cdot I_{i,t} \cdot v_{i,t,k}}{\sum_{t=1}^{T}\sum_{i=1}^{I} W(b_{i,t}) \cdot I_{i,t}} \geq V_k \quad (6)$$

$v_{i,t,k}$ is the KPI value for impression i and KPI k. For example, if an advertiser wants In-Target 50%, Viewability 70%, and Non-Bot(Human)-Rate 95%, then there would be K=3 KPIs and three constraint equations (6-1, 6-2, 6-3).

In order to present the most general purpose definition of the advertiser problem, we can also introduce K Cost Per KPI constraints, such as Cost Per Viewable, Cost Per Target, Cost Per Click, and so on.

$$\frac{\sum_{t=1}^{T}\sum_{i=1}^{I} W(b_{i,t}) \cdot I_{i,t} \cdot b_{i,t}}{\sum_{t=1}^{T}\sum_{i=1}^{I} W(b_{i,t}) \cdot I_{i,t} \cdot v_{i,t,k}} \leq CPV_k \quad (5)$$

Some additional metrics that may also be requested or used in a campaign include the following:

Reach: the percentage of unique users who were served the ad.

Frequency: the mean exposures per user.

Advertisers may request that their campaign meet multiple of these criteria. FIG. 1 illustrates one way that multiple KPIs can be selected for a campaign. In FIG. 1, KPIs are listed at the left-hand-side, and lower right pane shows the KPIs that have been selected. FIG. 2 shows the probability of KPI combinations being selected by advertisers for one ad serving application.

The objective reflected in (1), above, along with constraints (2), (3), (4), (5), (6) constitute the ad serving problem. In the notation in some examples described below, the symbol * is used to indicate a prediction, and the non-asterisked version indicates an actual.

B. Reformulating the Problem

One challenge of having multiple objectives is that in many cases they can lead to no possible solution. For example, let's take the 70% viewability requirement. Across all websites, it is most common to use small video player sizes. The average viewability of these small players is only 19%. Thus, if all the inventory is small player inventory, then in the traditional constrained optimization approach, the advertising problem with a 70% constraint would be completely infeasible.

This problem is made even more challenging because advertisers have an incentive to declare constraints that are unrealistic—and let the ad server try to supply this traffic. This could be thought of as a kind of "Tragedy of The Commons" described by William Lloyd in 1833. The "Common" in this case is the pool of inventory available for advertisers. Advertisers may set viewability rates of 95% and in-target rates of 90%. If they achieve these very high targets, then the advertiser gets a great outcome. If they miss the targets, the advertiser simply tries again next month. There is no incentive to enter realistic KPIs. In the worst case, the ad-server is faced with advertisers all requesting the delivery of 95% rates (when the true advertiser requirements may vary such as 65% or 75%), and it can't appropriately deliver traffic that would be acceptable to each advertiser.

Figure 3:
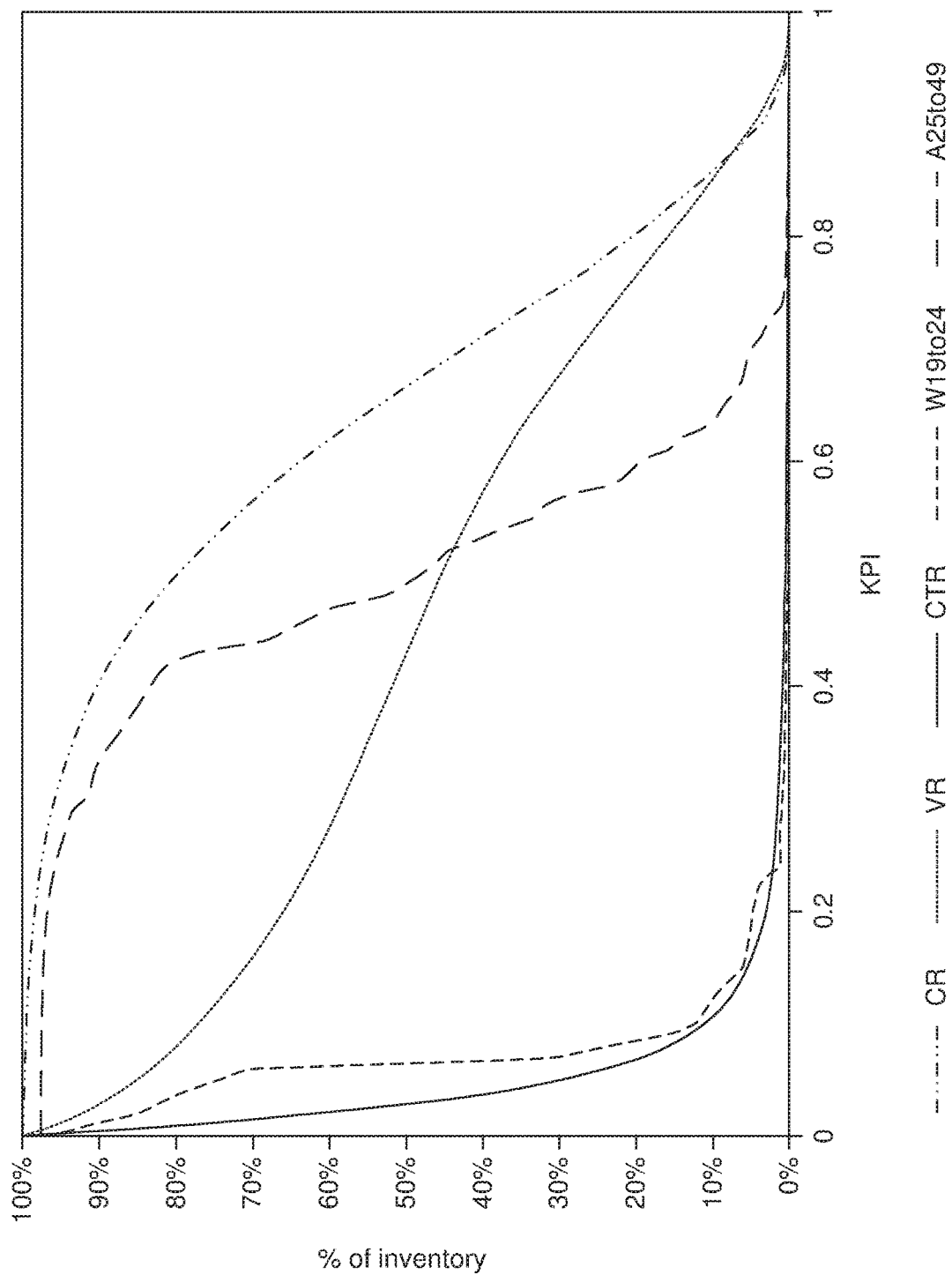
FIG. 3 provides a chart showing an example of inventory distributions for various KPI events.

This is ultimately bad for advertisers, since other advertisers will be doing the same thing, leading to a lack of inventory, and ad-servers which have to severely curtail the inventory they can deliver. Even if advertisers enter true KPI targets, the strict combination of those KPI targets may either be infeasible, or may result in almost no delivery. FIG. 3 provides an example of inventory distributions for various KPI events that advertisers may be interested in: Viewability Rate, Clickthrough Rate, Completion Rate, In-Target Women 18to24 and In-Target Adults25to49. All distributions show a rapid reduction in available inventory with higher KPI targets, and the combination of multiple KPIs can result in almost no inventory available.

Figure 4:
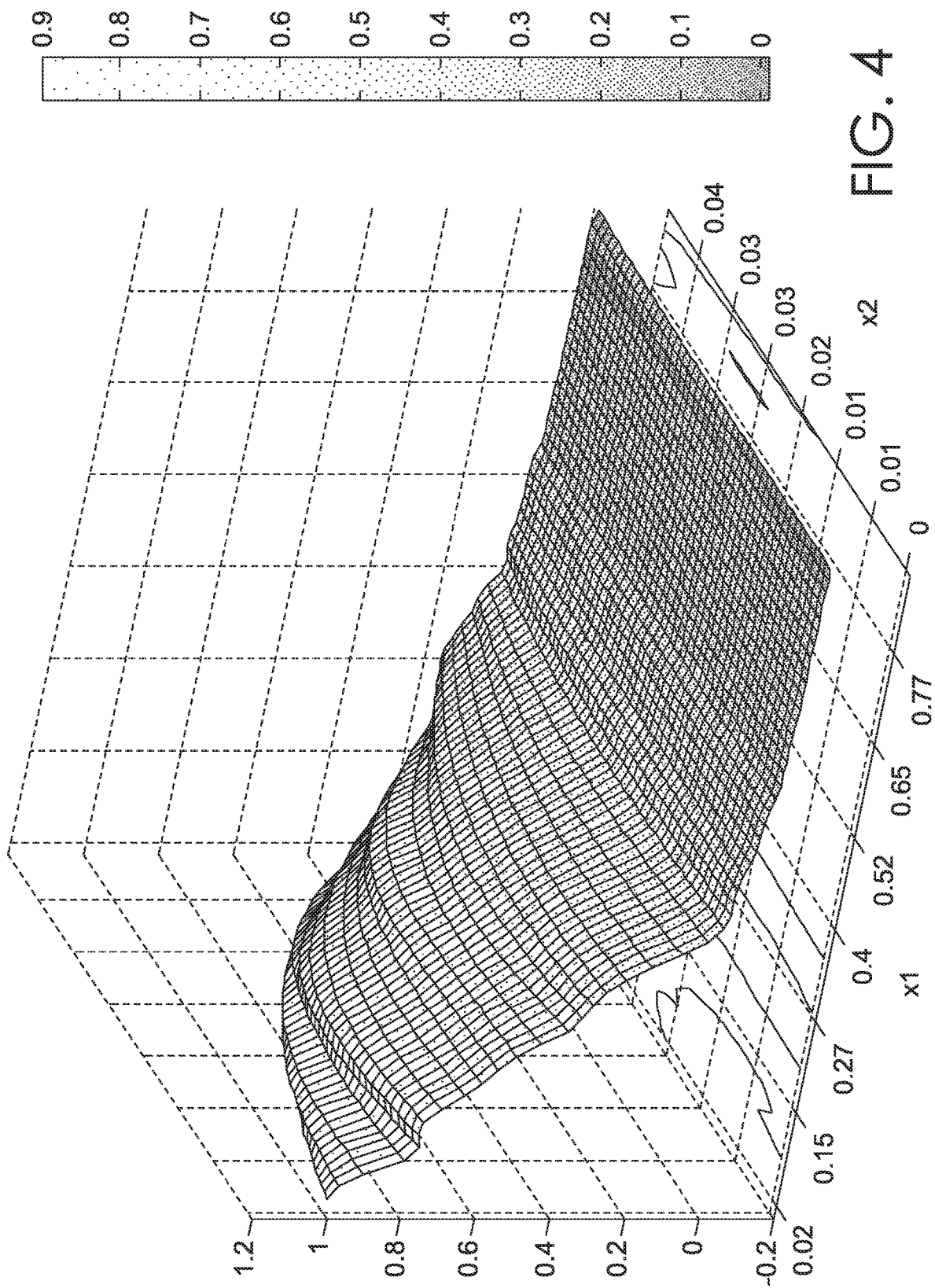
FIG. 4 provides a graph showing a combination of two KPIs and the amount of inventory available for different KPI combinations, from real ad-serving data.

FIG. 4 shows the combination of two KPIs: the percent of impressions available in a real time bidding auction given different clickthrough-rate (CTR) and viewability rate (VR) requirements, collected for an ad during a month. The height axis represents the volume of impressions available, normalized to 0 . . . 1. If an advertiser requests CTR=0.1, VR=0.8, there is almost no traffic available and so spend will be far below the advertisers desired spending. There is a tendency for inventory to "collapse" when constraints are imposed in multiple dimensions.

Figure 5:
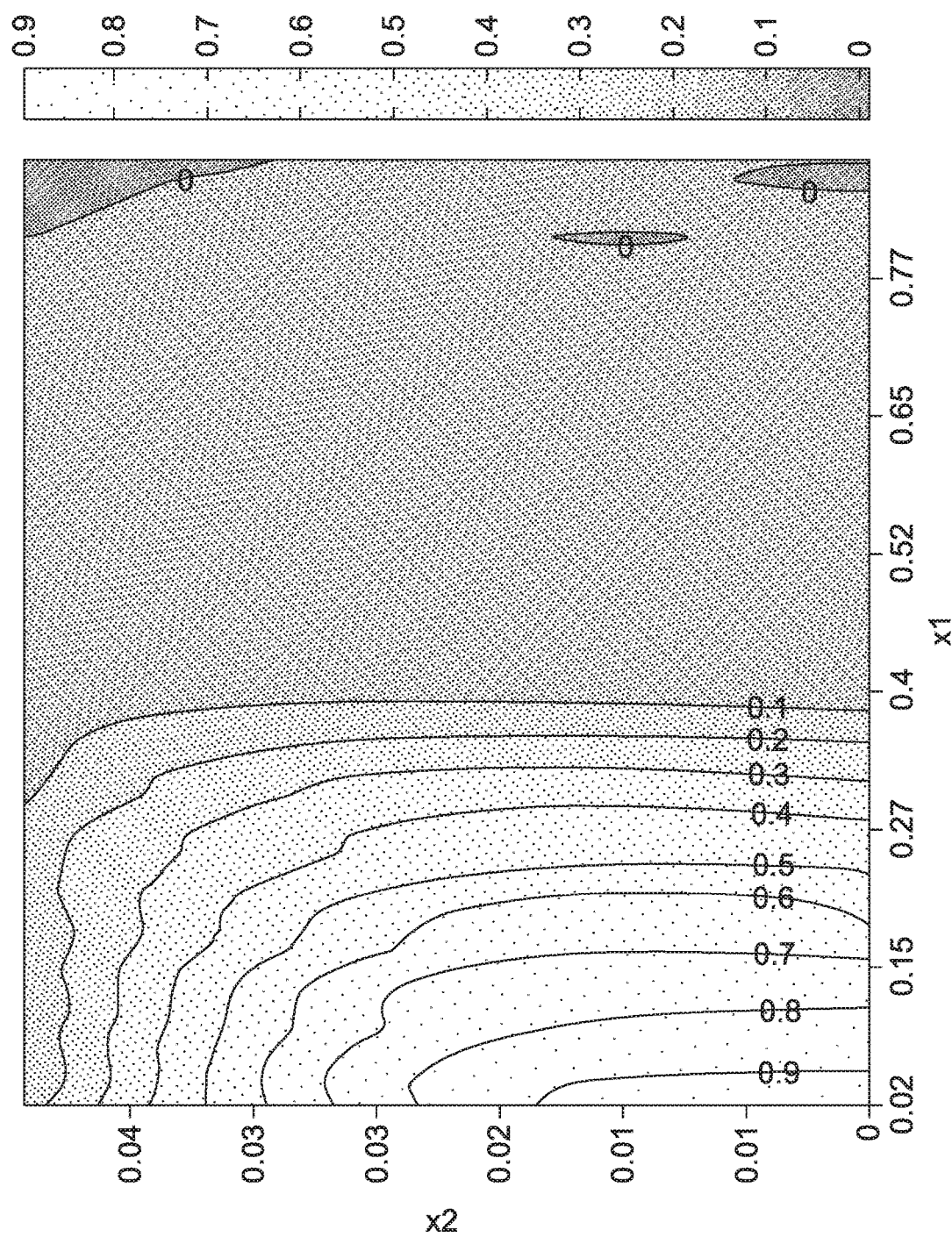
FIG. 5 provides a graph showing the combination of two KPIs and inventory available, from an overhead view.

FIG. 5 shows the same graph as FIG. 4, but from overhead, again showing minimal inventory available under KPIs that advertisers commonly favor.

It is useful to step back and try to understand why these multiple KPIs are being used by advertisers. Why would advertisers need to specify a "laundry list" of rate constraints anyway? If the advertiser is trying to obtain acquisitions, for example, why would they care what is the bot rate, the viewability rate, the completion rate, or any of the other KPIs?

There are several real-world considerations that are driving advertisers to need to specify these KPIs:

Firstly, standards are now being used by the industry that mandate that these are achieved for the traffic to be billable (e.g., the IAB). As discussed, there is now a 70% viewability requirement. In addition, it is common for the amount of bot traffic to be a low percentage.

Secondly, and perhaps more importantly, this may be a rational response from advertisers when faced with a difficult estimation problem. Advertisers ultimately want to purchase events, but estimating the probability of advertiser purchase on each impression may be difficult, custom, or even not supported on the advertising platforms that they're using. They may therefore need to use "high velocity" key performance indicators (KPIs) that are exposed by the ad-server as a "proxy" for the economically valuable event that they are trying to generate. As a result, multiple KPIs are almost like a language that allows the advertiser to describe the kind of traffic that they would want to purchase. Or equivalently, these KPIs are a like a proxy for traffic with high probability of purchase.

A key insight into this problem, therefore, is that these metrics might really behave more like quality metrics or "key performance health indicators" rather than constraints, in practice, when real advertisers use real adservers. These metrics provide guidance to the advertiser that their campaign is healthy, acquiring valuable traffic, generating a high rate of purchase, even though it may be difficult to determine the attribution of every impression. The advertiser would like to see their campaign achieving all of these key performance indicators. But if they are close, or high on one KPI and low on another, they are likely still to be happy. For example, if an advertiser's campaign achieves a viewability rate of 65% vs goal at 70%, and in-target rate 70% versus goal at 65%, would they cancel their contract?

If we avoid treating these like constraints, then we can create considerable progress towards delivering progress against all of the advertiser metrics, as well as giving the advertiser a lot more control and power to effect the outcome. We do this by pivoting the problem from a single objective optimization problem with multiple constraints, i.e. (1) with (3), (4), (5); to a multiple objective optimization problem, where the objective is to minimize an overall metric that we term constraint error.

C. Previous Work

Web-based advertising has only existed since approximately 1994. In that time, protocols for KPI event callbacks, conversion events, real-time bidding auctions, and so on, have all been developed. The following Table 1 highlights prior work into a short history as well as the different authors, companies and approaches taken. Different techniques are also discussed in greater detail below the table. Despite the prior work and ad-servers, the approaches presented in this disclosure are quite different to those used by others in the past. For instance, there is very little work on multiple KPI optimization.

1. Early Click Maximizers 1994-1998

The first internet banner ad has been claimed to have been shown by Wired in 1994 (Singer, 2010) and several patents on ad optimization can be found in 1999 and 2000 (Ferber, et. al., 2010). Much of this early literature was concerned with selecting ads that would maximize probability of clickthrough (Edelman, Ostrovsky, and M. Schwarz, 2007; Karlsson, 2013).

2. Single KPI Maximizers Subject to a Cost Per KPI Constraint 1998-2006

Karlsson describe display ad optimization systems in which an attempt was made to maximize a well-defined KPI within a given budget and Cost Per Acquisition constraint (Karlsson, 2013). This is what we consider to be the "classical" definition of the ad-server objective function and constraints, and can be seen as a precursor to the control system described in this paper, and others like it at use in commercial companies.

Kitts et. al. (2004 and 2005) described a system for maximizing acquisitions subject to Cost Per Acquisition and other constraints. This system was deployed for bidding on Google and Yahoo Paid Search auctions. The published work did not discuss control system aspects of the work for delivering within budget and campaign goals, although it used a control approach of adjusting targets similar to this paper. The approaches used a single KPI only.

Karlsson et. al. (2016) proposed a system for maximizing acquisitions subject to a hard constraint defined by a Cost Per Acquisition. They also described a well-defined PI (Proportional-Integral) controller to adjust goals.

The work above deals with solving a single objective with a single cost per X constraint (where "X" can refer to click, acquisition, impression, or other). This work did not address attempting to achieve "rate targets" (eg. viewability rate such as 70%; instead they were focused on "Cost Per X" constraints), and also did not deal with multiple KPIs.

TABLE 1

Previous work

| Authors | Year | Company at which system was deployed | Control Strategy | Optimization Strategy |
| --- | --- | --- | --- | --- |
| Ferber et. al. | 2000 | Advertising.com | | Maximize click probability |
| David Paternack (in Kitts et. al. 2004) | 2003 | DidIt (KeywordMax, SureHits also) | | CostMin |
| Brooks, et. al. | 2006 | GoToast (acquired by Aquantive & Microsoft) | | CostMin |
| | | Efficient Frontier (acquired by Adobe) | | Global Revenue maximization (CostMin == sub-solution) |
| Kitts et. al. | 2004 | iProspect (acquired by Aegis) | | Global Revenue maximization (CostMin == sub solution) |
| Chen and Berkhin | 2011 | Microsoft | | 01 integer program wrt participation |
| Lee et. al. | 2013 | Turn | Minimize bid variance | 0-1 integer program wrt participation |
| Karlsson et. al. | 2013 | AOL | PI controller with fully characterized plant equations | Revenue maximization wrt bid |
| Xu et. al. | 2015 | Yahoo | | |
| Quantcast | 2016 | Quantcast | Cascade controller | |
| Zhang et. al. | 2016 | PinYou | PID controller on bid | |
| Geyik et. al. | 2016 | Turn | | Prioritized KPI |
| Kitts et. al. | 2016 | Verizon | PI controller | Multiple KPI |

3. Smooth Budget Delivery (2008-2012)

Several authors describe systems that are mostly concerned with the smooth budget delivery problem in online advertising. They typically accomplish this by solving for a 0-1 participation in auctions, and typically solve using an integer programming approach. Chen and Berkhin (2011) describe a 0-1 integer program with a control process to manage smooth delivery. Lee et. al. (2013) describes a system used at Turn for smooth budget delivery. They cast the problem as a 0-1 integer program where the decision was to participate or not participate in each period. They then tried to minimize the difference between subsequent time period budget spends. Xu et. al. (2015) describes a system that manages smooth budget delivery by minimizing the variance between subsequent spends, by adjusting 0-1 participation in auctions. The approach also enabled a performance objective for a single KPI, by reducing participation in the case of budget delivery being met, but performance not being met. Quantcast (2015) describes a "Cascade Controller" in which control is exercised over multiple time-periods—month, week, day, hour, and real-time. Their controller attempts to fulfill the required impressions, and then the higher-level controller adjusts targets. Zhang et. al. (2016) proposed a PID (Proportional-Integral-Differential) Controller to minimize spend variance over time; with the actuator being a bid price rather than 0-1 participation. They did this by creating an actuator that retarded movement of bid price. They used 10 days of PinYou DSP data comprising 64 million bid requests. Their controller was also able to maximize a single KPI such as clicks. This work did not tackle the problem of multiple KPIs.

0-1 participation rate approaches lend themselves to a convenient integer programming solution. However, the problem is that if the ads are being cleared through an auction (which has become the norm), and the auction is convex, then a 0-1 participation will yield less revenue than submitting real-valued bids. In addition, the preceding approaches haven't tackled the problem of multiple KPIs, instead developing solutions for budget delivery with one or zero performance metrics.

4. Value Maximizers by Assigning Value to Different KPIs and Maximizing the Sum of Value There is very little work on multi-objective optimization in online advertising. Karlsson et. al. (2016) propose a way of trying to fit a multi-KPI problem into the standard advertising optimization function (1) by having the advertiser define an expected value for each of the KPI events, and then maximizing the sum of value subject to a cost per value constraint. For example, In-Target, VR, CR may be assigned dollar values of $5, $3, $2. Each iteration, the probability of those events are estimated, and then a summed expected value is calculated. The system then tries to maximize summed value using just the standard optimization objective (1), (2), (3).

This approach is a poor fit for for Multi-KPI problems for several reasons: (a) The KPI events are often not additive, (b) estimation of KPI value is extremely difficult—indeed we believe that the reason why multi-dimensional KPIs are being provided by advertisers is for the very reason that they're unable to estimate the value from the KPI events, but are able to provide KPI settings that they expect the campaign to achieve as a guide or proxy for good converting traffic, and (c) the approach ignores the advertiser's KPI targets, which means that failing KPIs may actually be ignored in favor of KPIs that are already at their desired goals.

The issues with an additive approach to KPIs can be best illustrated in an example. Suppose that we have an ad with the following KPI targets that have been entered by the advertiser: (50% in-target, 70% viewability rate (VR), 60% completion rate (CR)). Assume that the ad is currently achieving (40% in-target, 70% viewability rate (VR), 60% completion rate (CR)). Under a value maximization strategy, if it is possible to get higher VR traffic because the inventory has a very low cost per view for example, then the maximizer could put its money into VR and produce the following solution: (40% in-target, 100% viewability rate (VR), 60% completion rate (CR)). This solution may well produce more summed value. However, it doesn't respect the KPI percentage targets that the advertiser specified. In this example, there may be little value in getting 100% viewable impressions on traffic that is outside of the demographic target.

In contrast, under the error minimization scheme described in this paper, there is error on in-target, and zero error on completion rate and viewability rate. It will therefore set the bid to raise the in-target KPI. The advertiser's KPI targets are treated as a multi-dimensional target which the system attempts to "shape match".

The core of the problem with the additive KPI approach is that by assuming that KPIs can be summed, it is no longer a multi-dimensional problem—all of those individual KPI dimensions actually "collapse" into a single concept of summed partial value. This cannot guarantee advertiser target KPI percentages are met or that the system would even get close to matching the advertisers multiple KPI requirements.

5. Prioritized KPI Satisfaction

Geyik et. al. describes a system for multi-objective optimization in Video advertising. Generally, advertisers may want to deliver against a mixture of goals including (a) Reach, (b) Completion Rate, (c) Viewability rate, (d) Cost per Click, (e) Cost Per Acquisition and so on. Geyik's work, however, uses "prioritized goals", where the advertiser specifies which key performance indicator they care about the most, and that is met first, and then if others can be met, they are met only after the first priority. By using a prioritized goal approach, this enables the optimization problem to be effectively translated into a series of single variable maximization—single constraint—optimization problems that are applied in succession, assuming that the KPIs in priority order are all exceeding their targets so far.

Under "prioritized goal satisfaction," however, advertisers may select a KPI priority order that is extremely difficult to achieve, and so they may be subjected to poor performance over all KPIs. For example, if the system is unable to achieve a viewability rate of 85%, and that is the top priority KPI, then all other KPI goals that the advertiser set become moot, and not only does the system fail to meet 85%, but it also fails to get close to any of the other KPIs. As a result, this can produce catastrophic performance in practice. Another example of this is if "delivery" is the top priority, followed by KPIs, and if the system then has difficulty achieving its delivery requirements, then the system can easily end up buying huge amounts of "junk traffic" because it is having difficulty achieving its first priority (delivery), with terrible consequences for KPIs. Intuitively this is a very poor solution and little consolation to the advertiser that the system is "trying to pace" when all the traffic it has bought has been "junk traffic".

D. Overview of Embodiments

Embodiments described herein allow an advertiser to specify objectives using multiple KPIs. This may (a) avoid some of the discontinuities present when working with hard constraints, (b) can lead to a system that is more intuitively controllable since there is more smoothness, (c) degrades gracefully when faced with KPI vectors that are difficult to achieve, and (d) if the advertiser is using the system to specify a "proxy target", then the additional KPIs may lead to more accurate ad delivery than the currently widespread approach of focusing on a single optimization KPI. We first describe the advertising optimization problem as a control problem. In some embodiments, the following components can be used:

I. The Control system sets the KPI and budget parameters that will be used to calculate bid price.
II. The Plant is the auction.
III. Sensors detect spend (which is the clearing price after winning the auction) and KPI events (which arrive asynchronously and ad-hoc at variable times after the ad is displayed), and update progress against budget and KPIs.
IV. A Predictor (sensor) estimates the value of incoming traffic in terms of KPIs.
V. The Actuator is the bid price A standard ad-serving control loop can be described by the following steps:

1. Step 1: Receive a request i from a publisher (FIG. 6-2) for the advertiser to bid to deliver their ad to a publisher placement. The request is also known as an impression, and the request may also originate from Real-Time Bidding Exchanges.
2. Step 2: Execute K "valuation models" (FIG. 6-3): to predict the probability of the impression producing any of the K KPI events that the advertiser is interested in; $v_{ik}'$ (5), (6). For example, one of the KPI events may be a revenue event.
3. Step 3: Filter out any impressions which fail to meet the targeting requirements (FIG. 6-4): If any of the incoming traffic's predicted probabilities $v_{ik}'$ are less than the KPI target $V_k'$, then discard the traffic by setting bid price to zero; $b_i=0$.

If $\exists k: v_i^k < V^k$ then $b_i^* = 0$

4. Step 4: Calculate the bid price required for smooth delivery (FIG. 6-5): Let $b_i^P$ be the bid such that the expected spend will be as close as possible to the desired spend $B_t$. Some authors do this by setting a participation rate. Other authors set the bid price directly to throttle. In both cases, the decision variable ultimately is factored into the bid price. The approaches for estimating bid also vary from direct auction modeling to MIMD controllers. For the purposes of articulating an implementation, we'll describe a direct modeling approach. Let $W(b_1)=0$, t) be a function mapping the bid price, time, and parameters, to the expected probability of win, and $I_t^*$ a prediction of the number of impressions in this time period. We can select the bid price that minimizes the difference below:

$b_i^P = b_1 : \min |b_i \cdot I_t^* \cdot M(b_i, \theta, t) \cdot B_t|$

5. Step 5: Calculate the maximum bid price $b_i$ for achieving the CPA control signal (FIG. 6-5):

$b_i^k = v_i^{k*} \cdot CPA_t^k = (v_i^{k*}/V_t^k) \cdot b_i^P$

6. Step 6: Set final bid to the lower of the pacing price and the KPI bid price: This is required due to the nature of the constraint boundaries: if $b_i^k > b_i^P$ then this will drop the expenditure to the pacing price. If $b_i^P > b_i^k$ then $b_i^k$ is already at the CPA limit per equation (4), and so increasing the bid further is impossible since it would violate the CPA constraint. This is "a feature—not a bug" of using constraints.

$b_i^* = \min(b_i^k, b_i^P)$

7. Step 7: Submit bid price to the auction (FIG. 6-6)
8. Step 8: Deduct the budget (FIG. 6-7) and update the KPI counters (FIG. 6-8): If the ad's bid was successful in winning the auction, then deduct the clearing bid price $b_i$ from the ad's budget $B=B-b_i$. In a Generalized Second Price auction the clearing price will equal the second bidders bid plus 1 penny $b_i'=0.01+\max b_j$: $b_j <= b_i$.

If an external KPI event is detected, then accrue the KPI counters $V_k' = V_k' + 1$.

9. Step 9: Update the control targets including (FIG. 6-1): Update the new control variables, Budget $B_{t+1}$, Constraint goals $CPA_{t+1}^k$ and KPI targets $V_{t+1}^k$. A PI Controller can be defined per below for recent time periods as well as all time periods [32]. Karlsson [10] use an alternative approach of deriving full control system plant equations. However, this approach requires a fixed analytic function for impressions. Real-time bidding exchange inventory is volatile, and so the model-less PI control approach is more commonly used. Calculate new KPI targets $V_k'$ and budget remaining B'. For rate targets such as viewability, completion rate, clickthrough rate, this is calculated as $$V_{t+1}^k = \frac{\Sigma_{\tau \in 1...} TI_\tau \cdot V_\tau^k - \Sigma_{\tau \in 1...} tI_\tau \cdot V_\tau^k}{I_{t+1}}$$

$$B_{t+1} = \frac{B - \Sigma_{\tau \in 1...} tI_\tau \cdot B_\tau}{I_{t+1}}$$

$$I_{t+1} = \frac{I^* - \Sigma_{\tau \in 1...} tI_\tau}{T - t}$$

Figure 6:
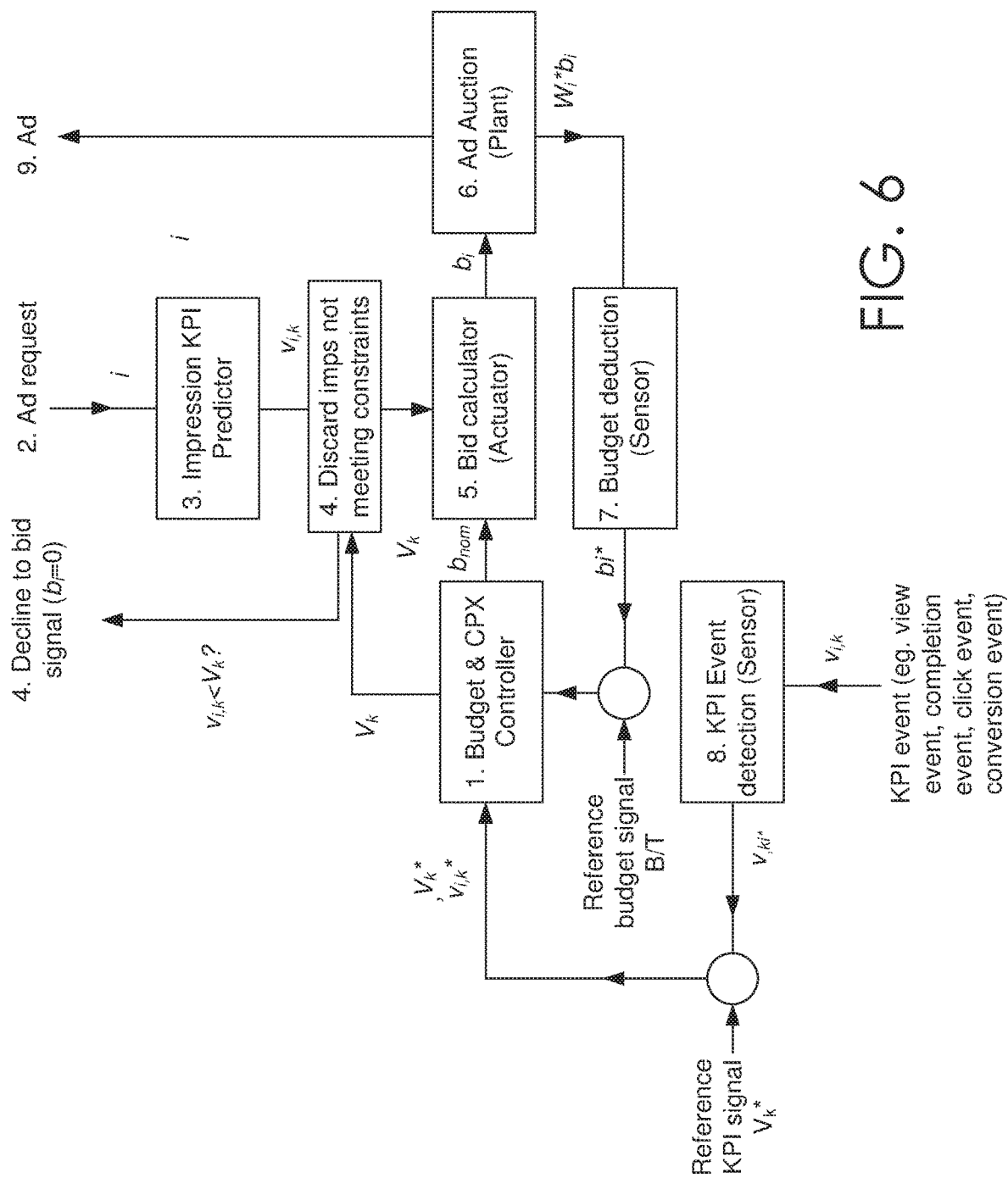
FIG. 6 provides an illustrative flow diagram of a conventional control system described in the literature designed to optimize one variable, subject to budget, performance and other constraints.
Figure 7:
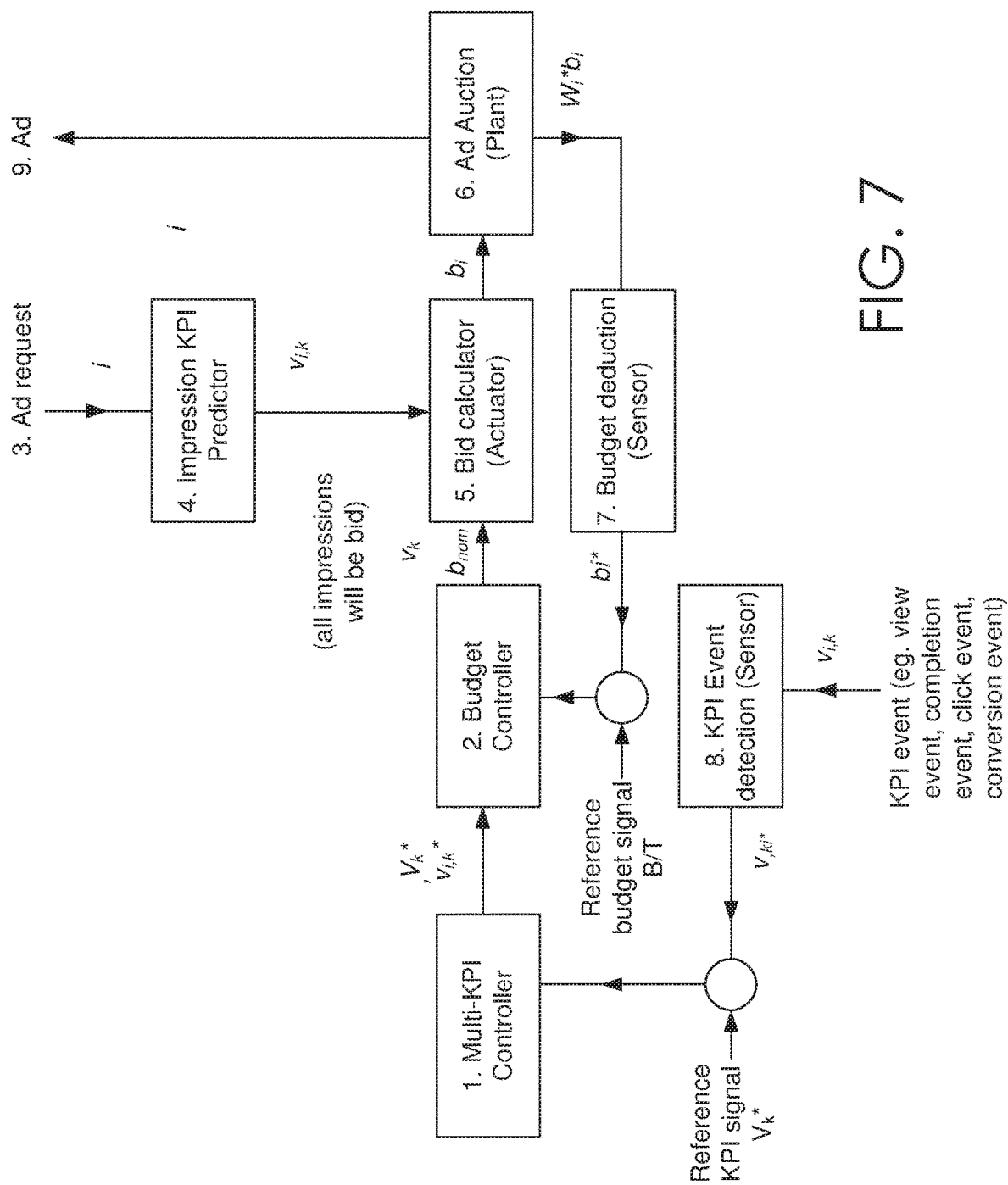
FIG. 7 provides an illustrative flow diagram of a Multi-KPI Error Minimization Control System, in accordance with embodiments of the present invention.

FIG. 6 provides an illustrative flow diagram of the ad-serving control loop, as described above. Some embodiments of the invention modify the above control system with the Multi-KPI control system as shown in FIG. 7. The modified system includes uses a Multi-KPI Controller to calculate a bid price that minimizes error over the vector of KPIs. The KPI Controller may keep the performance of the KPIs as close as possible to their reference signal of the multi-dimensional KPI signal that the advertiser has defined as their target.

After adding the KPI Controller to maintain KPIs close to the advertisers target, the hard constraint step that discarded traffic if it failed to meet the KPI targets can be removed. This enables the system to bid on a greater amount of traffic, essentially pricing the traffic. In some implementations, such a control system can perform the following:

1. Step 1: Receive a request to deliver an ad (FIG. 7-3).
2. Step 2: Execute "valuation models" to predict the probability of this impression eliciting any of the KPI events that are of interest to the advertiser (FIG. 7-4).
3. Step 3: Don't hard filter the impressions—allow them to be priced (next step).
4. Step 4A: Calculate bid prices for each individual KPI including CPA targets, rate targets, pacing targets and so on. (FIG. 7-5)
5. Step 4B: Calculate a final bid price that minimizes the multiple-KPI error from all of these individual solutions, including budget pacing. i.e. the system no longer just sets to the lower of budget and KPI price, but instead now calculates an optimal price between them based on the error function introduced below (FIG. 7-5).
6. Step 5: Submit bid price to auction (FIG. 7-6).
7. Step 6: Deduct the Budget if the ad wins the auction (FIG. 7-7).
8. Step 7: Update the KPI if an external event is detected (FIG. 7-8).
9. Step 8: Calculate new KPI and Budget targets (FIG. 7-1, FIG. 7-2).

D. New Ad Serving Problem Formulation

Let us define constraint error $\Delta_t^k$ as a measure of the difference between the advertiser's desired KPI $V_0^k$ and the current KPI required $V_t^k$ during the current time period t.

$$\Delta_t^k = f(V_0^k, V_t^k) \quad (12)$$

The objective for the optimizer will be to set bid prices such that the constraint error across all KPIs is minimized.

$$b_i^* : \min Err = \sum_t^T \sum_i^{I_t} \sum_k^K u^k \cdot \Delta_t^k \quad (13)$$

where $u^k \in [0 \ldots 1]$: $\Sigma_k u^k = 1$ are user-defined weights on the KPI errors. The reader should assume these are $u^k = 1/K$ unless otherwise stated. $1 \geq u^k \geq 0$ are user-defined weights on the KPI errors. Let us also define bid prices for Pacing $b_i^P$ and CPA $b_i^k$ as they are defined in (8) and (9).

The present invention tackles the issues of ad serving optimization when there are multiple objectives, using a constraint minimization approach. One inventive concept described herein is a system which converts these "constraints" into "errors", and allows the advertisers to weight these errors, effectively customizing their success definition. The resulting system enables advertisers to dynamically adjust their campaign based on the needs of the moment.

In order to address multiple objective issues, technical solutions for instrumentation, data mining, and optimization can be implemented.

The KPI Event Callback: This is a mechanism where the served ad content includes a viewability script. This takes measurements of player dimensions, and determines if the video is being occluded. This provides data for viewability prediction and tracking.

KPI Prediction: When a user requests a web page, the web page must be quickly assembled. A call is made to an ad server to provide ads. At the time that the ad server decides whether to serve ads, the ultimate viewability of the video that will be sent to the site is unknown—an IAB viewability event can only be generated after the ad has been continuously in display for more than 2 seconds (IAB, 2015). This may not occur for several seconds or perhaps even 30 seconds; and occurs after traffic is auctioned in any case. Therefore, we predict viewability ahead of time. We can mine historical data to determine the probability of viewability by player size, browser, time of day, and other factors. We introduce a logistic regression model that is designed to predict viewability on traffic prior to bidding. Other KPI events are similar—for example, Completion KPI events can only fire after the ad plays to completion (usually 30 second). Here also the probability of completion needs to be predicted ahead of serving the ad. Demographic In-target rate actually relies upon a third party entity to score batches of traffic—which can lead to days or more before the true demographic in-target rate is known; thus once again, this KPI needs to be predicted.

Multi-Objective Optimization: Because an advertiser may have multiple goals and constraints that appear infeasible, the problem can be pivoted from one of multiple constrained optimization to multiple objective optimization. The resulting problem attempts to minimize constraint error.

Step 1: Receive Ad Reqeust

Ad requests can be HTTP calls to an ad-server that request an ad. The ad-request may have a large amount of information, both directly embedded into the query parameters of the HTTP request, as well as available by looking up details of the IP (e.g., zipcode, city, state, country, Direct Marketing Association Area). An example of a web request record containing lookup information is below:

TABLE 2

Example Ad Request

| Field Number | Variable Name | Example Value |
|---|---|---|
| 1 | Ip | 1234567899 |
| 2 | x_forward_for | 1795421966 |
| 3 | server_time | 1439708400 |
| 4 | user_time | 1439690400 |
| 5 | Continent | 43 |
| 6 | Country | 228 |
| 7 | Region | 803 |
| 8 | City | 805 |
| 9 | metro | 802 |
| 10 | Zip | 6406 |
| 11 | Uid | 123456789 |
| 12 | event | adAttempt |
| 13 | inv_id | 0 |
| 14 | ad_id | 408390 |
| 15 | es_id | 116146684 |
| 16 | page_url | |
| 17 | video_url | |
| 18 | creative_id | 218213 |
| 19 | provider_id | 2, 24, 31, 201, 207, 222, 272, 519, 520, 636, 663, 690, 745 |
| 20 | segment_id | 273, 281, 282, 284, 355, 366, 369, 392, 393, 397, 399, 400, 401 |
| 21 | Os | 10 |
| 22 | browser | 11 |
| 23 | cookie_age | 1435732547 |
| 24 | domain | website.com |
| 25 | click_x | −1 |
| 26 | click_y | −1 |
| 27 | market_place_id | 0 |
| 28 | viewable | 0 |
| 29 | player_size | 1 |
| 30 | active | 0 |
| 31 | Rsa | 9 |
| 32 | platform_device_id | 0 |
| 33 | language_id | −1 |
| 34 | Bid | −1 |
| 35 | second_bid | −1 |
| 36 | Mrp | −1 |
| 37 | carrier_mcc_mnc | 0 |
| 38 | creative_wrapper | −1 |
| 39 | is_https | −1 |
| 40 | Rid | 0391a735-464e-4ef6-b7e0-23580efd1160 |

Step 2: Execute Valuation Models

At the time that the ad server decides whether to serve ads, the ultimate events that might occur—whether the ad will be viewable, whether the user will watch the ad to completion, whether the user is in the right demographic, are likely to be unknown.

For example, as to whether the ad will be viewable or not, an IAB viewability event can only be generated after the ad has been continuously in display for more than 2 seconds.

This may not occur for several seconds or perhaps even 30 seconds; and occurs after traffic is auctioned in any case.

As to whether the request is coming from a user with the right age and gender, this information can be determined sometime later by an auditing process, such as a Nielsen or Comscore auditing process—often it can take several days before Nielsen audit information becomes available that reports on the "actual" demographics that were observed for certain impressions.

Therefore, the ad serving system predicts each of these events when it receives the ad request. It does this by analyzing the historical data to determine the probability by player size, browser, time of day, the segments that are detected as part of the user's profile, the historical browsing behavior of the user, and other factors, to estimate the probability of each KPI that the advertiser is interested in.

The events that may be predicted include but are not limited to:

1. Viewability rate: The probability that the ad, when served, will remain on-screen for at least 2 continuous seconds.
2. Completion rate: The probability that the user will view the ad until the end of its running time (eg. 30 seconds).
3. Clickthrough rate: The probability that the user will click on the ad.
4. In-target rate: the probability that the user has the age and gender that matches the advertisers requested age and gender.
5. Conversion rate: the probability that the user has the age and gender that matches the advertiser's requested age and gender.
6. Bot rate: The probability that the traffic is generated by a bot.

As discussed herein, valuation models can be applied to predict these particular events.

I. Viewability Rate Predictor

We introduce a logistic regression model that is designed to predict viewability on traffic prior to bidding. A variety of strong signals help indicate whether an ad request will be viewable. We analyzed 488 million requests of all kinds between Dec. 20-29, 2015. The following features are often predictive of viewability:

Time of day: Viewability rates increase by about 60% during midday—3 pm Pacific time. This may be due to fewer bots being present, and an older demographic.

Operating systems: Older Operating systems including Microsoft Windows 98 and 2000 have much lower viewability rates than newer operating systems such as Windows 7. This may be due to older technologies that are unable to run the latest versions of flash. Linux also has an extremely low viewability rate and yet comprises 7% of traffic. This may be because more robotic traffic use that operating system.

Browsers: Older browsers have lower viewability rates—Internet Explorer 6, 7, 8. Newer browsers such as Google Chrome and IE9 and IE10 all have higher than average viewability rates. This may also be due to out of date technologies.

Video iframe I Player size: Larger player sizes have a priori higher viewability rates. These players occupy more screen space and may be less likely to be scrolled off-screen. Google reported on area versus viewability data, and we inferred that the relationship between pixel area and viewability rate can be described with the following formula where A is area and V is viewability rate:

$$V = 0.9587 - (1 + \exp(1.4915 * \log(A - 11.8364)))^{-1}$$

Figure 8:
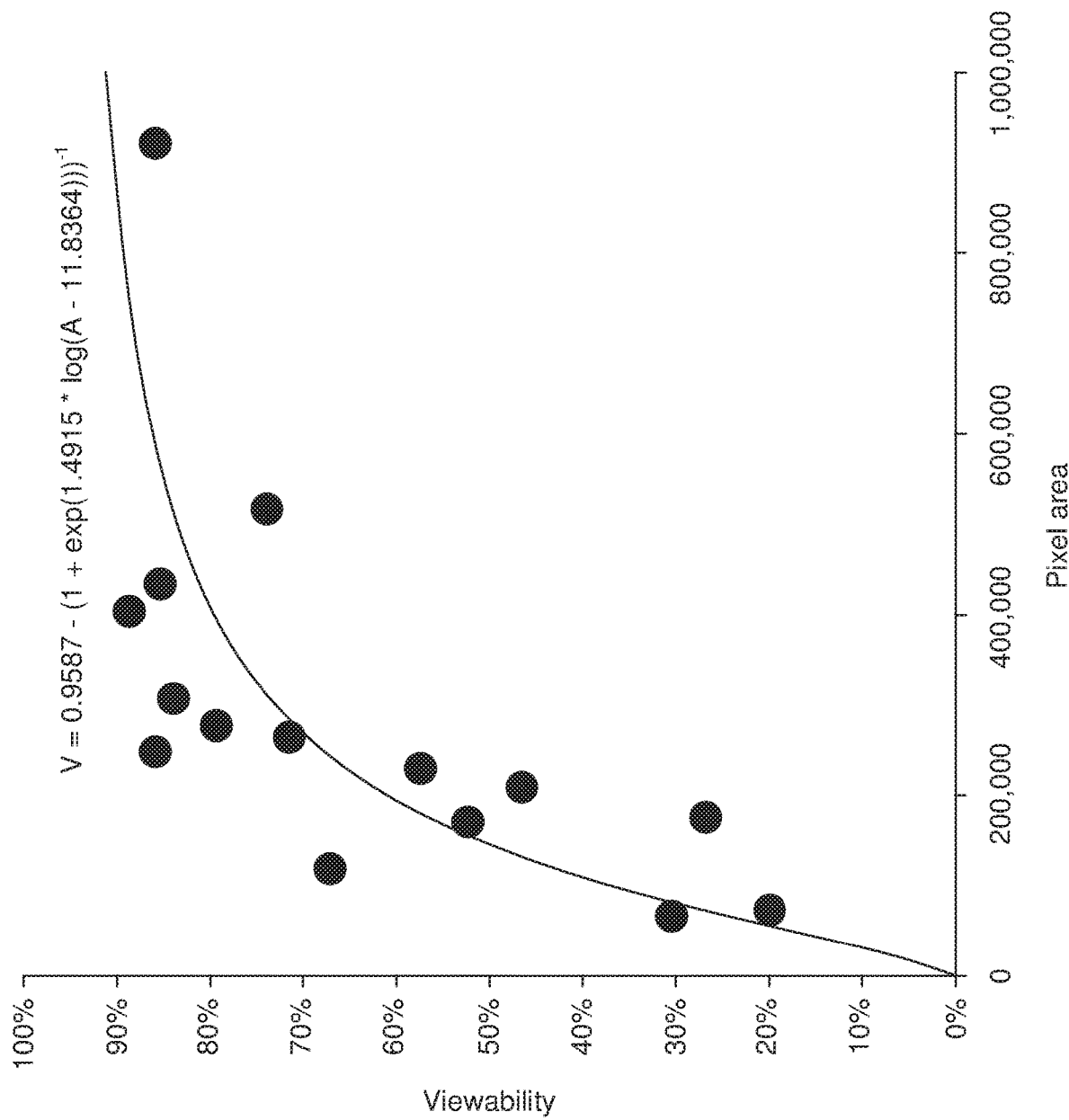
FIG. 8 illustrates an exponential fit to advertisement iFrame area versus viewability rate, in accordance with embodiments of the present invention.

FIG. 8 illustrates the above exponential fit to iFrame area versus viewability rate data: As the area of the ad increases, viewability tends to increase also. The tendency for large area iFrames to carry higher viewability rates is used by the predictor to improve its estimate of the probability that the request will ultimately be viewable after the ad is sent back.

Mobile devices: Generally, mobile traffic has about twice the viewability of desktop traffic. This is likely because video on mobile devices often fills the entire screen and is difficult to navigate around. Mobile is currently the largest growing area for online advertising, and ROI on mobile search has been consistently reported to have been poor. In contrast, video seems like the ideal medium for mobile advertising, and so this is likely where future revenue will grow on mobile.

Historical viewability rate: The historical viewability rate for the site and ad placement are excellent predictors of the future viewability for the same site and ad placements. Site has lower predictive power than the Site-Placement (2.6× versus 3.55× lift), however Site is available in 67% of cases, where-as Site-placement is only available in 45% of cases.

Pre-bid viewable call back: Some companies make their ad call scripts embed "pre-bid viewable" information about the video player requesting ads. For example, the Adap.tv video player script embeds current information about whether the ad is at least 50% on screen. When that pre-bid viewable event is detected, then it is very likely that 2 seconds later, the ad will still be on-screen. This "pre-bid call" has extremely high true positive rates and low false positive rates, and is one of the most powerful features available.

A. Viewability Model

In one example of a viewability model, we set up a hierarchical model which uses these features preferentially: In this example, if pre-bid viewability information $V_{i,prebid}$ is available we use it as this is highly predictive. If it is not available, then we could look at the historical viewability rate of the placement. If the impressions on the placement are above a minimum threshold we could use the historical viewability rate $v_{place}$. If none of the above are true then we can create a prediction of viewability based on a logistic regression which includes features such as the video player size, browser, and so on:

If $v_{i,prebid} \neq undef$ then $v_{i,t} = v_{i,prebid}$

Elseif $I_{place} \geq I_{MIN}$ then $v_{i,t} = v_{place}$ Else $$v_{i,t} = \left(1 + \exp\left(-\sum_{j=1}^{J} \beta_j x_{ij} + \alpha\right)\right)^{-1}$$

where $x_i$ is a vector of features for a particular web request, $\beta$ a vector of parameters of length equal to $x_i$, and a $\alpha$ constant, and $\beta_j$ and a are in Table 3, shown below.

B. Viewability Model Training

In one example of the invention, model training used 129,813 cases. Commonly used model evaluation methods such as AUC (Area Under the Response Operator Curve) are not suitable for this domain as they are shift and scale invariant, whereas the probability will be used in an economic model described next. Instead, we need to devise a different training metric for measuring error on the viewability model. We describe the error measurement method next and the parameters we inferred are shown below in Table 3.

C. Error Measurement for Viewability Model

The viewability prediction model is not an end unto itself, but instead will be part of formula that will be used to calculate bids—and then used to bid in an auction. Some commonly used machine learning techniques for training models are not appropriate for this problem. For example, popular methods for training classifiers such as Area Under the Response Operator Curve (AUC) are invariant to scale, shift and rank-preserving non-linearities. Therefore the viewability prediction could be consistently offset from actual, and this model could still have a perfect ROC curve area. Yet if the viewability prediction is consistently offset—either too high, or too low, then the resulting bid prices—the prices submitted to the auction—will be too high, and the result could either be a chronic failure to deliver impressions—or an even more problematic over-delivery and overspend. Instead we need to use a training method for the viewability prediction model that is sensitive to the eventual bid prices that are generated—and tries to minimize error on those bid prices.

Let us define a term that we call "Bidding error", which will be equal to the divergence between bid price placed and optimal bid price, had we had a predictor that exactly equaled actual. The advertiser revenue loss from bidding is a function of the difference between the bid price if we had a perfect prediction (ie. an actual), and a bid price that the model predicted—in other words the bidding error. Let us define Bidding Error as below:

$$err_t = \sum_{i}^{N} |b_i^* - b_i| \quad (6.1)$$

Substituting (9), which is a canonical formula used for calculating bids (in practice there are several other modifications, however this will be used as-is for our bidding error concept), this decomposes into (7), which is equal to the sum of squared view rate differences.

$$= \sum_{i}^{I} |v_i^* \cdot CPV_t - v_i \cdot CPV_t| = CPV_t \sum_{i}^{N} |v_i^* - v_i| \quad (7.1)$$

Thus, for model training purposes, sum of squared view rate difference is the error measure we use—as it is proportional to advertiser bidding error. Table 3 shows example of trained viewability model parameters from training set data. Table 4-13 show how viewability rates change with browser, time of day, pixel area, and other variables.

TABLE 3

Model Parameters for a Simple Viewability Predictor

| | | |
|---|---|---|
| $\beta_1$ | Playersiz = Null | — |
| $\beta_2$ | Playersize = 1 | 2.029 |
| $\beta_3$ | Playersize = 2 | 2.139 |
| $\beta_4$ | Playersize = 3 | 3.204 |
| $\beta_5$ | Os = linux | 0.006 |
| $\beta_6$ | Hour = 2 amto5 am | (0.126) |
| $\beta_7$ | Hour = Noonto5 pm | 0.094 |
| $\beta_8$ | Hour = 6 pmto11 pm | 0.045 |
| $\beta_9$ | Browser = Safari | (0.641) |
| $\beta_{10}$ | Browser = Chrome | 0.056 |
| $\beta_{11}$ | Browser = Null | 0.526 |
| $\beta_{12}$ | Browser = FirefoxOther | (0.055) |
| $\beta_{13}$ | Day = Weekend | (0.072) |

TABLE 3-continued

Model Parameters for a Simple Viewability Predictor

| | | |
|---|---|---|
| $\beta_{14}$ | Day = Mon | 0.099 |
| $\beta_{15}$ | Day = TuestoWed | 0.094 |
| $\beta_{16}$ | Day = ThurstoFri | (0.011) |
| $\beta_{17}$ | Marketplace = 137187 | (0.996) |
| $\alpha$ | Constant | (2.970) |

TABLE 4

Hour of Day versus Viewability Rate

| hour of day (Pacific Time) | viewability % | % of records |
|---|---|---|
| 0 | 17% | 1% |
| 1 | 17% | 1% |
| 2 | 15% | 1% |
| 3 | 14% | 2% |
| 4 | 13% | 3% |
| 5 | 13% | 4% |
| 6 | 14% | 5% |
| 7 | 15% | 5% |
| 8 | 16% | 5% |
| 9 | 17% | 5% |
| 10 | 17% | 5% |
| 11 | 16% | 6% |
| 12 | 19% | 6% |
| 13 | 19% | 5% |
| 14 | 19% | 5% |
| 15 | 18% | 5% |
| 16 | 17% | 5% |
| 17 | 15% | 6% |
| 18 | 16% | 6% |
| 19 | 17% | 5% |
| 20 | 17% | 4% |
| 21 | 16% | 4% |
| 22 | 15% | 3% |
| 23 | 16% | 2% |

TABLE 5

Operating System versus Viewability Rate

| Browser | viewability rate | % of records |
|---|---|---|
| Windows 98 | 0% | 0% |
| Windows 2000 | 7% | 0% |
| Windows XP | 17% | 2% |
| Windows Server 2003 | 18% | 0% |
| Windows Vista | 17% | 4% |
| Windows 7 | 17% | 45% |
| Windows NT | 19% | 27% |
| Mac OS X | 19% | 13% |
| Linux | 4% | 7% |
| Other | 13% | 0% |
| iOS | 0% | 2% |
| Android | 0% | 0% |
| Windows Phone OS | 0% | 0% |
| Windows 8 | 23% | 1% |

TABLE 6

Browser versus Viewability Rate

| Browser | Viewability Rate | lift | % of records |
|---|---|---|---|
| Internet Explorer 10 | 30% | 1.81 | 1% |
| Internet Explorer 7 | 23% | 1.43 | 0% |
| Mozilla Firefox Other | 20% | 1.24 | 0% |
| Safari 3 | 20% | 1.22 | 0% |

TABLE 6-continued

Browser versus Viewability Rate

| Browser | Viewability Rate | lift | % of records |
|---|---|---|---|
| Internet Explorer 9 | 17% | 1.05 | 0% |
| Mozilla Firefox 3 | 16% | 0.98 | 15% |
| Google Chrome | 16% | 0.97 | 69% |
| Mozilla Firefox 2 | 15% | 0.90 | 0% |
| Safari | 8% | 0.47 | 4% |
| Internet Explorer 6 | 1% | 0.04 | 0% |
| Internet Explorer 8 | 1% | 0.04 | 0% |
| Other | 0% | 0.03 | 0% |

TABLE 7

Player size versus Viewability Rate

| Row Labels | % of cases | VR |
|---|---|---|
| −1 | 12% | 1% |
| 1 | 36% | 14% |
| 2 | 30% | 19% |
| 3 | 22% | 38% |
| Grand Total | 100% | 19% |

TABLE 8 iFrame area versus Viewability Rate from Google (2015)

| Pixels down | Pixels across | Pixel area | Rep VR % | model VR % | Traffic |
|---|---|---|---|---|---|
| 848 | 477 | 404,496 | 88.6 | 79.79% | 19.0% |
| 640 | 390 | 249,600 | 85.9 | 67.80% | 3.0% |
| 1280 | 720 | 921,600 | 85.8 | 90.53% | 3.0% |
| 854 | 510 | 435,540 | 85.4 | 81.21% | 2.0% |
| 640 | 480 | 307,200 | 83.8 | 73.53% | 3.0% |
| 702 | 396 | 277,992 | 79.3 | 70.88% | 2.0% |
| 960 | 540 | 518,400 | 73.87 | 84.16% | 4.0% |
| 645 | 410 | 264,450 | 71.4 | 69.48% | 3.0% |
| 400 | 300 | 120,000 | 67 | 42.91% | 5.0% |
| 640 | 360 | 230,400 | 57.3 | 65.37% | 7.0% |
| 612 | 281 | 171,972 | 52.2 | 55.68% | 3.0% |
| 612 | 344 | 210,528 | 46.4 | 62.51% | 4.0% |
| 300 | 225 | 67,500 | 30.3 | 24.51% | 3.0% |
| 610 | 290 | 176,900 | 26.7 | 56.66% | 5.0% |
| 300 | 250 | 75,000 | 19.8 | 27.48% | 33.0% |

TABLE 9 iFrame is on tab which is currently active

| Row Labels | Sum of occ2 | |
|---|---|---|
| −1 | 12.48% | 0.1% |
| 0 | 23.54% | 1.7% |
| 1 | 63.98% | 29.0% |
| Grand Total | 100.00% | 19.0% |

(1 = true, 0 = false, −1 = unknown)

TABLE 10

Device versus Viewability Rate (from Google 2015)

| Device | Web |
|---|---|
| Desktop | 53% |
| Mobile | 83% |
| Tablet | 81% |

TABLE 11

Placement versus Viewability Rate

| Variable | Mean when Actual Viewable = 0 | Mean when Actual Viewable = 1 | % of cases | Odds Ratio |
|---|---|---|---|---|
| adsource + esid-conv | 6% | 53% | 29.3% | 8.74 |
| es-conv | 12% | 44% | 45.4% | 3.55 |
| site-conv | 15% | 39% | 67.2% | 2.60 |

TABLE 12

PreBid viewable versus Viewability Rate

| | | Actual Viewable | | |
|---|---|---|---|---|
| | | 0 | 1 | Total cases |
| PreBid Viewable Predictor | 0 | 95% | 5% | 56.60% |
| | 1 | 8% | 92% | 16.50% |
| Total with Pre-Bid Viewable 0 or 1 | | | | 73.10% |

TABLE 13

Area versus Viewability Data from Google 2015, including an exponential fit

| Pixels Down | Pixels across | Rep VR % | Pixel area | model VR % | Rep > 70? | Model > 70? | Traffic |
|---|---|---|---|---|---|---|---|
| 848 | 477 | 88.6 | 404,496 | 79.79% | 1 | 1 | 19.0% |
| 640 | 390 | 85.9 | 249,600 | 67.80% | 1 | 0 | 3.0% |
| 1280 | 720 | 85.8 | 921,600 | 90.53% | 1 | 1 | 3.0% |
| 854 | 510 | 85.4 | 435,540 | 81.21% | 1 | 1 | 2.0% |
| 640 | 480 | 83.8 | 307,200 | 73.53% | 1 | 1 | 3.0% |
| 702 | 396 | 79.3 | 277,992 | 70.88% | 1 | 1 | 2.0% |
| 960 | 540 | 73.87 | 518,400 | 84.16% | 1 | 1 | 4.0% |
| 645 | 410 | 71.4 | 264,450 | 69.48% | 1 | 0 | 3.0% |
| 400 | 300 | 67 | 120,000 | 42.91% | 0 | 0 | 5.0% |
| 640 | 360 | 57.3 | 230,400 | 65.37% | 0 | 0 | 7.0% |
| 612 | 281 | 52.2 | 171,972 | 55.68% | 0 | 0 | 3.0% |
| 612 | 344 | 46.4 | 210,528 | 62.51% | 0 | 0 | 4.0% |
| 300 | 225 | 30.3 | 67,500 | 24.51% | 0 | 0 | 3.0% |
| 610 | 290 | 26.7 | 176,900 | 56.66% | 0 | 0 | 5.0% |
| 300 | 250 | 19.8 | 75,000 | 27.48% | 0 | 0 | 33.0% |

II. Clickthrough Rate Predictor

Clickthrough Rate uses the historical Clickthrough Rate of the placement from which the ad request is originating. If the impressions on the placement are below a minimum threshold, then we consider the Clickthrough Rate to be unknown.

$$I_{place} \geq I_{MIN} \text{ then } v_{i,t} = v_{place} \text{ Else}$$

$$v_{i,t} = \text{UNDEF}$$

III. Completion Rate Predictor

Completion rate is the probability of an ad being viewed to completion—which for video ads might mean being viewed for their entire 30 seconds, and with sound on and un-occluded. Although site predictors work well for Click-through Rate prediction, the same approach has drawbacks when it comes to Completion Rate.

We developed a logistic regression model to improve site-level predictions.

$$v_{i,t}=(1+\exp(-x_{click}*1.44+x_{completion}*4.17-X_{viewability}*0.38+2.03))^{-1}$$

where $x_i$ is historical rate of the placement from which the ad request is originating.

IV. Conversion Rate Predictor

Conversions are custom events that advertisers set up which might indicate that a signup page has been reached, or a subscription completed, or a revenue transaction generated. These events are captured like other KPI events. Like the other KPI events, conversion rate also needs to be predicted at bid time so as to be able to come up with an appropriate bid price for the value of the traffic. For each request, the requestor has a variety of what we call "third party segments"—cookie information from third parties indicating interests, past site visits, and other behavioral indicators for the user making the request. For example, one segment may be "BlueKai-ViewsFootballWebsites". Another may be "Datalogix-Male18to24". Let $x_{ij}$ be the 0-1 segments that are present about a user who is requesting the ad. We define a logistic regression for individual ads that predicts conversion rate based on the segments that are found in the user's profile as follows:

$$v_{i,t} = \left(1 + \exp\left(-\sum_{j=1}^{J}\beta_j x_{ij} + \alpha\right)\right)^{-1}$$

where $x_i$ is a vector of segments for web request, $\beta$ a vector of parameters of length equal to $x_i$, and a $\alpha$ constant.

V. Demographic In-Target Predictor

Demographic in-target prediction is slightly different from the events discussed previously. In order to predict Nielsen or Comscore demographics, an "audit" of sites, segments that may be found in the request, can be performed.

These segment audit will reveal the demographics of these particular sites and segments. A model which predicts the demographic probability given a set of audit results which we have collected for the sites and segments in the request can then be created.

We defined a predictor BAVG as follows:

$$BAVG=W \cdot SAVG+(1-W) \cdot U$$

where U was the historical demographic probability for the URL or site. This provided a robust prediction if there was no segment information or the segment probabilities were contradictory (see below):

$$U=Pr(d_j|x \in X_U)$$

SAVG were the average of demographic probabilities for segments on the web request, and only segments are averaged which appeared more than a threshold $\varepsilon$.

$$SAVG = \frac{1}{\#X_A}\sum_{X_A} Pr(d_j | x \in X_A) : Pr(z \in X_A) \geq \varepsilon$$

Weights W minimized the squared error between the predictor BAVG and actual demographic probabilities. The weights determined how much emphasis to put on user-specific information (segments) versus the site URL. If the segments had high disagreement D, then more weight would be placed on the site.

$$W_T : \min \sum_{X_A}(BAVG(d_j | x \in X_A) - Pr(d_j | x))^2 : D(x) \in (L_T \ldots H_T)$$

Each weight $W_T$ is defined for a different level of "disagreement" between the segments, where disagreement is defined as the standard deviation of segment audit probabilities.

$$D(x) = \sqrt{\frac{1}{N}\sum_{X_A}(Pr(d_j | x \in X_A) - SAVG)^2}$$

Step 3: Calculate the Bid Price

In other systems, impressions failing to meet KPI goals would be filtered out completely; so that the system would decline to bid on this traffic. Instead, this invention allows these impressions through and will minimize a global error measure for this traffic's KPIs against the goal KPI vector.

Once the KPI predictions are generated for the incoming impression, the system now needs to calculate a bid price. There are two phases of this process: First, single-variable bid prices are estimated. Secondly, the final multi-KPI bid price is calculated. We begin with the single variable solutions—this is the bid price that would be used if we just had one KPI target—be that budget delivery, or viewability, or other KPIs.

Step 4-a: Bid for Single KPI Problems

This section describes single-variable solutions for (1) given (3), (1) given (4), and (1) given (5) independently. Each of these has an optimal solution that can be calculated efficiently. After we define these sub-solutions, we will introduce a solution for minimizing error on multiple constraints. Throughout the discussion we will refer to these sub-problems as "goals"; this will help make it easy to introduce the multi-objective case later.

I. Pacing Goals

For purposes of this application, we define "Pacing" as the calculation of a bid price that will achieve "smooth budget delivery" by resulting in a spend that is equal to $B_t$. $B_t$ is the budget goal for time period t, and if each time period the spend is exact then $B_t=B/T$. Pacing is Constraint (4) in the original formulation.

Diurnal Patterns for Bid-Volume: One method for achieving accurate pacing is to estimate impression volume $I_t^*$, and the win probability $W(b_t,t)^*$, and then use these to identify the bid that will achieve the required spend. The bid-win landscape $W(b_t,t)^*$ can be estimated using historical data on prices submitted and win-loss outcome; and demand $I_t^*$ can be estimated using historical observations of impressions at each time divided by the win-rate. For example, (Kitts, et. al., 2004) identify these functions based on empirical auction data as follows:

$$I_t^* = \sum_p w_p * I_p; w_p = \prod_u \frac{1}{\eta_u * \exp(s_u(t, p))} \quad (8.2)$$

-continued $$b_t^* : \min \left| b_t^* \cdot I_t^* \cdot W(b_t^*, t)^* - \frac{B}{T} \right|$$

where a is the highest price on the auction, $\gamma$ is a shape parameter suggesting how steeply the auction landscape drops to zero, $I_p$ is the traffic from a time in the past, and $w_p$ is the weight to put on that past time for predicting the current time t. The weight is calculated by combining several "time kernels" u—which represent the similarity $s_u(t,p)$ between time t and previous p. The similarities are based on "same hour previous week", "same day previous week", and so on. $\eta_u$ is a parameter that determines how much weight each time kernel has, and is trained.

After both functions are identified, we can enumerate a range of possible bids $$b_t^* \in [\text{min} \cdot \text{max}]$$

in one penny increments. We can then submit these to (8.2), and calculate the spend from each of these bids. We then select the bid that produces spend closest to the needed spend this period (8.2), i.e. select $b_t^*$ which is the minimum of the set below $$b_t^* : \min \left| \text{Spend}(b_{min}^*) - \frac{B}{T}, \text{Spend}(b_{min+0.01}^*) - \frac{B}{T}, \ldots, \text{Spend}(b_{max}^*) - \frac{B}{T} \right|$$

The net result is a bid price chosen that creates a spend result that is as close as possible to even delivery each time period BIT.

Linear Model for Bid-Volume: When the function mapping bid to spend is simple enough, we can also estimate the pacing bid price by using function inversion. In the example below we consider a simple linear model. Let the number of impressions $W_i$ resulting from placement of bid price $b_i$ be given by a linear model:

$$W_i = w \cdot b_i$$

where w is calculated based on actual win results from the simulation:

$$w = \sum_i W_i^* \Big/ \sum_i b_i$$

The pacing bid price $b_i^P$ can then be calculated as follows: At each time t the controller wishes to buy $I_p$ impressions, which equals probability of win $W_i$ multiplied by total impressions during the cycle $I_t$. Using the formula for $W_i$ above we calculate $b_i^P$ as follows:

$$I_P = W_i \cdot I_t; \quad I_P = w \cdot b_i^P \cdot I_t;$$

$$b_i^P = \frac{I_P}{(w \cdot I_t)}$$

MIMD Controller for Setting Bid for Pacing: A weakness with the modeling approach is that it requires continuous analysis of the current state of the auction and demand. These can be quite volatile. An alternative method for estimating the "pacing bid" is to use a control system to "track towards the pacing goal". These work by incrementally adjusting bid price (e.g., increasing it if behind, or decreasing it if ahead of plan) based on the advertiser's performance against a "pacing goal". A variety of algorithms can be used for this purpose.

An incredibly simple "step" controller can be defined as follows:

SATISFACTORY_PACING=0.99

BID_INC=0.05;

pacing_ratio=realized_impressions/desired_impressions;

if pacing_ratio<SATISFACTORY_PACING then
    bid=bid+BID_INC;

if pacing_ratio>=SATISFACTORY_PACING then
    bid=bid−BID_INC;

A standard variety is the MIMD algorithm proposed by Garg and Young (2002). This algorithm is described for lossy transmission application. While there is no error in transmission, speed is increased. If an error is encountered, then transmission speed is decreased.

If $B_t^* < B_t$ then $$b_{t+1}^* = b_t + \gamma_t; \quad \gamma_{t+1} = \gamma_t + \phi; \quad \beta_{t+1} = \psi$$

If $B_t^* > B_t$ then $$b_{t+1}^* = \max\left(\frac{b_t}{\beta_t}, 0.01\right); \quad \gamma_{t+1} = 1; \quad \beta_{t+1} = \beta_t \psi;$$

II. Cost Per Acquisition Goals

Cost Per Acquisition (CPA) covers a wide range of "Cost Per X" goals including Cost Per Click, Completion, View, Purchase, Lead, Sale, Impression, and so on. In general, the advertiser will want the cost to be less than or equal to a value that they specify, CPA. CPA is Constraint (3) in the original optimization formulation.

In order to solve for the bid price that will achieve the CPA (ignoring other constraints and requirements), we note that the sum of bids divided by the sum of value delivered must equal the CPA. Assuming accurate value prediction $v_i^*$, we can calculate the estimated bid price $b_i^*$ to achieve any given $CPA_t$ using the formula below.

$$b_i^* = v_i^{k^*} \cdot CPA_t^k = \left(\frac{v_i^{k^*}}{V_t^k}\right) \cdot \left(\frac{B_t}{I_t}\right) \quad (9)$$

III. Rate Goals

Rate requirements express the desire that a percentage of the traffic has a particular trait. Rate goals include Viewability Rate (the percentage of traffic that was viewed at least 2 seconds), In-Target Rate (the percentage that was in the correct demographic), Completion Rate (percentage that viewed to completion), and so on. Rate goals are Constraint in the original optimization formulation.

The challenge for the ad-server is to calculate a bid price that achieves the desired rate goal. This is a uniquely challenging problem. In "Cost Per Acquisition" it is almost always possible to find a bid price that achieves the CPA goal (if $v_i^*>0$ then $b_i^*>0$, so a (possibly small) floating point bid will exist that meets the required CPA). This is not the case for rate goals: for example, if all inventory has viewability rate<70% and the advertiser wants over 70%, then no bid price exists that could deliver the advertisers desired solution.

The key concept for achieving rate goals, is the realization that the probability of winning the traffic on the auction increases monotonically with bid price. Therefore, if the impressions have a predicted rate $v_i^k$ that is far below that which is required $V_t^k$, the bid price should also be reduced, so that the amount of traffic won with the low rate is low. If the predicted rate $v_i^k$ is at or above the required rate, the bid price should be high.

Let's assume that our bidding system is able to keep a data structure in memory with the distribution of rates it has observed so far D (v). For example, D(v) could comprise N=10 counters for number of impressions observed with rate in (0 . . . 0.1), (0.1 . . . 0.2), . . . , (0.9 . . . 1.0).

Bid Price for Rate Goals Method 1: Assuming D(v) is stationary, prediction is accurate, $v_i = v_i^*$, and the distribution bins match the floating point resolution for the rate predictions and actuals, then the following bid price will also guarantee that the rate requirement is met:

$$b_i^* = \begin{cases} \frac{v_i^{k^*}}{V_t^k} \cdot CPA_t^k, & \text{if } c(v_i^k) \geq V_t^k \\ 0, & \text{otherwise} \end{cases} \quad (9.2)$$

$$c(V) = \sum_{v=V\ldots 1} v \cdot D(v) \Big/ \sum_{v=V\ldots 1} D(v) \quad (10.2)$$

Assuming equal win-rate given bid, the above bidding strategy will deliver a rate equal to $V_t^k$, since it will buy all of the traffic at $c(v_i^k)$ or above. However, win-rate increases as a function of bid—and in the above formula, bid increases with rate—so the traffic with higher rates is actually won at the same or higher rate as the traffic below. Thus, the above buying strategy guarantees rate will be at least $V_t^k$ or above, assuming accurate prediction of $v_i^k$.

Bid Price for Rate Goals Method 2: An alternative method for calculating a rate goal bid price is as follows:

Let bid price be calculated as follows:

$$b_i^k = \begin{cases} b_i^P \cdot v_i^{k^*} / V_t^k, & \text{if } v_i^k \geq V_t^k \\ b_i^P \cdot s \cdot v_i^{k^*} / V_t^k, & \text{otherwise} \end{cases} \quad (9.3)$$

This is the same formula, but with a throttle s added for low rate traffic. A method of calculating a positive-valued s is as follows: Let D(v) be a distribution of KPI values observed so far and W(b) be a win rate model. Assuming accurate predictions $v_i^{k^*} = v_i^k$ (i.e. ignoring regression-to-the-mean effects), in equation 9.3 s=0 will buy none of the below-rate traffic. This will trivially ensure that $\Sigma_t^T \Sigma_i^{I_t} W_i(b_i) \cdot v_i^k \geq V_t^k$, however this will also result in a KPI result that is overly high. We can buy a non-zero amount of the "below-rate" traffic by calculating s≥0 as follows:

$$s = \frac{\left(DL(V_t^k) - \frac{V_t^k - VH(V_t^k) \cdot DH(V_t^k) - VL(V_t^k) \cdot DL(V_t^k)}{VH(V_t^k) - VL(V_t^k)}\right)}{DL(V_t^k)}$$

$$VH(V) = \frac{\sum_{v=V}^{1} v \cdot I(v)}{\sum_{v=V}^{1} I(v)};$$

$$VL(V) = \frac{\sum_{v=1}^{V} v \cdot I(v)}{\sum_{v=1}^{V} I(v)};$$

$$DH(V) = \frac{\sum_{v=V}^{1} I(v)}{\sum_{v=0}^{1} I(v)}$$

$$DL(V) = \frac{\sum_{v=0}^{V} I(v)}{\sum_{v=0}^{1} I(v)}; I(v) = W\left(b_i^P \cdot \frac{v}{V_t^k}\right) \cdot D(v)$$

We now turn to how we can combine each of these solutions to minimize multiple KPI error.

Step 4-B: Bid for Multiple KPI Problems: The Multi-KPI Controller

I. KPI Error Minimization

We've discussed how to calculate bid solutions for individual KPIs. Now we need to put together a solution for multiple KPIs. We want a solution that will allow us to get good performance on multiple CPA (3), Rate (5), and Budget (4) goals, including (a) Cost Per Completion, Viewability Rate, In-Target Rate, Completion Rate, Bot Rate, and so on.

Let us also define constraint error as a function of the difference between the constraint and the ideal value. We use the error function below:

$$\delta_i^k = \left(\frac{V_t^k}{V_0^k}\right) \quad (11)$$

where $V_t^k$ is the current target for the KPI at time t and $V_0^k$ the original target entered by the advertiser. This measures error in units of percentage difference from goal. A squared term (which can be included) accentuates higher misses. Budget as well as KPIs are treated in the same way with error measured in percentage error, for example budget pacing error is computed as:

$$\delta_i^P = \left(\frac{B_t}{B_0}\right) \quad (11.1)$$

Advertisers tend to view goal achievement in a fairly binary manner, where meeting the goal is deemed good, over-performing on goal is also good, and missing is deemed very bad. In addition, from an ad-server inventory management point of view, it would be best to meet the advertisers goals if possible, but exceeding the goals is not as important. In order to capture this advertiser concept of error, we modify the raw KPI differences to create a KPI error measure below:

$$\Delta_i^k = \begin{cases} \delta_i^k, & \text{if } \delta_i^k > 1 \\ (r \cdot \delta_i^k), & \text{otherwise} \end{cases} \quad (12)$$

where 1≥r≥0. Pacing error differs from the other KPIs in that it is symmetric, meaning that both spending too high and spending too low is considered erroneous. Delivery that is within E of goal is considered to be "on-target", and for those cases we scale-down the error. Delivery that is higher or lower than E is then considered "off target" or "erroneous". We then determine Pacing error as $$\Delta_i^P = \begin{cases} 1/\delta_i^p, & \text{if } \delta_i^p \in [0 \ldots 1-\varepsilon) \\ r \cdot 1/\delta_i^p, & \text{if } \delta_{i^p} \in [1-\varepsilon \ldots 1) \\ r \cdot \delta_i^p, & \text{if } \delta_{i^p} \in [1 \ldots 1+1/(1-\varepsilon)) \\ \delta_i^p, & \text{otherwise} \end{cases} \quad (13)$$

where $1>\varepsilon>0$. Using the above error functions, we now calculate total error as the sum of the error on each kpi k where $u^k \in [0 \ldots 1] : \Sigma_k u^k = 1$ is the user weighting for each kpi.

$$Err = \sum_k u^k \cdot \Delta_i^k \quad (14)$$

We would like to perform gradient descent on the above error function. The solution with the greatest error reduction will be to select the bid price for the KPI that is most in need $$b_i^* = b_i^k : \max u^k \cdot \Delta_i^k \quad (17)$$

This form of optimization formally meets the criteria for weak Pareto optimality as it will converge to a solution that dominates other solutions, although as with other non-linear optimization strategies, the solution could become stranded at a local optimum. We vectorize or "batch update" by taking a step in the direction of each sub-optimal bid price $b_i^k$, weighted by the magnitude of its error $u^k \cdot \Delta_i^k$:

$$b_i^* = \frac{1}{\sum_k u^k \cdot \Delta_i^k} \sum_k u^k \cdot \Delta_i^k \cdot b_i^k \quad (14.1)$$

II. Examples

Example 1: Over-Pacing with good KPI: Consider an advertiser with the following parameters: $b_i^k = 10$; $\Delta_i^k = 0.8$; $b_i^P = 5$; $\Delta_i^P = 0.5$; $\varepsilon = 0.1$; $r = 0.10$. The advertiser is therefore "over-pacing"—they need to decrease their pacing by 50%. They are also over-performing on their KPI (20% above KPI). The Optimal pacing price is 5 and Optimal KPI price is 10. Then $$b_i^* = \frac{(5*2 + 10*0.08)}{0.08 + 2} = 5.19;$$

in other words, the system will tend to use the pacing price, and the pacing price will call for a decrease in spend.

Example 2: Pacing well but KPI bad: Let's say we change the following parameters to $\Delta^k = 1.2$; $\Delta^P = 1$. The advertiser is now pacing perfectly. However, their KPI performance is 20% below target. Then $$b_i^* = \frac{(5*0.1 + 10*12)}{0.1 + 12} = 9.61;$$

in other words, the system will tend to use the KPI price.

Example 3: Under-Pacing and poor performance on KPI: Let's say we change the following parameters to $\Delta^k = 1.2$; $\Delta^P = 1.21$. The advertiser has 20% error on KPI and 21% error on pacing. Then $$b_i^* = \frac{(5*0.1 + 10*12)}{0.1 + 12} = 7.51.$$

III. KPI Error Minimization

We can also note several properties of this solution:
(a) If all KPIs are failing their goals, then the highest error correcting "force" will be on the KPI that is failing by the greatest margin.
(b) If all KPIs are exceeding their goals, then the highest error correcting "force" will be on the KPI that exceeds its goal by the least.
(c) If some KPIs are exceeding goal and others are failing goal, then assuming "r is small" (specifically:

$$r \leq \frac{1-w}{(K-1) \cdot w}$$

where $w>0.5$ and K the number of KPIs; proof for this follows next), we can guarantee that the fraction $w>0.5$ of error-correction "force" will be on KPIs that are failing their goals; thus the majority of force on the failing KPIs.

These properties mean that the system will put the most corrective force on the highest error KPIs. In a situation with some KPIs at goal and others failing goal, the system will put most resources into "fixing" the KPIs that are failing goal. This is intuitively desirable behavior. It is even the case that if all KPIs are exceeding their goals, the system still puts corrective force on the KPIs that are exceeding their goals the least. Thus the system will continue to accrue more KPIs if it is able, which is again intuitively desirable behavior.

Lemma 1: If there are any KPIs that are failing their goals, with other KPIs that are exceeding, the majority of error-correcting weight will be on the KPIs that are failing their goals: Given k KPIs that are under-performing, and m KPIs that are at or exceeding goal, setting $$r = \frac{1-w}{m \cdot w}$$

where $1 \geq w \geq 0$ will ensure that the sum of error on the k KPIs currently failing their goal will exceed w.

The case where there is the least difference in error between the k failing KPIs and m exceeding KPIs is when (a) the error on each of the m exceeding KPIs is maximized, which occurs when $$\lim V_t^m \to V_0^m; \left\{ \Delta^m = r \cdot \left( \frac{V_t^m}{V_0^m} \right) \right\} = r = A,$$

and (b) the error on the under-performing k is minimized, which occurs when $$\lim V_t^m \to V_0^m \left\{ \Delta^k = \left( \frac{V_t^m}{V_0^m} \right) \right\} = 1 = B.$$

We now only need to consider the case of k=1, since that is the case with the least weight on the sum of under-performing KPIs compared to at or exceeding KPIs. The weight on one KPI that is failing target k with m exceeding target will equal $$\Delta^k = \frac{A}{A + m \cdot B} = \frac{1}{1 + m \cdot r}.$$

Setting $\Delta^k \geq w$ we have $$r \leq \frac{1-w}{m \cdot w}.$$

Given K KPIs we can therefore guarantee that the w weight will be on KPIs experiencing error by setting $$r = \frac{1-w}{(K-1) \cdot w} \quad (14.2)$$

Example 1: Assume the desired weight on goals experiencing error is at least w=90% and there are 3 KPIs—Pacing, Viewability and Completion Rate.

$$r = \frac{1-w}{(K-1) \cdot w} = \frac{1-0.9}{(K-1) \cdot 0.9} = \frac{0.1}{1.8} = 0.055.$$

Example 2: Assume that there are 2 KPIs—Pacing and Viewability. r=0.11.

Example 3: Assume that w=80% and K=2 (Pacing and Viewability). r=0.25.

By setting r to the above formula it is possible to guarantee that the KPI Controller will apply the majority of weight to the set of KPIs that are failing to meet their goals. This is important because it means that the system will spend most of its resources "correcting" KPIs that are currently failing their goals, and minimal resources on KPIs that happen to be exceeding. A high value for w will mean that KPIs that reach their goals are "ignored", as the system then focuses its resources on the KPIs that still are yet to reach their particular goals.

Lemma 2: If all KPIs are exceeding their goals, most error-correcting weight will be on the KPI that is exceeding its goal ratio the least: Given k KPIs that all over-performing their goals, and assuming r>0 and $\delta_i^k>0$, the KPI that has the lowest ratio of actual to goal will receive the highest error.

Consider equation (12) with $\delta_i^k>0$ defined by either (11) or (17), and the case that all $\delta_i^k<1:\forall k$. If (17) is used then it squares the errors and the relative rank of the errors is preserved. If (12) is used then the errors are scaled down by factor r, and again the relative rank of the errors $\delta_i^k$ is preserved. The composition of the two functions also preserves rank order.

Even if all KPIs exceed their targets, the environment could still change and so the controller still needs to judiciously determine which KPIs to pursue for minimization. Because the error function maps KPIs exceeding goal $\delta_i^k<1$ to a rank-preserving, non-linear $\Delta_i^k$ it means that the system will continue to operate on the KPIs in order of those with the largest error. The largest error will accrue to the KPI that is exceeding its goal the least, the second largest to the KPI that is exceeding its goal the second least, and so on. This is an intuitively desirable behavior.

Lemma 3: If all KPIs are failing their goals, most error-correcting weight will be on the KPI that has the worst error ratio: This is easy to verify with equation (12).

The above lemmas show that the error minimization routine effectively weights KPIs that are failing their goals, and de-weights KPIs that are exceeding their goals. Given a variety of KPIs that are failing and exceeding goals, the system focuses on the KPIs that are failing. We next note some differences between error-based control and constraints:

Lemma 4: The available inventory for error approach does not change as a function of number of KPIs nor KPI values.

Error calculation in (4) is invariant with regard to the total KPIs, since error is normalized by number of KPIs.

Error calculation (4) is also invariant with regard to the actual threshold values. If a value $V_k=(x+V_k)$ is used then error is calculated as $$err = \frac{v_k}{x + V_k}$$

and ultimately normalized to 1.

The practical importance of this lemma is that even if an advertiser engages in the "strategic behavior" of declaring rate requirements that are unrealistically high (eg. 95%), the error approach described here just turns the advertisers bids into an expression of error with regard to their goals, where the total error is the same in all cases. The "tragedy of the commons" can no longer occur since delivery is no longer a function of KPI value.

Lemma 5: Assuming independence, constraint approaches produce an exponential reduction in available inventory as additional constraints are added.

Let a constraint for $KPI_k$ be $V_k$. The inventory available at $V_k$ or higher is given by the cumulative distribution $cdf(V_k) = \int_V^1 pdf(V_k) dv$. Assuming $pdf(V_k) \perp pdf(V_j)$ then cdf $(V_k \wedge V_j) = \int_V^1 pdf(V_k) \cdot pdf(V_j) dv$. Therefore, for each additional KPI that is added $v_j$, reduces the solution space by $cdf(V_j)$. For example, assuming $pdf(V_k) = pdf(V_j)$ then cdf $(V_k \wedge \ldots \wedge V_K) = \int_V^1 pdf(V_k)^K dv$, and solution space decreases as an exponential function of K.

Under an error-based approach, the total error is normalized. Therefore, the amount of inventory available remains constant.

Lemma 6: Error-based approaches have higher delivery than constraint-based approaches. Consider the case of Budget delivery plus 1 KPI:

We note that for all $KPI_k$ the cumulative distribution $cdf(V_k)$ for inventory is monotonically decreasing. Given a target specified KPI of $V_k$, under a constraint-based scheme this generally leads to an actual value of $v_1 \geq V_k$, which is to be delivered.

Under an error-based scheme, a KPI of $v_2 \leq V_k = v_1 - x$ may be delivered Since $cdf(v_1-x) \geq cdf(v_1)$ by monotonicity, then an error-based approach will result in the same or more inventory available.

Lemma 7: Error-based approach is smoother than constraint-based approach. A smooth function is defined as a function that is differentiable at all points up to a given order of differentiation. A function is not smooth if it has a discontinuity, or transitions from a derivative to zero. Smoothness is desirable for advertisers, so that if they make a change in a KPI or target value, the change in spending is of a similar scale. We will now show that error methods are smoother than constraint methods.

Consider the change in spend given change in KPI value;

$$\frac{\delta B}{\delta v_k}.$$

since mere is an exponential reduction in inventory available with each additional KPI constraint, the probability of the cumulative density function (c.d.f.) having zero inventory available, stays the same or increases as an exponential function. In contrast to the above, by Theorem 1, under an error-based approach, the inventory available is constant both with respect to kpi threshold changes, and also number of kpi targets added. Therefore, the probability of a change in spend being smooth, given a change in kpi threshold, or addition/removal of KPI constraint, is lower than when an equivalent threshold change or KPI add/remove is performed using an error approach.

Step 5: Submit the Bid to the Auction

Submitting the bid usually involves responding with a bid-price. The bid price is then used, usually in a Generalized Second Price auction, to determine whether this particular advertiser "wins" the impression.

Step 6: Deduct Budget

If the ad wins the auction, then another callback will occur to indicate that the ad has won and that an ad creative (a javascript) should be served to the requesting publisher.

$$B_{t+1} = B_t - \sum_{i \in P(t)} b_i \cdot W_i$$

Step 7: Detect KPI Events and Update KPI Counters

KPI events can occur at any time. For example, if a user converts, clicks on an ad, and so on, then the ad script calls back to the ad-server to inform it that an event occurred.

The events that are detected include:
1. Viewability event: Ad was on-screen for more than 2 seconds continuously.
2. Completion event: Ad was viewed to completion.
3. Click event: User clicked on the ad
4. Conversion event: User purchased after seeing the ad.
5. In-Target: Although this could appear as a callback event, typically in online advertising this is generated by a separate process. Often a call to a third party measurement company such as Nielsen is made, and they independently measure the demographics of the requests; Then a periodic call is made to the measurement company and aggregated results on in-target are returned.

Many other KPI events may also be detected and which might be tracked by the advertiser also including:
6. ad Loaded: Ad script loaded the ad
7. progressDisplay0: Ad 0% of the way completed
8. progressDisplay25: Ad 25% completed
9. progressDisplay50: Ad 50% completed
10. progressDisplay75: Ad 75% completed
11. progressDisplay100: Ad completed view
12. paused: Ad was paused
13. playing: Ad is playing
14. viewCovered: Ad is being occluded
15. Click: Ad was clicked
16. Skip: Ad playback was skipped When these events are detected, the ad-server updates internal counters to keep track of the number of events attributed to each ad. The ad-sever has to match up the event to the ad—this is generally done by embedding a special code (RGUID) into the ad, and having the callback include the same code (RGUID). The ad-server then subtracts from the ad's count of KPI events:

$$V_{t+1}^k = V_t^k - \sum_{i \in P(t)} v_i^k$$

I. KPI Event Detection Example

Below is a detailed example for Viewability as an example of a KPI event.

A viewability callback is a HTTP request back to beacon servers owned by the ad server, which include embedded information in query parameters on various measurements of the ad on the page taken by the javascript.

One technique for accomplishing this uses the frame rate at which the flash player is rendering the content. When the content gets hidden in any way, like hiding the tab, or keeping it out of page, the flash player starts throttling and the rate at which it renders the content gets slower. By detecting the change in rate, it is possible to announce that the content is hidden. Several 1×1 pixels can be inserted to grid locations in the video player. The frame rate is then returned for each of these spots. We then calculate the percentage of the 1×1 pixels that are reporting that the player is not-occluded, and if that percentage exceeds 50% for 2 seconds continuously, then the ad can be regarded as viewable. Example code has been provided by the IAB to perform this kind of viewability detection (IAB, 2015c; 2015d).

The viewability return call includes the same unique "Request Globally Unique Identifier" (RGUID) that was originally embedded with the ad that was served to the publisher site. Thus the ad serve event can then be linked with the viewability event using the RGUID. Ad serve events that don't have a corresponding viewability return event are deemed non-viewable.

After generating ad serve and viewability events, it is then possible to analyze what types of browsers, operating systems, times of day, and other request characteristics, are associated with higher viewability and lower viewability.

An example KPI event call-back is below:
http://log.adaptv.advertising.com/
log?event=error&sellerDealId=&buyerDealId=
&lastBid=&errNo=996&pricingInfo=&nF=
&adSourceId=775858&bidId=790691&afppId=
&adSourceMediaId=3332284736627681&adSpotId=
&pet=preroll&pod=−2&position=-
2&marketplaceId=&app_storeurl_available=0&app_
bundle=&location_available=0&adSpotTime=5481&ext_
crid=&creativeId=339635&adPlanId=-
2&adaptag=&key=bluewaterads&buyerId=
3597&campaignId=90523&pageUrl=embed.sendtonews.
com/player/sidebar.php?pkey=pssfs3zz&width=300&cid=
5547&sound=no&adapDetD=sendtonews.
com&sellRepD=&urlDetMeth=3&targDSellRep=
0&mediaId=287713&zid=&url=&id=&duration=
&a.geostrings=&uid=1933196731341967468&apid=
VA25dabf0c-57a9-11e6-b838-

0279f7e43edd&pid=&htmlEnabled=false&width=300&height=200&context=pubid=stnus&categories=&sessionId=&serverRev=607281312&playerRev=30f2503&a.rid=be2c0975-5217-4bab-af5b-2d01c20dae64&a.cluster=0&rtype=ah&ext_id=&a.ssc=1&a.asn=ip-10-49-141-253&a.profile_id=0&p.vw.viewable=1&p.vw.viewableOpportunity=0&p.vw.psize=1&p.appListTime=1470029465395&p.vw.callbackTime=1470029466145&p.vw.domId=videoPlayer&p.vw.area=60000&a.sdk=adaptv&a.sdkType=flash&a.appReq=0&a.sscCap=0&a.plafformDevice=ONLINE_VIDEO&ipAddressOverride=142.234.102.198&a.plafformOs=Windows7&p.vw.active=1&a.rtbexch=&a.pub_id=&device_id_status=3&a.ts=0&platformDealId=&a.adSeq=0&isHttps=0&eov=26801441&errorCode=901&p.vw.framerate=1&p.vw.geometric=-1&crTagResTime=824&adNumber=1&fv=WIN22,0,0,210&adListResTime=1320&pubStartCall=0&totalAds=5&pubInitCall=20&p.vw.hasFocus=-1

Step 8: Calculate New KPI and Budget Targets (Feedback Control System)

The above error minimization system may incorporate feedback from missed previous targets in a way that facilitates convergence. It does this by using error which is computed by comparing the original target to the current controller target. In this section, we describe the PID Feedback Controller which refines the error measurement.

I. Integral Error Control

A key principal for advertising systems is most advertising campaigns are not concerned about the outcome of an individual impression, but instead consider about how close they are to target at the end of a given period. Therefore, if there is error on any impression, those errors can be addressed on the impresions to follow. In order to do this, we can update our target KPIs as the advertising buy progresses. Given n impressions seen out of $I_0$ impressions expected over the full period, we can update the remaining price and value as follows:

Budget, KPI and Impressions prior to start of optimization (i.e. at time period t=0, or the original targets prior to start of optimization) are equal to:

$$B_0 = \frac{B}{I^*}; V_0^k = \frac{V^k}{I^*}; I_0 = \frac{I^*}{T}$$

Where I* is the predicted number of impressions over all time periods, B and $V^k$ are supplied by the advertiser and represent Budget and KPI targets over all time periods, and T are the number of time periods. The KPI and Impressions for each completed time-period x (i.e. "actual result" for time period t) are equal to:

$$B_t = \frac{\sum_{i \in P(t)} W_i \cdot b_i}{I_t}; V_t^k = \frac{\sum_{i \in P(t)} W_i \cdot v_i^k}{I_t};$$

$$I_t = \sum_{i \in P(t)} W_i$$

Budget, KPI and Impressions targets for each new time-period t become equal to:

$$V_t^{k'} = \frac{V^k - \sum_{\tau \in 1 \ldots t} I_\tau \cdot V_\tau^k}{I_t'}; B_t' = \frac{B - \sum_{\tau \in 1 \ldots t} I_\tau \cdot B_\tau}{I_t'}; \quad (15)$$

$$I_t' = \frac{I^* - \sum_{\tau \in 1 \ldots t} I_\tau}{T - t}$$

This creates a feedback-control for the above impression-level bid price calculation. If the system consistently does poorly on a KPI, its error will grow, and eventually the optimizer will begin to put more emphasis on moving to its optimum price.

For example, given $$V_t = 0.70; T = 100; t = 40; B_t = 100;$$

$$CPA_t = \frac{100}{0.70} = 142.85; E[V_{1 \ldots t}] = 0.5; E[B_{1 \ldots t}] = 1$$

then the algorithm gives us $$V_t' = 0.83; CPA_t' = \frac{60}{0.83} = 72.28.$$

Note that after 40% of the impressions, CPA has dropped about in half, so much cheaper impressions now need to be purchased.

Lemma 8: Equation (15) and (11) implement a PID integral controller

A PID controller applies a correction as a function of parameters parameter 2L multiplied by (a) a Proportional error term, i.e. error last cycle, (b) Integral error, i.e. the sum of accumulated error so far, and (c) Derivative of error, or the change in error from one iteration to the next.

$$u_i = \lambda_{PROP} \cdot \delta_i^k + \lambda_{INT} \cdot \sum_i^n \delta_i^k + \lambda_{DIFF} \cdot (\delta_i^k - \delta_{i-1}^k)$$

Let's consider the error calculation defined by equation (11). Combining (11) and (15) we have:

$$\delta_i^k = \quad (16)$$

$$\frac{(I_0 \cdot V_0^k - \sum_i^n v_i^k)/(I_0 - n)}{V_0^k} = \frac{((I_0 - n) \cdot V_0^k + \sum_i^n (V_0^k - v_i^k))/(I_0 - n)}{V_0^k} =$$

$$\frac{(f \cdot I_0 \cdot V_0^k + \sum_i^n err^k)/(f \cdot I_0)}{V_0^k} = 1 + \left(\frac{1}{V_0^k \cdot (I_0 - n)}\right) \cdot \sum_i^n err^k$$

Let $\lambda_{INT} = \frac{1}{v_0^k \cdot (I_0 - n)}$. Then (16) becomes:

$$\delta_i^k = 1 + \lambda_{INT} \cdot \sum_i^n err^k \quad (17)$$

This is a PID controller, but with parameter $\lambda_{INT}$ increasing as the end of the period approaches, and with a bid actuator mechanism that is a function of $\delta_i^k$.

The above basic design calculates the error that would provide a "return to reference signal" by the end of period. However, this results in a slow controller response that could be problematic in the real world. Consider an advertiser who is running a campaign which will run over a full year (52 weeks). In week 1 they under-perform on their KPI by about 50%. The adjusted KPI target will now only increase by about 1%, since there are still 51 weeks remaining to make up the under-performance. However, if the low performance is due to systematic bias in the predictions $v_i^{k*}=c \cdot v_i^k$, then if the bias is large, the control adjustment (0.01 initially) may be inadequate to return the system to its reference signal by the end of period. This can result in the control system being "stranded" with performance that is too far from target to reach its target.

The risk of a systematic bias in the underlying predictions is high in real-world conditions—machine learning models are refreshed periodically, and in the intervening time, conditions can change significantly. It would therefore be prudent to design a feedback control component responds faster than the integral controller described above.

II. Sub-Periods

The purpose of sub-periods and look-ahead are to improve the responsiveness of the controller feedback. Sub-periods simply divide the problem into N sub-periods and optimizes each. Rather than approach a monolithic period with the "slow feedback" problem, we experimented with dividing the full period T into a set of discrete sub-periods s1, s2, . . . , sT, each of which would be optimized independently. For example, if an advertiser wants to run a 3-month campaign, then each week the system re-initializes and attempts to achieve 1-week sub-period goals. If there is any overage or under-age, then that can be rolled into the next week.

III. Finite Look-Ahead Integral Error Control

Another way of improving response speed is a method we call "Finite Look-ahead" Integral Error control.

The problem with integral control is slow feedback in the face of a different environment. We could think of there being two extremes for solving this problem:

time window L can be conveniently set to a unit that corresponds with a human recognizable period of time—for example, it may attempt to return to reference signal within 1 week or 1 day. We then adjust the targets to If $t + L < T$ then (16)

$$I'_t = \frac{\left(I - I_0 \cdot n - \sum_{\tau \in 1 \ldots t} I_\tau\right)}{L}$$

$$V_t^{k'} = \frac{\left(V - V_0^k \cdot I_0 \cdot n - \sum_{\tau \in 1 \ldots t} I_\tau \cdot V_\tau^k\right)}{I'_t}$$

$$B_{c'} = \frac{\left(B - B_0 \cdot I_0 \cdot n - \sum_{\tau \in 1 \ldots t} I_\tau \cdot B_\tau\right)}{I'_t}$$

where $n = (T - L - t)$ otherwise if $t + L < T$ then use (15)

n is the number of time periods that we expect to have "nominal" performance after the look-ahead, which means performance exactly at $I_0$, $V_0^k$, and $B_0 \cdot I_0$. The above targets are meant to return the system to reference signal in L time periods.

Near the end of the time period, the look-ahead period would extend beyond the end of the campaign, so at this point if t+L<T then we simply use (15) (i.e. we only calculate targets through to the end of the period; we don't use look-ahead).

The above modification creates a much more responsive controller that will attempt to return to reference signal within period L. The following is an example implementation of lookahead using Matlab:

```
1. its_during_equal_delivery = iterations − (lookahead_iterations + it);
2. imps_during_equal_delivery = its_during_equal_delivery .* (impressions_budget_orig ./ iterations);
3.
4. if lookahead_iterations == 0 || it+lookahead_iterations >= iterations,
5.    desired_imps_this_cycle(it,1) = impressions_budget ./ (iterations-it+1);
6. else
7.    desired_imps_this_cycle(it,1) = (impressions_budget − imps_during_equal_delivery) ./ lookahead_iterations;
8. end;
9.
10. if lookahead_iterations>0 && it+lookahead_iterations < iterations,
11.    kpi_during_equal_delivery    = its_during_equal_delivery .* (kpi_budget_orig ./ iterations);
12.    spend_during_equal_delivery  = its_during_equal_delivery .* (spend_budget_orig ./ iterations);
13.    desired_kpi_this_cycle(it,1)    = (kpi_budget − kpi_during_equal_delivery)    ./ lookahead_iterations;
14.    desired_spend_this_cycle(it,1) = (spend_budget − spend_during_equal_delivery) ./ lookahead_iterations;
15. kpitarg(it,1:kpis)    = desired_kpi_this_cycle(it,1)./desired_imps_this_cycle(it,1);
16.    ecpm_calculated(it,1) = 1000.*desired_spend_this_cycle(it,1)./desired_imps_this_cycle(it,1);
17. end;
```

1. If the system uses the entire period, it may respond too slowly.
2. If the system needed to return to reference signal within the next impression or minute, the system would be highly inefficient, over-reacting to every noise.

Somewhere between these two extremes we should have a more responsive system.

Let us define a time window look-ahead L in which we will design the controller to reach its reference signal. The IV. Proportional Error Control PID Controllers offer a "proportional error" term which is calculated from the immediate difference between system output and reference signal. The problem with online advertising is that the KPI events are delayed and arrive at variable times. There generally isn't immediate feedback from the auction, except for bid price.

However, we can instead design a proportional error term that is based on a recent time window g. Let $$V_t^k = V_0^k + \frac{g \cdot V_0^k - \sum_i^g v_i^k}{g}; B_t = B_0 + \frac{g \cdot B_0 - \sum_i^g b_i}{g}; \quad (16)$$

$$CPA_t = \frac{B_t}{A_0 + \left(g \cdot A_0 - \sum_i^g a_i\right)/g}$$

The above control settings would effectively seek to have KPIs fully compensate for the error experienced during time window g, within the next time period. This design ignores earlier errors for which the system has not as yet compensated.

Ignorance of earlier errors can actually be a virtue in some cases, depending upon the advertisers objectives. Whereas the Fast Integral Error controller can get into a state in which it is impossible to reach the desired KPI setting by the required period of time, the Proportional controller doesn't retain memory for earlier over-shoots, and so will continue to try to compensate.

V. PID Controller

We can combine the Proportional and Integral solutions above so as to implement a PID Controller. The KPI target $V_t^k$ becomes a combination of the Integral, Proportional Error solutions.

$$V_t^k = \frac{(\lambda_{PROP} \cdot V_{PROP}^k + \lambda_{INT} \cdot V_{INT}^k + \lambda_{DIFF} \cdot V_{DIFF}^k)}{\lambda_{PROP} + \lambda_{INT} + \lambda_{DIFF}}$$

VI. PID Controller Behavior

Lemma 9: If system is over-performing against KPI goals, it will bid higher: If a KPI k is exceeding its original goal, then $V_t^k < V_0^k$. Assuming equally performant traffic $v_i^*$, the bid price of $(v_i^*/V_t) \cdot b_i^* > (v_i^*/V_0) \cdot b_i^*$. In the limit of the target remaining approaching zero, the bid price goes to infinity. $\lim V_t \to 0 \{(v_i^*/V_t) \cdot b_i^*\} = \infty$.

The fact that the bid price increases in proportion to its over-performance may be surprising. In fact, as the system approaches completion of its KPI goals $V_t \to 0$, the bid price grows; when the goal required reaches zero (ie. no further KPIs needed to reach the goal), then bid price reaches infinity. However, there is a rationale for this behavior:

If the system is over-performing, then it is able to re-invest the budget that it "saved" with the over-performing traffic, back into buying new traffic. This could be considered prudent because the auction environment is dynamic, and it is possible that auction conditions may change; e.g. a new bidder may come online and make things more expensive, or the predictability of traffic may decrease or become biased. The system takes a "risk mitigation" stance (rather than a cost minimization strategy) and utilizes all additional budget to improve its KPI bidding. This can lead to a "rush to the finish" if auction conditions are stationary, where the system is able to over-perform and bid higher.

Lemma 10: If system is under-performing Cost Per X KPI goals then it will lower bid price: If a KPI k is under-performing its original goal, then $V_t^k > V_0^k$ and $(v_i^*/V_t) \cdot b_i^* < (v_i^*/V_0) \cdot b_i^*$.

Lowering the bid price will make purchases far more efficient on the auction. Spend decreases with lower bid prices and the Cost Per X decreases also. Thus if the system is failing its KPI goals, then the system will respond by becoming far more efficient in terms of its spend.

Lemma 11: If system is under-performing on Rate KPI goals, it will increase the Rates being purchased: If a KPI k is under-performing its original goal, then $V_t^k > V_0^k$ and $(v_i^*/V_t) \cdot b_i^* < (v_i^*/V_0) \cdot b_i^*$.

Lowering the bid price will make purchases far more efficient on the auction. Spend decreases with lower bid prices and the Cost Per X decreases also. Thus if the system is failing its KPI goals, then the system will respond by becoming far more efficient in terms of its spend.

In the paragraphs above we have discussed the overall steps involved in the system. We next describe some modifications, enhancements and variations that we have found to be useful in practice.

Controller Improvements and Variations

I. Squared Error

Squared ratio error can provide a better representation of advertiser success or failure than the $$\delta_i^k = \left(\frac{V_t^k}{V_0^k}\right)^2 \quad (17)$$

linear ratio introduced earlier.

Squared error accentuates the errors of KPIs that are failing to meet their goals $$\frac{V_t^k}{V_0^k} > 1,$$

and also depresses the errors of KPIs that are exceeding their goals $$\frac{V_t^k}{V_0^k} < 1.$$

In addition, the squared term accentuates high errors, so a KPI that is missing its KPI by 50% (eg. ratio of 1.5; error 2.25) produces a much higher error than a KPI that is missing its goal by 10% (ratio 1.1; error 1.20).

Figure 9A:
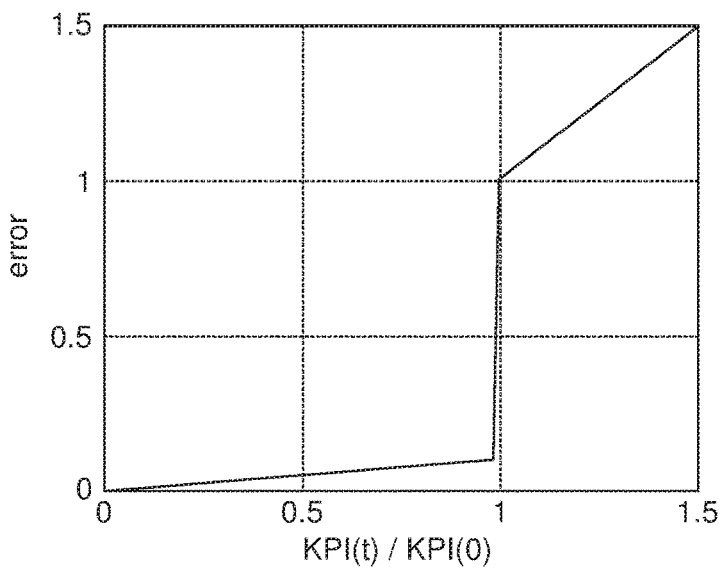
FIG. 9A-9E illustrate the use of different KPI and Pacing error penalty functions in accordance with embodiments of the present invention.

FIGS. 9A-9E further illustrate variations of squared and un-squared error. FIG. 9A shows that errors for KPIs that are under-performing, the error is significantly higher than KPIs that are exceeding their targets. In this regard, for errors for KPI/KPITarget<1, which indicates that they are exceeding their targets, errors are reduced. That causes the system to focus on the under-performing KPIs and "de-weight" the importance of KPIs that have exceeded their targets. This KPI error penalty function is asymmetric, meaning that values missing their target are penalized heavily and values meeting and exceeding target are penalized minimally.

Figure 9B:
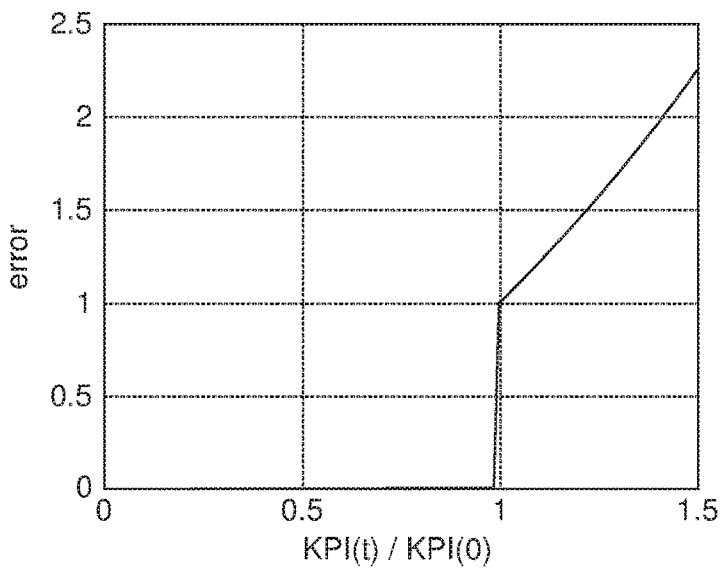

FIG. 9B is a graph of squared error as a function of KPI/KPI Target (KPI performance over KPI performance desired); r=0.1. This figure shows that squared error further decreases KPIs that are exceeding their goals. It also accentuates higher errors, so for example a KPI that is 1.5 (50% over goal) has that error further increased to 2.25.

Figure 9C:
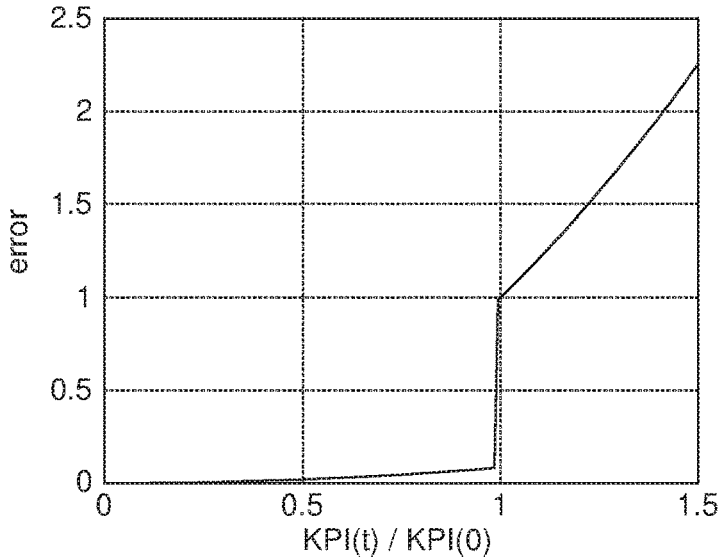

FIG. 9C is a graph of squared error (r=0.3) with lower de-scaling factor.

Figure 9D:
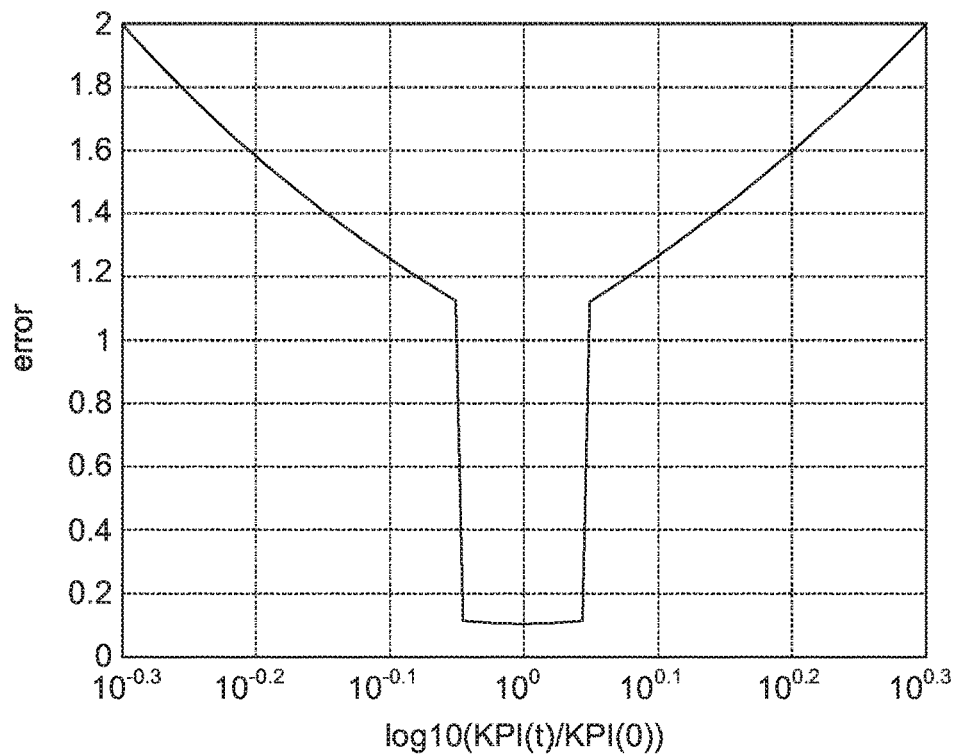

FIG. 9D is a squared error graph with r=0.1 and ⌐=0.1. Symmetric error is used for pacing—to ensure that the system prioritizes pacing if it falls outside of an acceptable range. This graph shows that errors for KPIs that are higher than their original value (meaning that they are under-performing) are significantly higher than errors for KPIs<1, which indicates that they are exceeding their targets.

Figure 9E:
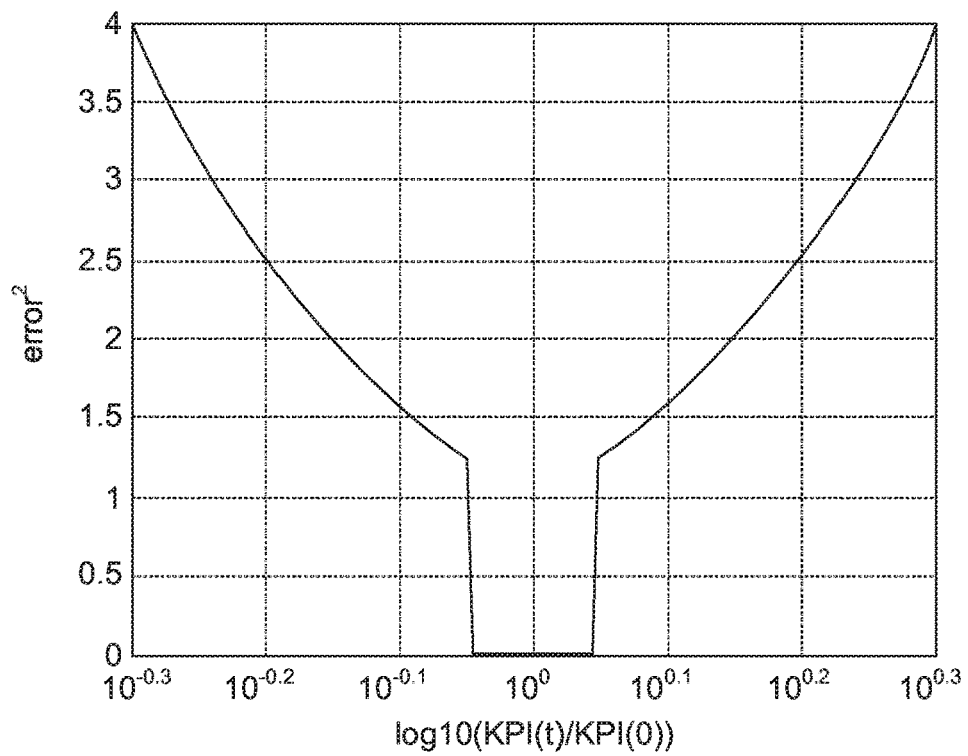

FIG. 9E is a squared error graph illustrating symmetric error with r=0.1 and ⌐=0.1.

II. Max Bid Cap

Some of the formulae discussed previously can lead to large bid prices. For example, as the target becomes very small, bid price becomes very high, and eventually infinite after the target is reached; $\lim V_t \to 0\{(v_i^*/V_t)\cdot b_i^*\}=\infty$. Large bid prices can introduce risk to the advertiser. If the bid price is submitted and clears, then the advertiser may find their entire budget exhausted in just 1 impression, and if the prediction of value is incorrect, then they may derive no value at all from this single rogue impression. It is therefore prudent to ensure that bid prices don't grow too high. In order to do this we set a limit on the highest bid price that we submit to the auction, as being a multiple $MAX_{OVER-BID} \geq 1$ of the pacing price $b_i^P$.

$$b_i^* = \min(b_i^P \cdot MAX_{OVERBID}, b_i^*)$$

III. KPI Buying During "Catch-Up"

One side-effect of having linearly combined KPIs is that they can sometimes act in opposition to each other. In some cases, we can identify the contra-movement ahead of time and add logic to improve the goal chasing behavior.

One example of an unnecessary contra-action is when the system is under-delivering $b_i^P \geq B_0$, and so must increase its bid price, and where traffic is also detected to be above average in quality, to the extent that $b_i^k > b_i^P$. In this case, the pacing term $b_i^P$—which is responsible for increasing the spend rate—actually drags the bid price down from $b_i^k$. Yet a higher spend is desirable since we are in a "catch up" situation, with $b_i^P \geq B_0$. In this case we could have submitted the higher price $b_i^k$ which would have helped us to "catch up" faster as well as increasing the likelihood of buying unusually high performing traffic. In addition, this also submits a better price for KPI performance. All that we've done is "speed up" the pacing term's return to baseline, but only when high quality traffic is also detected. In order to take advantage of this situation, we can simply eliminate the pacing term by setting the error for pacing to zero $\Delta_i^P = 0$, if we determine that we are in the situation above.

$$\text{if } b_i^k \geq b_i^P \geq B_0 \forall_k \text{ then } \Delta_i^P = 0 \tag{18}$$

$$\text{if } b_i^k \leq b_i^P \leq B_0 \forall_k \text{ then } \Delta_i^P = 0 \tag{19}$$

To further illustrate this point, the following is an example of Matlab code for "Speedup":

```
1. if speedup==1,
2.   if desired_imps_this_cycle(it,1) ./ (impressions_budget_orig./iterations) > 1,
3.     % catching up
4.     Bidkpi = kpiratio .* ecpm_calculated(it);
5.     i = find(bidkpi > bid_for_desired_imps(it));
6.   else
7.     % slowing down
8.     bidkpi = kpiratio .* ecpm_calculated(it);
9.     i = find(bidkpi < bid_for_desired_imps(it));
10.  end;
11.  if ~isempty(i),
12.    kpibid(i) = bidkpi(i);
13.  end;
14. end;
```

In practice this modification enables the system to pursue higher quality KPI traffic, and simultaneously increase the speed of its "catch up" for budget.

A similar situation exists if the traffic is deemed low value, and the system has so far over-spent, so is trying to reduce its spend $b_i^k \leq b_i^P \leq B_0$. In this case, the pacing price could actually "force" the system to continue to bid higher than the value of the traffic warrants, and even though the system as a whole is trying to slow down its spend. Under this condition, the system can also ignore the pacing price and use the price for the value of the traffic only, which will result in a larger "slow down" and so quicker return to budget reference, whilst also avoiding being forced to buy into traffic that is lower-than-usual quality.

IV. Buy Above Original

We noted earlier that Rate goals can be achieved using equation (9) and (10). Unfortunately, it is possible that the required rate may over time become impossible to achieve (e.g. after using the control system, it may reach 1.01 KPI events per impression, and there may be no inventory that has a rate that high).

In order to address this, the advertiser can use a mode in which the system sets the KPI target to the smaller of the required KPI target as calculated by the controller, or their original KPI target.

$$V_t^k = \min(V_t^k, V_0^k)$$

The following pseudo-code is an example implementation of "Buy above original":

```
1.   buyaboveorig==1,
2.     ii = min(find(kpipred < min([kpitarg(it);kpitargorig])));
3.     if ~isempty(ii), bid(ii) = zeros(size(ii));end;
4.   end
```

This ensures that a "shut down" scenario doesn't occur. By buying at or above the original KPI target, the system will "better" its KPI. Under this mode, the price for rate KPI can no longer pseudo-guaranteed, however, as a practical matter, this may be preferable to having the system suspending bidding. For instance, cost Per X KPI and Budget KPI do not share the same "shut down" issue as Rate KPIs. If the controller sets a target for these KPIs that is difficult to achieve, the bid price ends up being a small fractional number. In contrast, Rate goals can move into a state in which they cannot possibly by satisfied.

V. Exact Target Mode

We noted earlier that errors are generally considered to be asymmetric, meaning that if the KPI exceeds its target, the error is significantly reduced by factor r. As long as r is small, then the error for KPIs still yet to achieve their targets will be large compared to the KPIs that are exceeding their targets. Furthermore, if all KPIs exceed their targets, the system will continue to put resources into bettering these KPIs, with most resources going to the KPI that exceeds its target the least.

However, it is possible to also use a symmetric error function for all of the KPIs. We do this by replacing equation (12) with (12.2) which was the error function we used for pacing, and instead use that function for all KPIs. Thus, KPIs attract error if they are above or below the target.

$$\Delta_i^k = \begin{cases} 1/\delta_i^k, & \text{if } \delta_i^k \in [0 \ldots 1-\varepsilon) \\ r \cdot 1/\delta_i^k, & \text{if } \delta_i^k \in [1-\varepsilon \ldots 1) \\ r \cdot \delta_i^k, & \text{if } \delta_i^k \in [1 \ldots 1+\varepsilon) \\ \delta_i^k, & \text{otherwise} \end{cases} \quad (12.2)$$

The next change is that bid price also needs to change to in fact pay less for incoming traffic that is higher than the target performance, i.e. for CPA KPIs:

$$b_i^* = \begin{cases} \left(\frac{v_i^*}{V}\right) \cdot CPA_t, & \text{if } v_i^* \leq V \\ \left(\frac{V}{v_i^*}\right) \cdot CPA_t, & \text{if } v_i^* > V \end{cases} \quad (9.2)$$

Rate KPIs use the following modification to also bid less above the ideal rate target:

$$b_i^* = \begin{cases} V/c(v_i) \cdot CPA_t, & \text{if } c(v_i) \geq V \\ 0, & \text{otherwise} \end{cases} \quad (10.2)$$

This mode is useful for ad-servers that need to manage a limited pool of inventory. For example, with a limited pool of high viewability inventory, this mode will attempt to fulfill the advertisers targets, but avoid over-achieving on KPIs. If an advertiser currently only needs a 70% viewability rate, and traffic is coming in at 90%, the system actually lowers its bid a little on that traffic by a little (22% reduction) which results in a lower win-rate on that traffic.

Whereas with asymmetric error, the bidding solution for CPA was consistent with economic value for the advertiser, under exact mode, the bidding solution for CPA no longer matches the advertiser's economic value. However, this departure only occurs above the advertiser's goal.

"Exact mode" often shows good results in achieving close to the exact KPI targets that were requested by advertisers. FIGS. 9C and 9D show the difference between the standard asymmetric error functions, and the "Exact mode" equations in this section.

VI. PBase

In some cases, guaranteed budget delivery is desirable. It may be desired to pursue KPI targets, but only assuming budget delivery occurs, and then KPIs should be pursued secondarily.

In order to create a guaranteed budget variant, the algorithm can be modified as follows remove Pacing from being treated as one of the KPIs (14.1), and instead use the pacing price as a "nominal pacing price" that essentially throttles the KPI bids. The formula then has two terms: (a) the current pacing price $b_i^P$ and (b) the predicted performance of the impression I. The predicted performance is the average performance for each KPI $KPI\_Perf_{i,k} = v_{i,k} * N_k$ where 1 indicates performance equal to the target needed, performance higher than 1 indicates performance $KPI\_Perf_{i,k}$ times higher, and lower than 1 indicates performance $1/KPI\_Perf_{i,k}$ lower. The bid calculation in 14.1 now changes to 14.3:

$$b_i^* = b_i^P \cdot \sum_{k \neq P} \Delta^k \cdot KPI_{Perf_{i,k}} \quad (14.3)$$

Observation: PBase Budget Convergence
There are three cases to consider:

$$c = \Delta^k \cdot KPI_{Perf_{i,k}} = 1:$$

In that case the bid submitted at each iteration will equal $b_i^P = B_t/I_t$ then assuming $I_t$ impressions remain, this will result in all budget being spent and iterations being spent.

$$c = \Delta^k \cdot KPI_{Perf_{i,k}} > 1:$$

In that case, at each iteration, a bid price higher than $b_i^P$ will be submitted. Since $b_i^P = B_t/I_t$ then assuming $I_t$ impressions remain, this will result in all budget being spent. The most under-shoot on impressions that we can expect would be the case when there is 1 iteration remaining, and all of the impressions $I_T$ still yet to be completed. In this case we would expect $B_T$ spend. The higher bid price means that more impressions may be won. However the worst case scenario is that the higher bid price results in the same number of impressions being won. If we consider that worst case scenario, then $$I_T/KPI_{Perf_{i,k}}$$

impressions will be captured at the cost of all of the budget $B_T$.

Consider the case of all traffic, $$c = \Delta^k \cdot KPI_{Perf_{i,k}} < 1$$

where $c \in (0 \ldots 1]$. In the worst case, there will be 1 iteration remaining and a bid price of $c \cdot b_i^P$ will be submitted. The price submitted will be between $[0 \ldots b_i^P]$. The worst case situation is a series of impressions which have close to zero predicted performance. If that occurs then bid price submitted will be a small fraction of $b_i^P$. The number of impressions won at low bid prices will vary between $0 \ldots W(b_i^P) = I_T$. Therefore the upper bound on closeness to budget will be equal to min $$KPI_{Perf_{i,k}}.$$

In summary the budget spent will range between $0 \ldots B_T$ and impressions captured will range between $$0 \ldots I_T. \text{ If } \frac{v_{i,k}^*}{V_k} = 1$$

then both impressions and budget will converge to zero. If $$\frac{v_{i,k}^*}{V_k} < 1$$

then impressions will reach zero, but spend will be incomplete. If $$\frac{v_{i,k}^*}{V_k} > 1$$

then spend will complete but impressions won't reach zero.

VII. Base Cut for Rate Variables

Basecut is a method for improving the KPI performance when the system is pacing. The method begins to create a lower threshold cutoff. The idea is that if the system is pacing, then it should start to "draw up" a cutoff (like a drawbridge keeping the "hordes" out—where the hordes in this case are our poor traffic), so that it starts avoiding low rate traffic (but only does this as long as it continues to pace).

If $B_t/B_0 < 1-\varepsilon$ then $c_{t+1} = c_t + \text{STEP}$

If $B_t/B_0 > 1+\varepsilon$ then $c_{t+1} = c_t - \text{STEP}$

The following is an example of Base Cut using Matlab code:

```
1. is_pacing = (desired_imps_this_cycle(it,1) ./ (impressions_budget_orig./iterations) < 1) ;
2.
3. if (is_pacing==1 && step>=0) || (is_pacing==0 && step<=0),
4.    step = 1.2 * step;    % go faster in same direction
5. else
6.    step = -0.3 * step;   % change direction and slow down
7. end;
8. if abs(step) < 0.001,
9.    step = 0.001 * step / abs(step); % clip step to 0.001
10.   % if step is too small, step becomes -0.001 or +0.001
11. end;
12. if cutoff + step > 1,     % clip cutoff to 1
13.    step = 1 - cutoff;
14.    cutoff = 1;
15. elseif cutoff + step < 0,   % clip cutoff to 0
16.    step = 0 - cutoff;
17.    cutoff = 0;
18. else
19.    cutoff = cutoff + step;
20. end;
21.
22. % Apply the constraint
23. ii = find(kpipred < cutoff);
24. if ~isempty(ii), bid(ii) = zeros(size(ii));end;
```

VIII. P90 Algorithm

P90 is a simple algorithm that can be useful when error control is not desirable—for example, when deterministic behavior is desired. The bid price calculation is as follows (replace equation 14.1 with 14.2 below):

$$b_i^* = \sum_k u^k \cdot b_{i,k} \quad (14.2)$$

where $u^k$ is a weight or preference that is set by the user. The above algorithm does not use feedback or error-based control, but instead simply uses a weight defined by the user for favoring different KPIs. P90 was used as a benchmark for live ad testing to verify that the algorithms were working as expected.

X. Common Controller Configurations

The various features described above can be switched on or off to produce different behavior. In embodiments, three specific configurations of KPI Controller can be employed and given specific names. Such configurations can be:

1. PX: Gradient descent on error
2. PBase: Gradient descent on KPIs but with guaranteed Budget Convergence, so using the Base price as a throttle (hence the name "PBase")
3. PX-Exact: The use of symmetric error and symmetric bid penalties to penalize delivery of targets over goal, so as to try to deliver KPI targets exactly.

These algorithms may frequently be used for advertiser campaigns. The table below highlights some of the features of each algorithm:

TABLE 14

Algorithm Features

| Feature | KPI Controller Configuration | | |
|---|---|---|---|
| | PX | PBase | PX-Exact |
| Squared error | X | X | X |
| Max Bid Cap | X | X | X |
| Improved KPI buying during catch-up | X | X | X |
| Shut-down avoidance on Rate KPIs | X | X | |

TABLE 14-continued

Algorithm Features

| Feature | KPI Controller Configuration | | |
|---|---|---|---|
| | PX | PBase | PX-Exact |
| Exact Target Mode | | | X |
| Guaranteed Budget Convergence (pacing throttle for KPIs) | | X | |
| Integral Error Control | | X | X |
| Fast Integral Error Control | X | | |
| Proportional Error Control | | | |

The example configurations above are implemented in C code using database-supplied C function pointers to indicate which functions comprise the configuration.

Simulations

In order to compare constraint approaches with the error-based algorithm discussed herein, an auction simulation can be used to illuminate the dynamics of each algorithm. Simulation pseudo-Matlab-code is shown below.

In order to run the simulation, we have to supply some missing functions: We assume T=50 time periods, each with $I_t$=300 impressions. The advertiser wishes to buy I=5000 impressions, and from these generate K=3500 KPI events, suggesting an initial KPI rate of $V_0^k$=0.70. The advertiser has B=50 dollars to spend, suggesting an average CPM $B_0$=10.

T=50; $I_t$=300; I=5000; K=3500; B=50; Z=5

These values incidentally match ABTests which are run on live ads and for which results are later presented. This simulation does not vary impressions throughout the day, or model other phenomena—the purpose is to focus on the behavior of the KPI controller, and changes are introduced later.

I. Simulation Loop

Each time period, we execute the following loop:
1. We have It impressions that are available to purchase.
2. Set the predicted value of each impression $v_i^k$ is a uniform random number between 0 and 1.

$$v_i^k = U(0,1)$$

3. Estimate the pacing bid price $b_i^P$: Ordinarily this would come from (5). However since we aren't modeling diurnal patterns, we need a simple solution for the pacing bid price $b_i^P$. In this simulation, the bid price which allows the system to buy $I_P$ impressions is modeled as a linear model, specifically that the probability of win is proportional to the bid price:

$$W_i = w \cdot b_i$$

w is calculated based on actual win results from the simulation:

$$w = \sum_i W_i^* \Big/ \sum_i b_i$$

The pacing bid price $b_i^P$ can then be calculated as follows: At each time t the controller wishes to buy $I_P$ impressions, which equals probability of win $W_i$ multiplied by total impressions during the cycle $I_t$. Using the formula for $W_i$ above we calculate $b_i^P$ as follows:

$$I_P = W_i \cdot I_t; \quad I_P = w \cdot b_i^P \cdot I_t; \quad b_i^P = \frac{I_P}{(w \cdot I_t)}$$

4. The KPI bid price and final bid prices are then calculated using the control processes described earlier (Section 5-6, Equations 6-14).
5. For each of the $I_t$ impressions, the impression i is "won" $W_i$=1 if the bid multiplied by a uniform random number is greater than a threshold Z.

$$W_i^* = U(0,1) \cdot b_i^* > Z$$

6. The actual value from the impressions is then set as $v_i^{k*}$ $$v_i^{k*} = v_i^k + \rho^k$$

$$\rho^k = \mu^k \cdot U(0,1) + \sigma^k \cdot N(0,1)$$

$v_i^{k*}$ represents the actual value of the traffic and is equal to predicted value $v_i^k$ plus $\rho^k$ and capped between 0 and 1 (not shown above). $\rho^k$ is a term representing possibly biased noise, and so we can model predictions that are systematically biased high, or low, for example.

7. The budget is then updated by subtracting winning bid prices.

$$B_{t+1} = B_t - \sum_{i \in P(t)} b_i \cdot W_i$$

8. KPI is then updated by subtracting winning impression actual values.

$$V_{t+1}^k = V_t^k - \sum_{i \in P(L)} v_i^k$$

9. Targets for budget and KPI calculated using the feedback control process. (Section 8, Equations 15-16).

The following is an illustration of a simulation loop in pseudo-Matlab code:

```
1.  T = 50;              /* number of time periods */
2.  P = 300;             /* impressions available during each time period */
3.  B(1) = 100;          /* budget to be spent   */
4.  I(1) = 1000;         /* impressions required   */
5.  K(1) = 700;          /* KPI required    */
6.  w(1) = 1;            /* weight on each kpi   */
7.  k(1)* = K(1)/I(1);   /* KPI target    */
8.  ecpm = 1000 * B(1)/I(1);  /* ecpm nominal price    */
9.  for (t=1,t<=T,t++) {
10.    for (i=1,i<=P,i++) {
11.      v(t,i) = U(0,1); /* predicted kpi perf = random number */
12.      b(t,i) = ecpm * sum(w(k) * v(t,i)/k(t,i)*) / sum(wk);  /* bid price */
13.      v(t,i)* = v(t,i) + N(0,s);    /* actual kpi perf    */
14.      W(t,i) = SIGN(U(0,1) * b(t,i) > Z);  /* wins       */
15.      I(t) = I(t) - W(t,i);    /* update impressions */
16.      B(t) = B(t) - b(t,i) * W(t,i);   /* update budget    */
17.      K(t) = K(t) - W(t,i) * v(t,i)*;  /* update kpi    */
18.      k(t,i)* = K(t) / I(t);       /* new kpi target    */
19.      ecpm = 1000 * B(t) / I(t);       /* new nominal ecpm target */
20.      if I(t) * (t/T) < (I(1) / T) {
21.        /* have bought enough - dont buy any more imps */
22.        break;
23.      } // if
24.    } // i
25.    /* copy forward the budgets for the next time period */
26.    I(t+1) = I(t)
27.    B(t+1) = B(t)
```

-continued

| 28. | K(t+1) = K(t) |
| 29. | } // t |

II. Phase Portraits

In order to test the ability of the system to converge, we start the simulation in a "perturbed state". We suppose that $T_{INIT}=5$ time periods have already been completed, and that for each time period $t\in[1 \ldots T_{INIT}]$, the system was offset from its ideal target $B_0$ and $V_0^k$ by a perturbation of $\varepsilon_P$ and $\varepsilon_k$.

$$(B_t,V_t^k)\in(\varepsilon_P B_0, \varepsilon_k V_0^k)$$

$$\varepsilon_P\in[0.5 \ldots 1.5]; \varepsilon_k\in[0.5 \ldots 1.5]$$

The perturbation values comprise the set between [0.5 ... 1.5] so as to measure how well the system converges from different performance perturbations. Since each perturbation $\varepsilon_P$ has 11 points, the above Cartesian product gives rise to 11×11=121 perturbation starting points in a grid pattern.

We next allow the simulation to proceed over the next time steps $t\in[T_{INIT} \ldots T]$, with the actual KPI controller functionality.

We finally plot the trajectory of the system in "dimensionless" coordinates that is referred to as "Target Space"—$(B_t/B_0, V_t/V_0)$. We plot the sequence of $T-T_{INIT}=50-5=45$ points $((B_t/B_0, V_t/V_0))\forall t\in[T_{INIT} \ldots T]$ on a 2D phase portrait. In this coordinate space, 1.0 indicates that the actual performance is exactly equal to the target. 1.5 indicates that the control system is 50% too high, and 0.5 indicates that the control system is 50% too low. We can summarize the convergence of the system by measuring the mean and standard deviation of the set of 121 trajectory end-points from each of the perturbation starting points: $(B_T/B_0, V_T/V_0)$. We will be interested how close to (1,1) the above trajectory endpoints are, and also the approximate spread of points, indicating how reliably the targets are being achieved given different starting conditions.

III. Algorithm Comparisons

FIGS. 10-20 show phase portraits—showing the trajectory of different algorithms in "target space"—under different conditions. Arrow x-y coordinates indicate the starting performance settings for KPI and Pacing (1.0 means on-target, <1.0 means under-performance and >1.0 over-performance), and the direction of the arrow intersects with the end parameter settings. The triangle is the desired trajectory end-point of pacing=1, kpi=1. The points indicate trajectory endpoints. A convex hull is shown around the points to highlight the range of the endpoints.

Pacing Only—Pacing but Poor KPI

Figure 10:
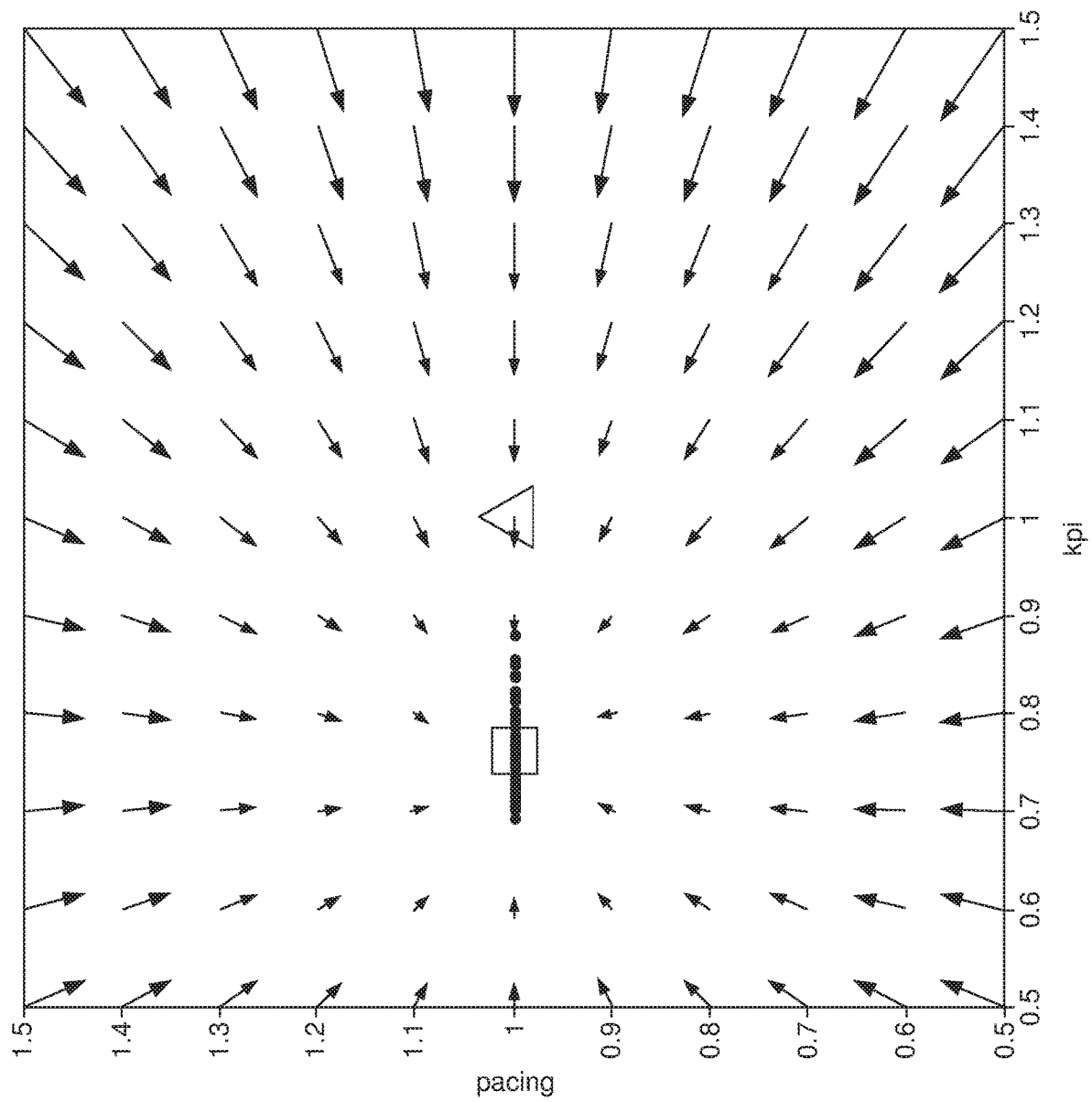
FIG. 10 illustrates a phase portrait for the Pacing-only algorithm, in accordance with embodiments of the present invention.

"Pacing only" shows the behavior of the system when it uses the pacing bid price for all impressions (FIG. 10). The Pacing-only or Pacing 100% algorithm works by buying up all of the traffic to which it is exposed, and simply allows its buying to be capped out as soon as it fills up the needed impressions during a particular time period. In the simulation there is no error on pacing, suggesting that the system has enough budget in order to buy the required number of impressions. However, without any discrimination in terms of what KPI to buy, the eventual KPI result is poor—around 0.75 in this simulation, which is equal to the mean for all impressions in the simulation. In FIG. 10, the y-axis is delivery achieved divided by delivery target (1.0 means impressions delivered were equal to the desired amount). x-axis is KPI achieved divided by KPI Target (1.0 means achieving the KPI target). Triangle represents the ideal (1,1) solution. The vectors show the trajectory of the control system from perturbed starting point to end state (dots). Square shows the mean for trajectory end-points. Pacing results in achievement of delivery goal (trajectories end at 1.0 on the y-axis), but poor KPI results (end-points are spread to the left below the KPI objective; the end-point varies with severity of initial perturbation).

Intuitively we would want a controller that is able to accept some error on pacing, in order to elevate the KPI metric. We show later that with more intelligent buying, the KPI performance can be improved to around 1.0 with almost no loss on pacing—essentially paying more for good impressions and less for poor impressions, whilst maintaining the same overall spending posture.

Constraints—KPI but Poor Pacing

Bidding for pacing delivers on pacing but poor KPI. To improve KPI performance, the simplest approach would be to start deploying constraints—if the incoming impressions fail to meet the required performance, then discarding these impressions. Advertisers may decide to target segments having a particular age-gender demographic, or viewability level, and ignore the rest.

Figure 11:
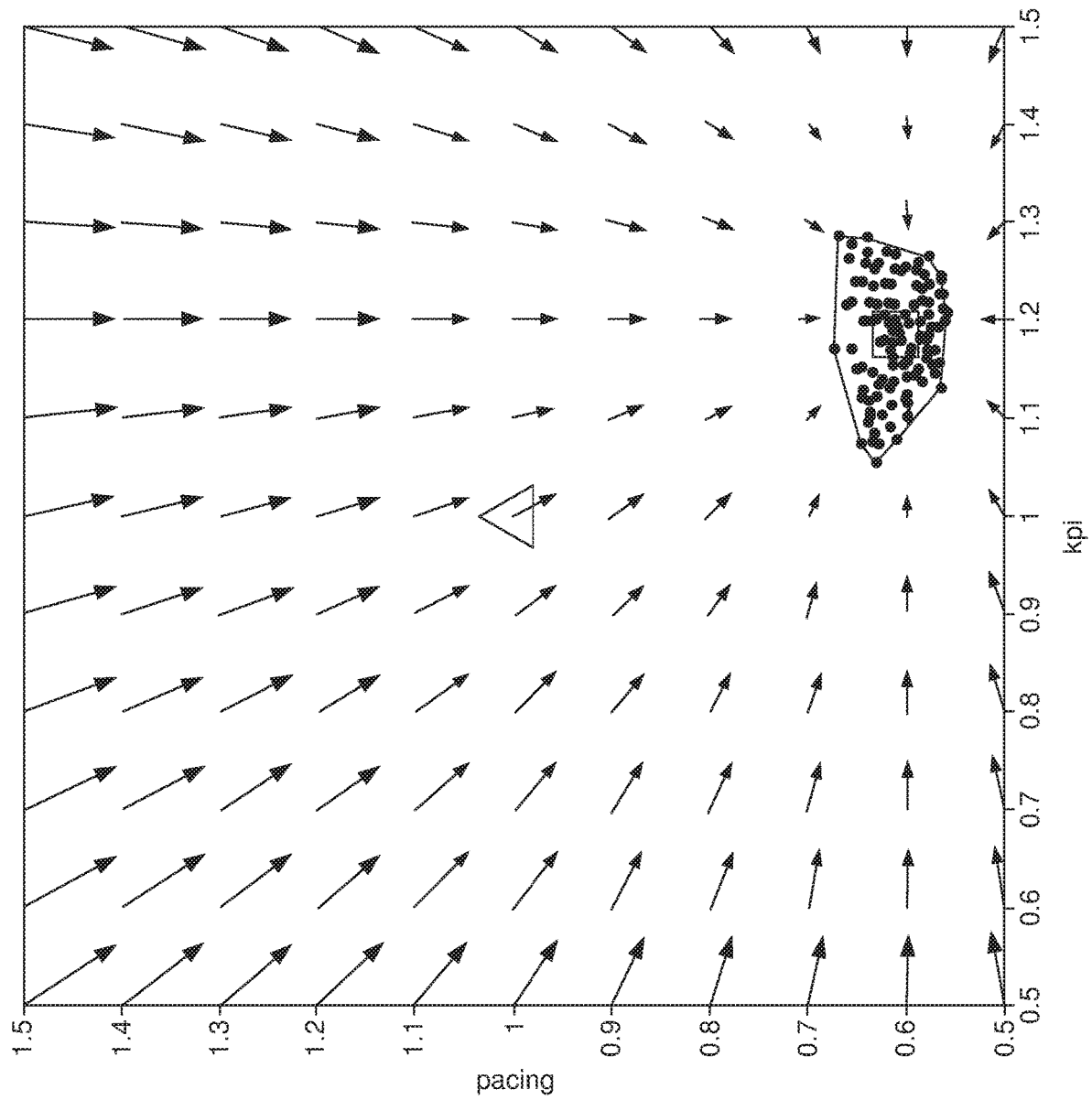
FIG. 11 illustrates a phase portrait for the Hard Constraint algorithm, in accordance with embodiments of the present invention.

FIG. 11 shows what happens when constraints are used. This first example shows a hard constraint—simply using the advertiser's original KPI target $V_0^k$, and filtering out traffic that doesn't meet that target, i.e. if $v_i^k<V_0^k$ then $b_1=0$. The Hard Constraint algorithm implements maximization of an objective but using a KPI constraint (eg. Viewability must be >70%—if the incoming impression fails this test then it is discarded). When hard constraints are used, the trajectories tend to terminate significantly under-paced (eg. 0.6) and above target on KPI (eg. 1.2).

The constraint approach results in a significant loss of inventory since much traffic is simply discarded or excluded as not having a KPI high enough. In the simulation, pacing reaches only about half (0.6) of the advertiser's desired target. Simultaneously, the KPI performance is overly high at 1.2. One would intuitively want to sacrifice some of the 1.2 KPI overage, in order to pull pacing up by 0.4.

Figure 12:
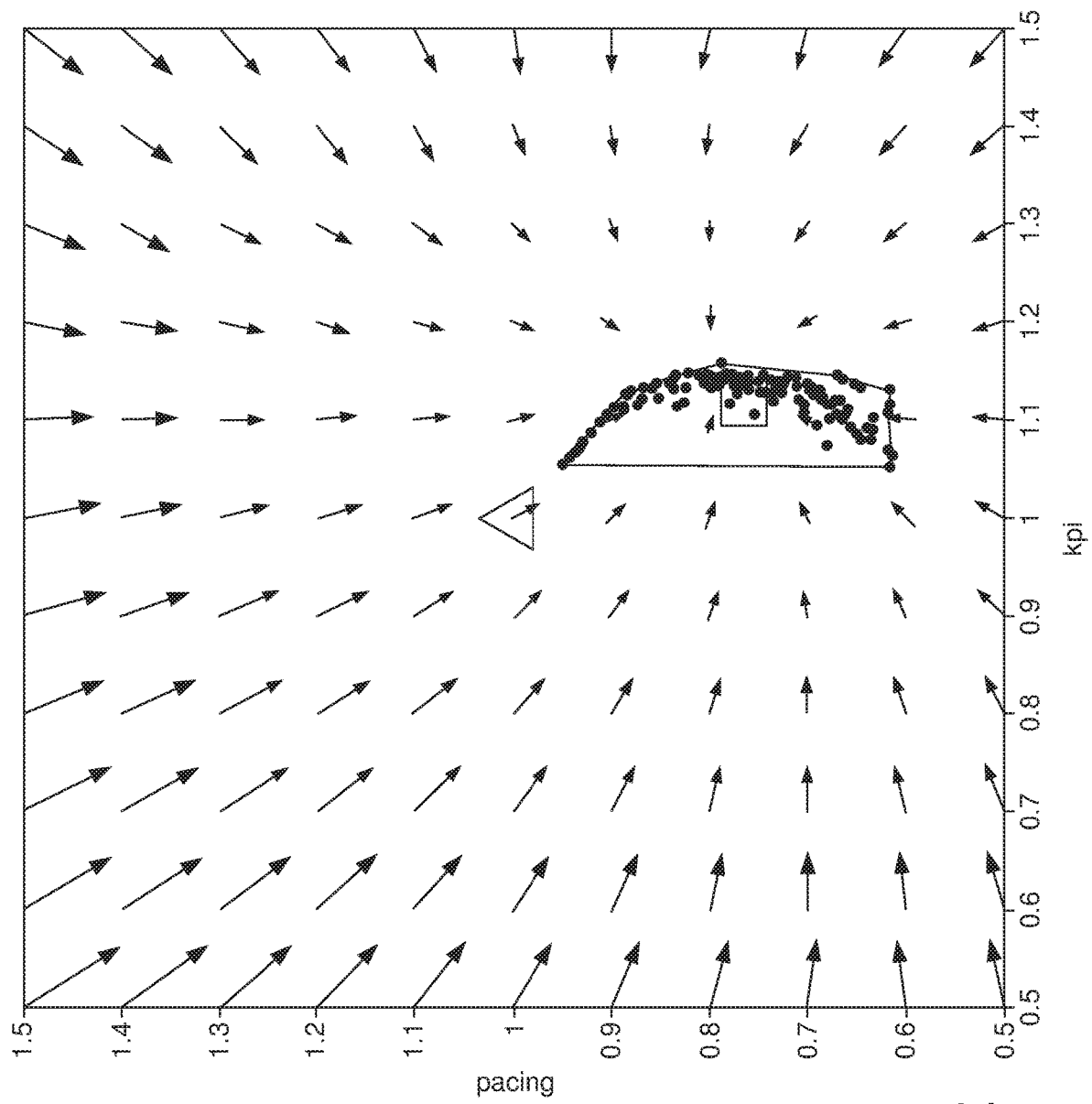
FIG. 12 illustrates a phase portrait for the Dynamic Constraint algorithm, in accordance with embodiments of the present invention.

FIG. 12 shows the performance of another constraint approach—dynamic constraints. This is where the advertisers target updates in response to error feedback, however where the traffic is still rejected if it is below the required target, i.e. if $v_i^k<V_t^k$ then $b_i=0$ where $V_t^k$ is computed via equation (15). This is a control system approach to KPI achievement, but still filters out traffic that is believed to be below target. The Dynamic constraint algorithm terminates under-performing on pacing (mean approx. 0.8) and slightly over on KPI (mean approx. 1.1). It would be ideal to use some of the overage on KPI to move the system to the (1,1) result. The Constraints push KPI results to be above target (right of the 1.0 vertical line), but result in problems pacing (below the 1.0 pacing horizontal line). Square indicates the mean of trajectory end-points. A convex hull surrounds the end-points.

Dynamic constraint does better on Pacing (0.75 vs 0.6) and the KPI is a little lower (1.1 vs 1.2). However this approach still suffers from low pacing, and overage on KPI.

Dynamic constraints have the same problems as hard constraints. If traffic is just below the currently required target, then it is excluded—yet there could be a lot of inventory that might be available for giving up a tiny fraction on KPI. For instance, we have evidence that due to the 70% IAB Viewability threshold, distortions may occur in some auctions, and pricing is unusually high above 70% viewability, and low below this threshold. Thus, in practice it is becoming more common that there is in fact an inventory advantage in buying below the 70% threshold. As a result, for a tiny reduction in KPI it may be possible to completely fulfill the pacing requirement.

Constraint methods ("hard" and "dynamic") are able to trivially deliver on the KPI goal, but only do so by potentially sacrificing pacing—indeed they could sacrifice all pacing. There may be more inventory at lower KPI values, and the ability to buy this inventory may both address the pacing problems, as well as enabling the system to offset its high KPI.

Px—Trade-Off Error on all KPIs

Whereas Pacing achieved pacing but with poor KPI, and Constraint methods achieved KPI but with poor pacing, our multi-KPI solution (in this simulation Px) is able to minimize error across both Pacing and KPI performance.

Figure 13:
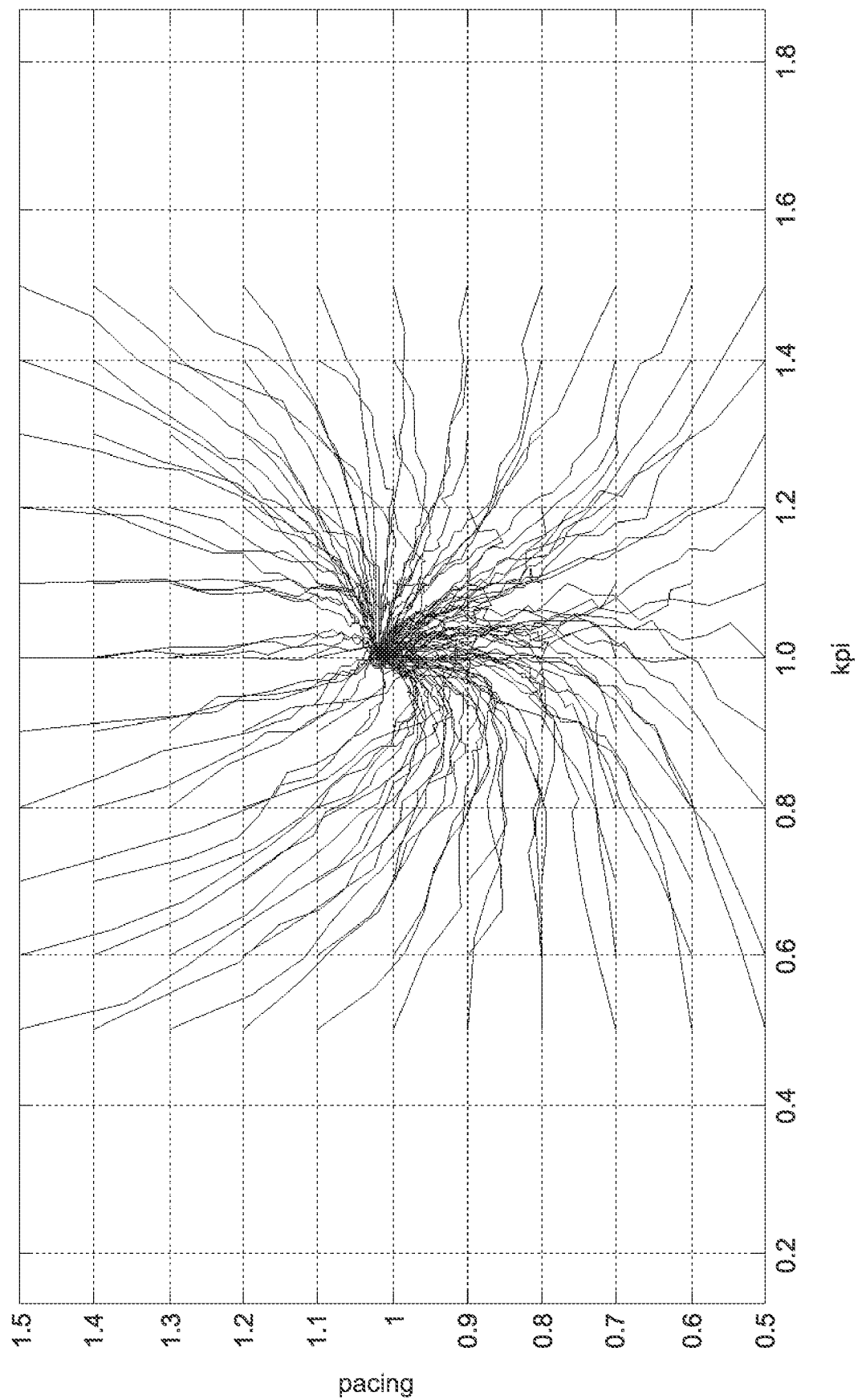
FIG. 13 shows a phase portrait with Px (pbase), in accordance with embodiments of the present invention.
Figure 14:
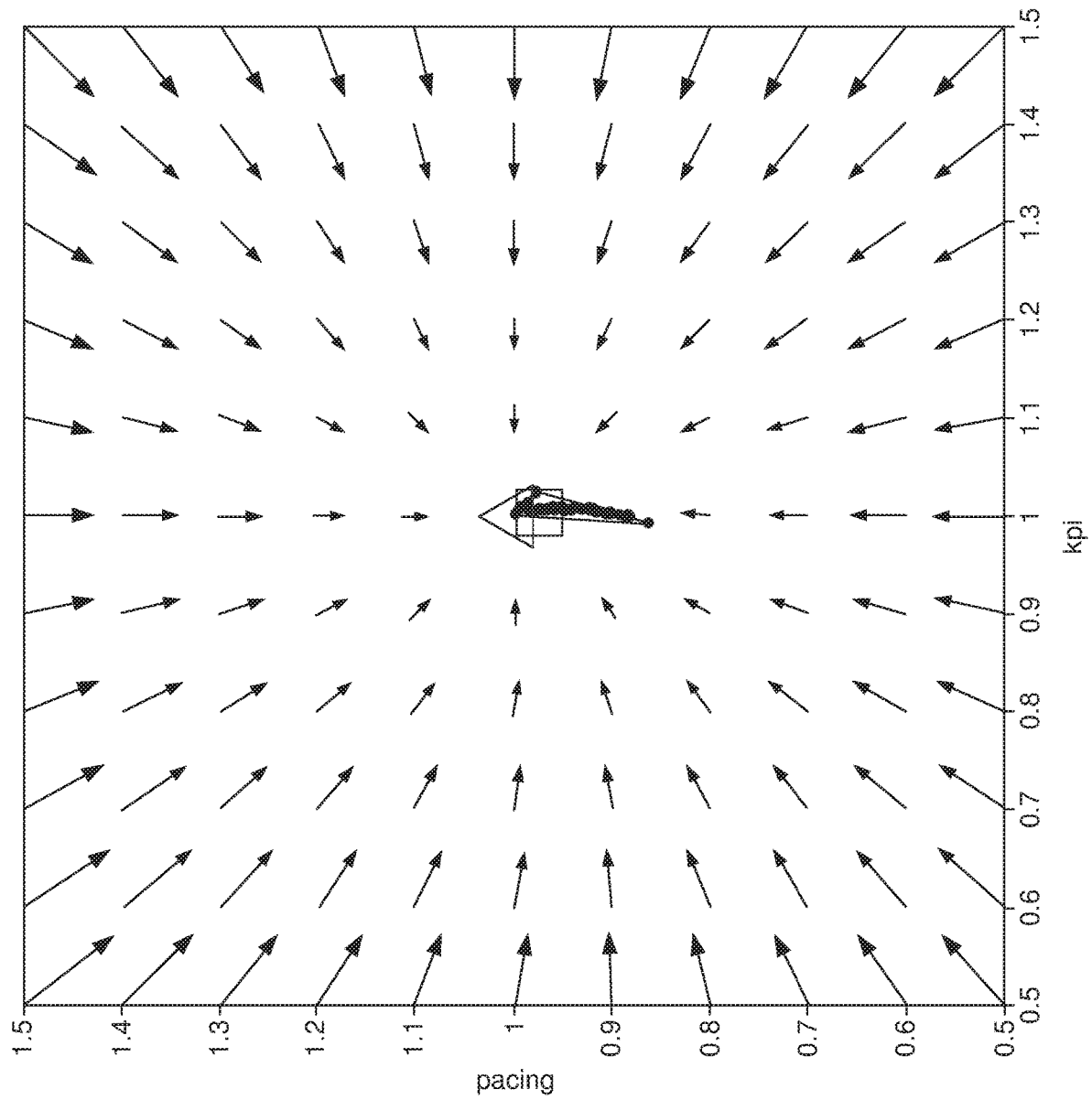
FIG. 14 shows a phase portrait for the Px Distribution algorithm, in accordance with embodiments of the present invention.

FIGS. 13-14 show Px (pbase). Px achieves the closest to the "bullseye" of pacing=1.0 and kpi=1.0.

Figure 15:
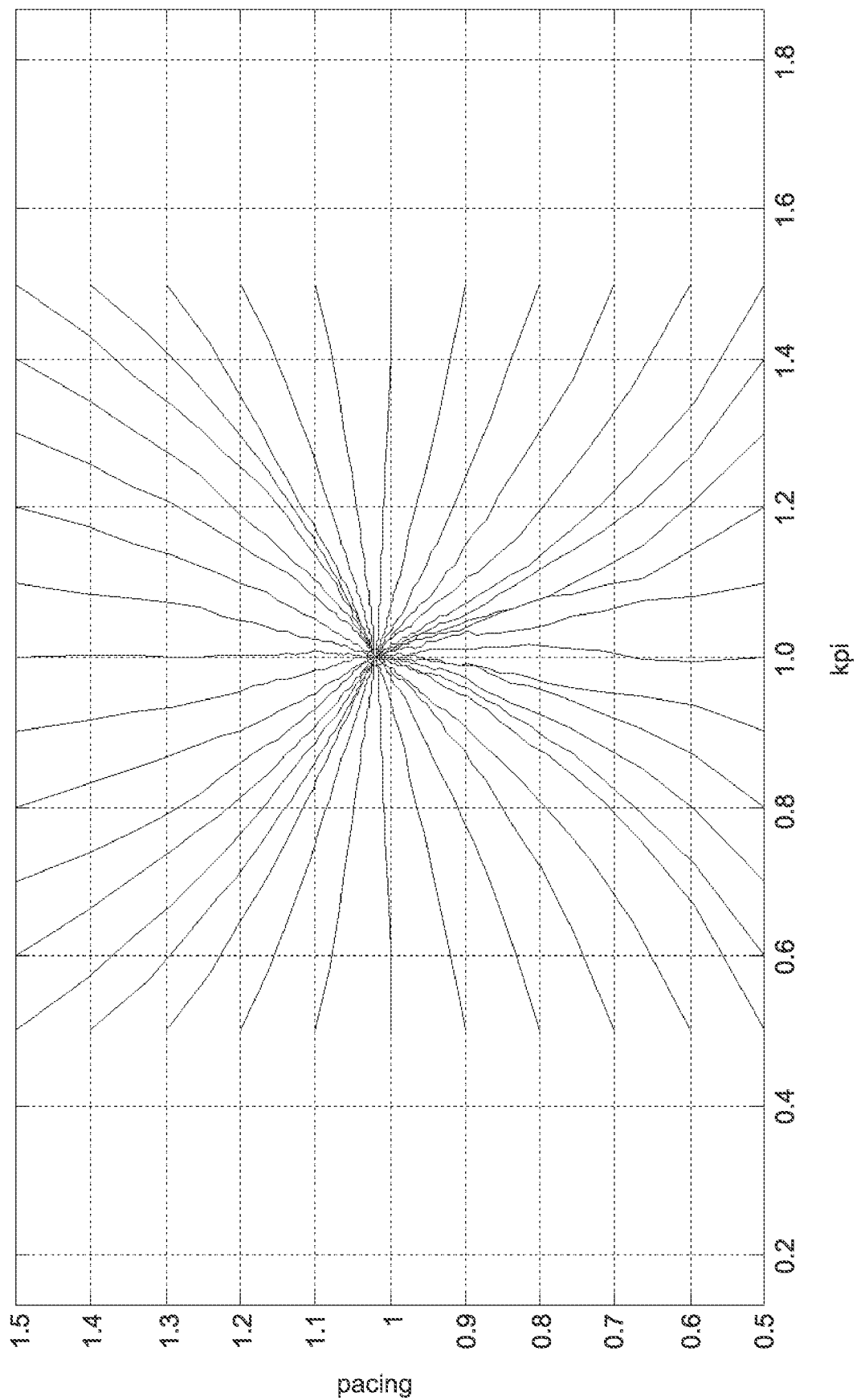
FIG. 15 shows a phase portrait for the PX Distribution algorithm, in accordance with embodiments of the present invention.

FIG. 15 shows a phase portrait for the PX Distribution algorithm. PX Distribution minimizes error for KPI performance and pacing performance, and uses the observed distribution of KPI values to help it determine which KPIs should be purchased. The chart in FIG. 15 shows trajectories in "performance space" (where (1,1) in the graph indicates perfect pacing and KPI performance) from perturbed starting points (i.e. the campaign is initialized with poor performance Pacing or KPI), until the end of the simulated campaign period. Only exterior trajectory starting points are shown for graphing purposes.

Figure 16:
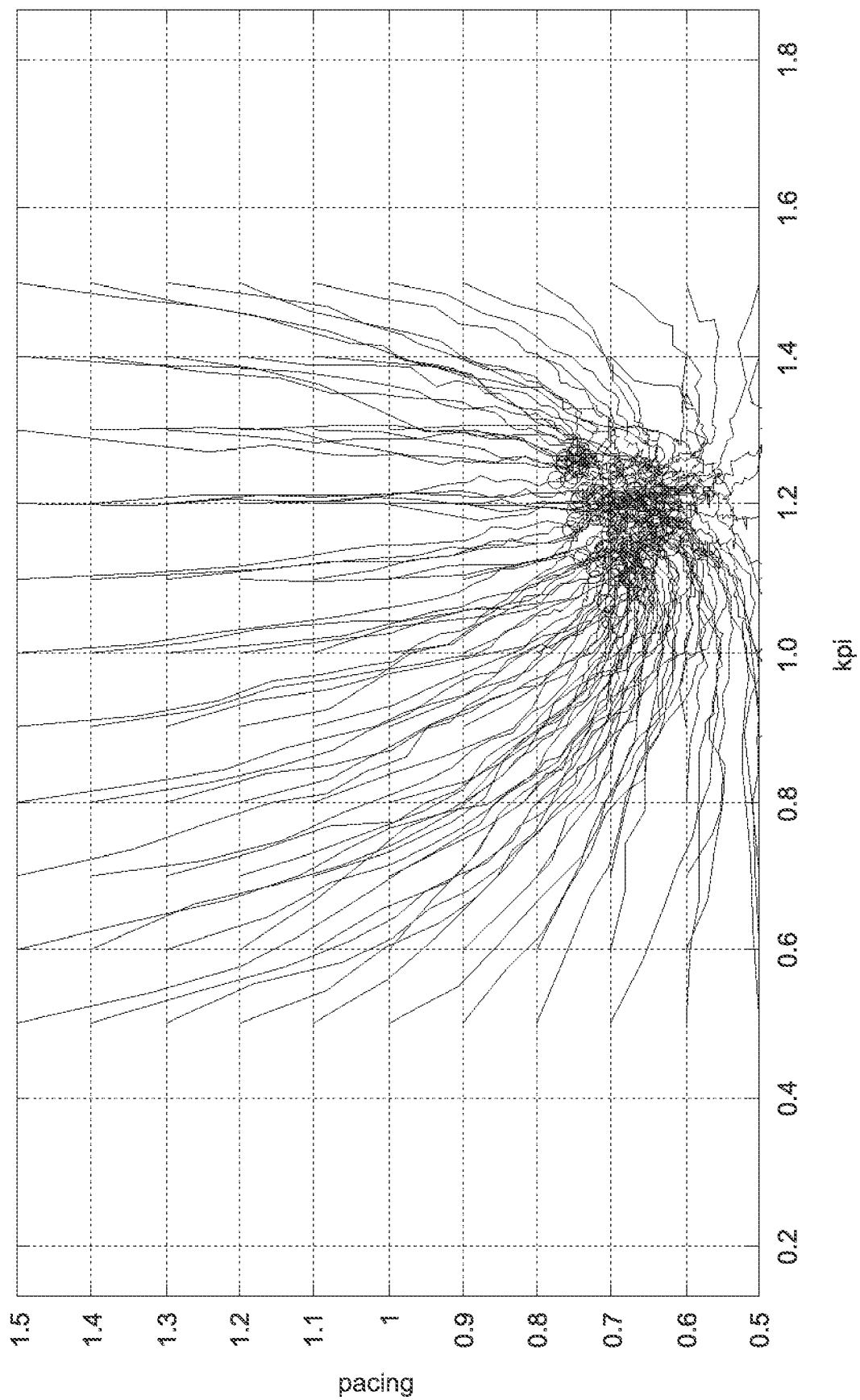
FIG. 16 shows a phase portrait for the Hard Constraint algorithm, in accordance with embodiments of the present invention.

FIG. 16 shows a phase portrait for the Hard Constraint algorithm. The termination points match those shown in FIG. 9, but this figure also shows the trajectory paths. This shows that the system generally performs well on its KPI objective, but generally under-delivers on impressions.

Figure 17:
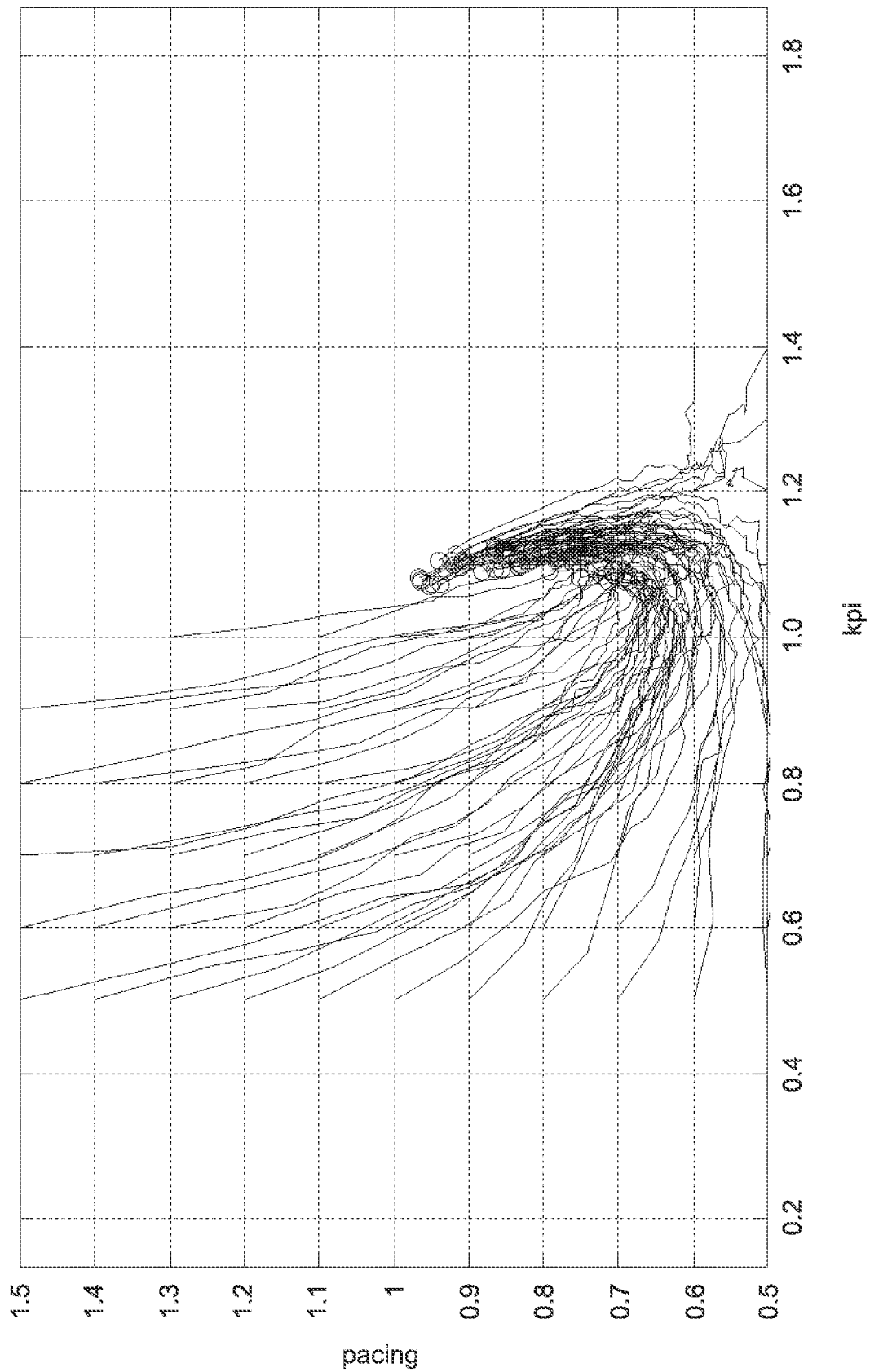
FIG. 17 shows a phase portrait for the Dynamic Constraint algorithm, in accordance with embodiments of the present invention.

FIG. 17 shows a phase portrait for the Dynamic Constraint algorithm. The termination points match FIG. 10, but this also shows the trajectory paths.

Figure 18:
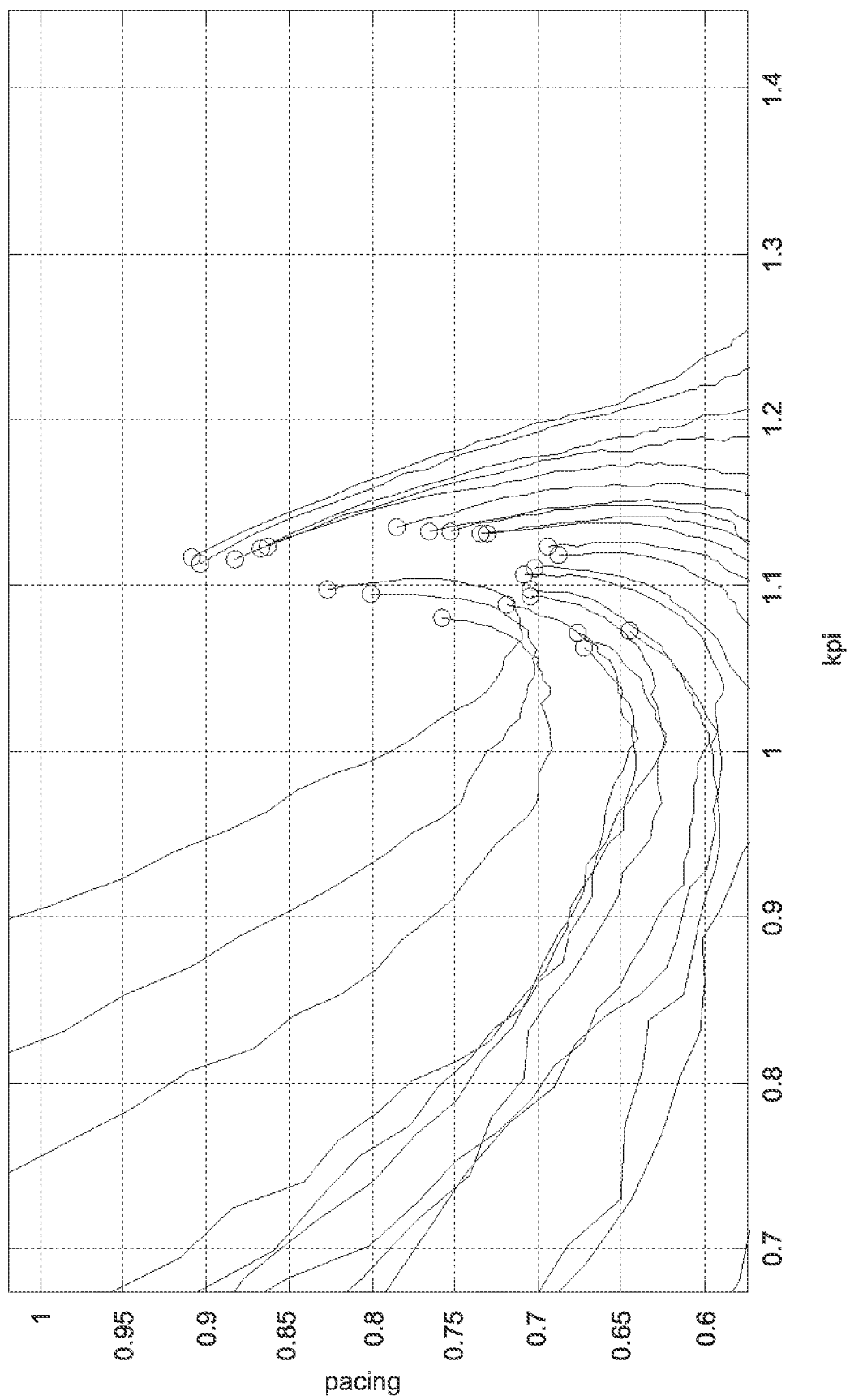
FIG. 18 shows a zoom-in for the phase portrait for the Dynamic Constraint algorithm, in accordance with embodiments of the present invention.

FIG. 18 shows a zoom-in for the phase portrait for the Dynamic Constraint algorithm. The algorithm converges to KPI performance that is slightly above the desired target, and pacing performance that is much lower than desired.

Figure 19:
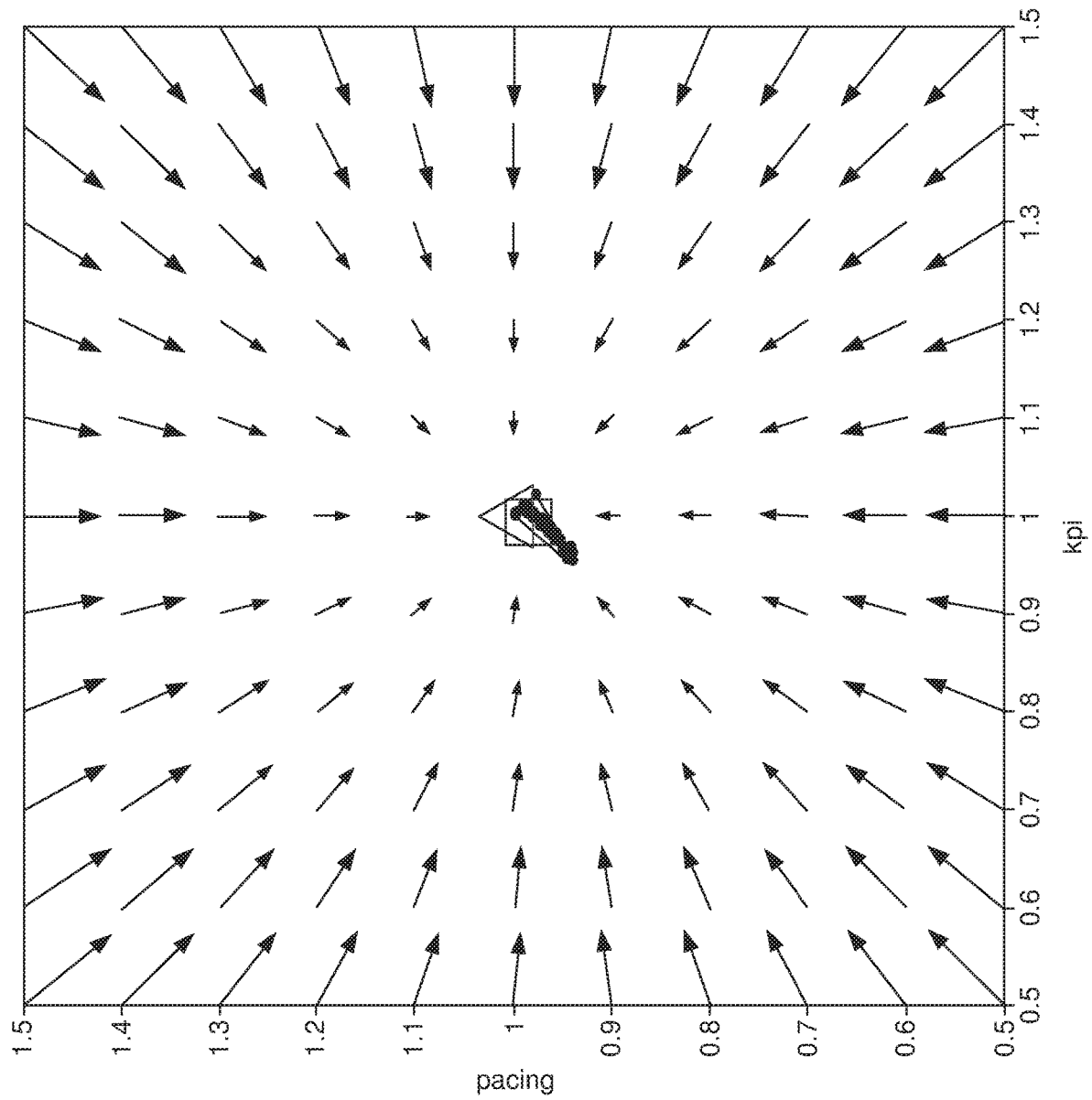
FIG. 19 shows the phase portrait for Px (Base), in accordance with embodiments of the present invention.

FIG. 19 shows the phase portrait for Px (Base). Px (base) achieves close to 1,1 Error Minimization enables dynamic trading off between pacing and KPI. The error (distance between end point and (1,1)) is smaller than either pacing or constraint strategies. The square represents the mean of trajectory end-points. This is slightly shifted towards the lower left from the (1.0,1.0) ideal (the triangle shape is at 1,1). However for that tiny reduction in KPI and Pacing, the above solution produces 20% more events and much lower error.

Figure 20:
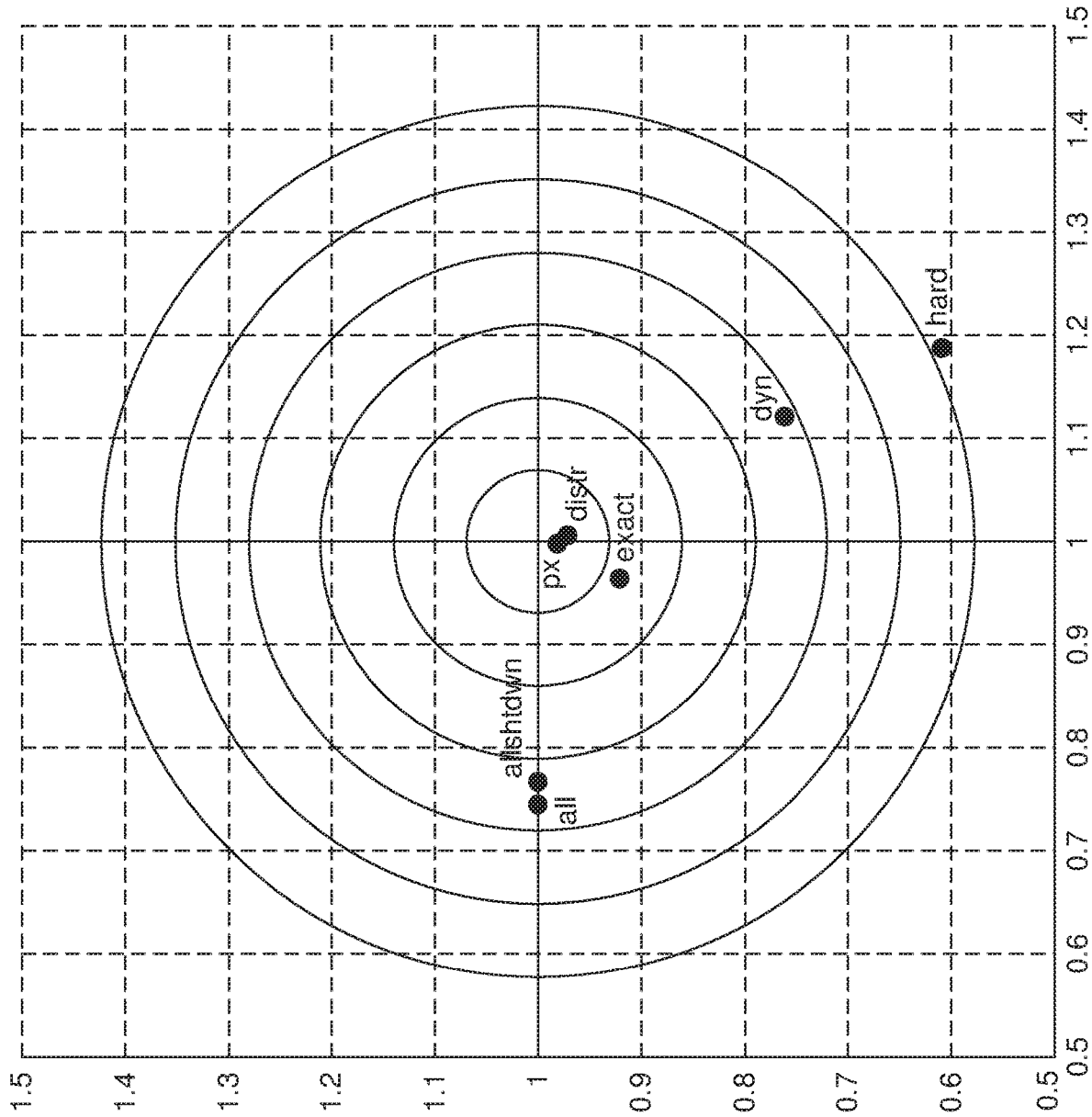
FIG. 20 provides an "Archery-like target" graph showing multi-KPI performance, in accordance with embodiments of the present invention.

FIG. 20 shows these and other algorithms on an "Archery-like target" graph. As such, FIG. 20 provides an "Archery-like target" graph showing multi-KPI performance. Concentric circles show equi-distance from KPI 1, Pacing 1. Px cannot guarantee that it will hit the "bullseye" of the KPI-Pacing target, however, Px is designed to minimize error (or squared distance) from the (1,1) center. This graph in FIG. 20 shows pacing performance (x-axis) versus KPI performance (y-axis). The center of the target (1,1) indicates at-target performance on both Pacing and KPI. Constraint methods ("hard" and "dynamic") both have higher KPI than required, but suffer considerably on pacing. The reason is because constraint methods implement a hard cut which excludes a lot of inventory. As a result, the system is unable to match the pacing required. Yet KPI performance is well above what is being requested. Intuitively one would want to put some of the "KPI budget" that these methods have accrued, into pacing, so that their pacing could get closer to the desired target. Px is multi-KPI-error-based algorithm and allows error in pacing and KPI (and attempts to minimize both). Px achieves the closest to the "bullseye" of pacing=1.0 and kpi=1.0.

Figure 21:
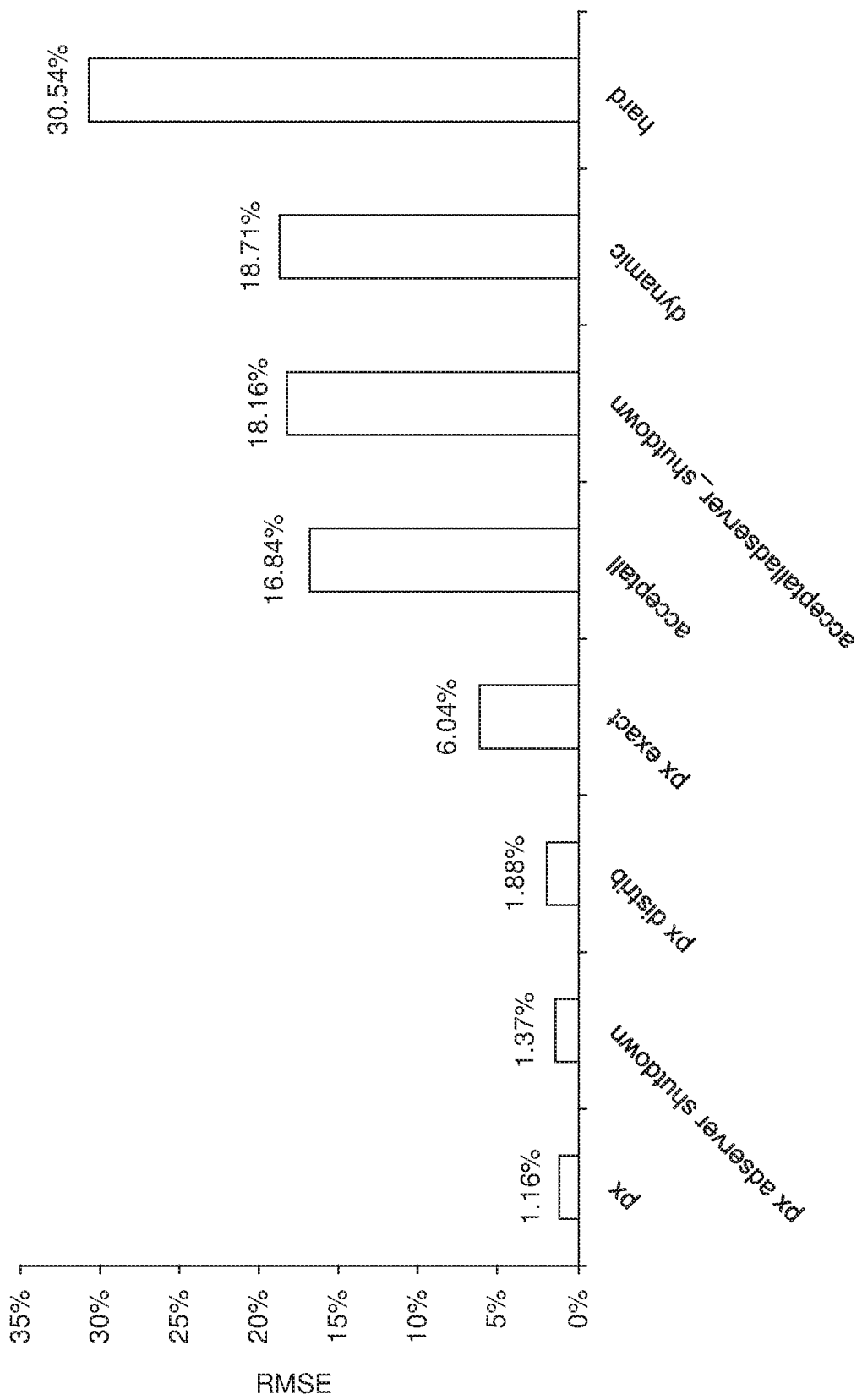
FIG. 21 shows a chart of Root Mean Squared Error (RMSE) for 8 of the algorithms described in this application, in accordance with embodiments of the present invention.

FIG. 21 shows a summary of Root Mean Squared Error (RMSE) by algorithm. Constraint methods have the highest RMSE (hard 31% and dynamic 19%). Pacing also has high RMSE (18%) and in fact has similar distance to target but with good pacing and poor KPI. PX has the lowest RMSE across both dimensions (a comparatively tiny 1.2%). The RMSE is the Euclidean Distance between the final Pacing/Pacing Target and KPI performance/KPI target that each algorithm was able to achieve from equivalent perturbed starting point.

We also tested a few Px variants—Px with adserver shut-down and Px with distribution. Px with ad-server shut-down simulates the ad-server shutting down purchasing after the desired number of impressions are purchased in each time-period—this is a simple control mechanism and easy to implement, so we included this as what we might expect to see in a live production ad-server. This results in a similar error (1.4%).

Px with distribution maintains an observed distribution of KPI values in memory, and uses this to determine how low to purchase. This is technically a constraint method also, and could suffer problems with pacing. However, under the simulation parameters it also does well (1.9%). However with different simulation parameters we would likely see low pacing for this algorithm variant as well.

TABLE 15

Simulation results from 121 starts of Pacing ("Pac"), Constraint ("Con"), and Px.

| Simulation | Value | | |
|---|---|---|---|
| Metric | Pac [ | Con [ | Px [ |
| Ads | 121 | 121 | 121 |
| ImpsTarg | 5,000 | 5,000 | 5,000 |
| ImpsActual | 5,000 | 3,817 | 4,922 |
| ViewsTarg | 3,500 | 3,500 | 3,500 |
| ViewsActual | 2,601 | 3,914 | 3,481 |
| Views/Targ | 0.743 | 0.854 | 0.979 |
| RMSE | 0.182 | 0.187 | 0.012 |
| Imps/Targ | 1.000 | 0.763 | 0.984 |
| VR/Targ | 0.743 | 1.118 | 0.995 |
| VRTarg | 70.0% | 70.0% | 70.0% |
| VRActual | 52.0% | 78.3% | 69.7% |

*indicates worse than Px at p < 0.05 level under t-test;
[indicates better than Px at p < 0.05 level under t-test.

Algorithm Variations in Simulation

We next review some of the algorithm variants introduced earlier, and report on their performance in simulation.

Sub-periods versus Look-ahead: The purpose of sub-periods and look-ahead are to improve the responsiveness of the controller feedback. Sub-periods simply divides the problem into N sub-periods and optimizes each. However, there are actually two problems with control using integrated error: (1) in the early part of the campaign, the feedback is small compared to the remaining time, and so if there is a systematic bias, the system doesn't change behavior very much; (2) towards the end of the campaign, the system may over-compensate. On the last iteration, the change in bid can effectively go to infinity. Thus we have two problems, a "lethargy" at the beginning, and "over-compensation" at the end. Both behaviors are undesirable.

By creating sub-periods, we have effectively multiplied the number of times that we have these two states by the number of sub-periods. Each sub-period has a period of mini-lethargy followed by mini-overcompensation.

Figure 22:
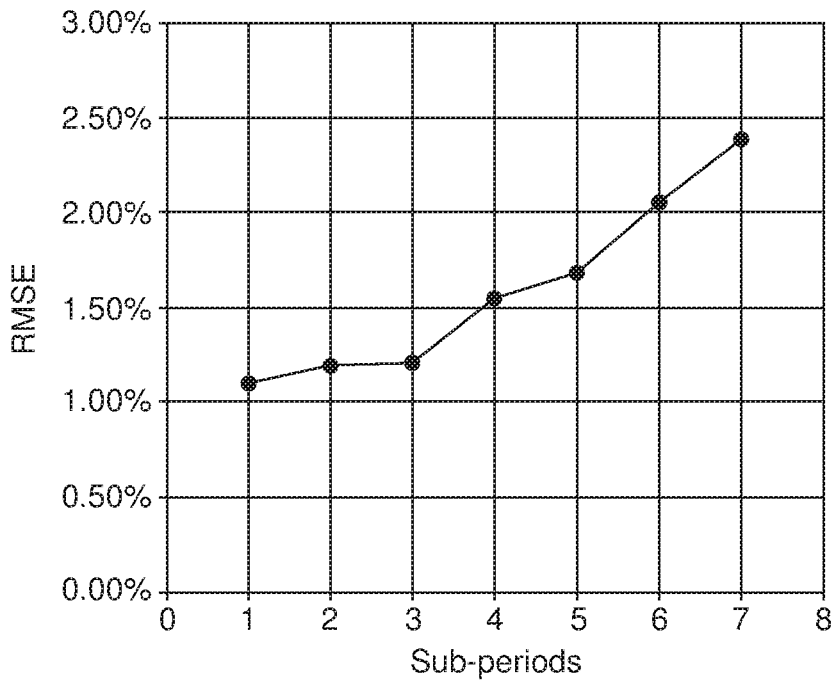
FIG. 22 shows Root Mean Squared Error (RMSE) in accordance with Sub-periods modification to Integrated Error Feedback Control, in accordance with embodiments of the present invention.

FIG. 22 and Table 16, below, show the error from the sub-periods strategy. The purpose of adding sub-periods is to decrease error. FIG. 22 shows that as sub-periods grow, the error actually increases. RMSE shows the degree of imperfection in the delivered KPI-pacing solution. The lowest error in Table 16 is indicated by * with sub-period of 1 (not using sub-periods at all).

TABLE 16

Simulation results for "Sub-Periods"

| Sub-periods | Sub-period length | KPI (100% Perfect) | Pacing (100% Perfect) | KPI Std | Pacing Std | RMSE |
|---|---|---|---|---|---|---|
| 1* | 50 | 99.50% | 98.53% | 1.22% | 1.78% | 1.10%* |
| 2 | 25 | 99.42% | 98.42% | 1.40% | 1.82% | 1.19% |
| 3 | 16.66667 | 99.39% | 98.41% | 1.49% | 1.88% | 1.20% |
| 4 | 0 | 99.31% | 97.92% | 1.52% | 4.53% | 1.55% |
| 5 | 0 | 99.33% | 97.73% | 1.59% | 7.08% | 1.67% |
| 6 | 0 | 99.36% | 97.17% | 1.74% | 8.25% | 2.05% |
| 7 | 0 | 99.35% | 96.69% | 1.67% | 9.67% | 2.39% |

Figure 23:
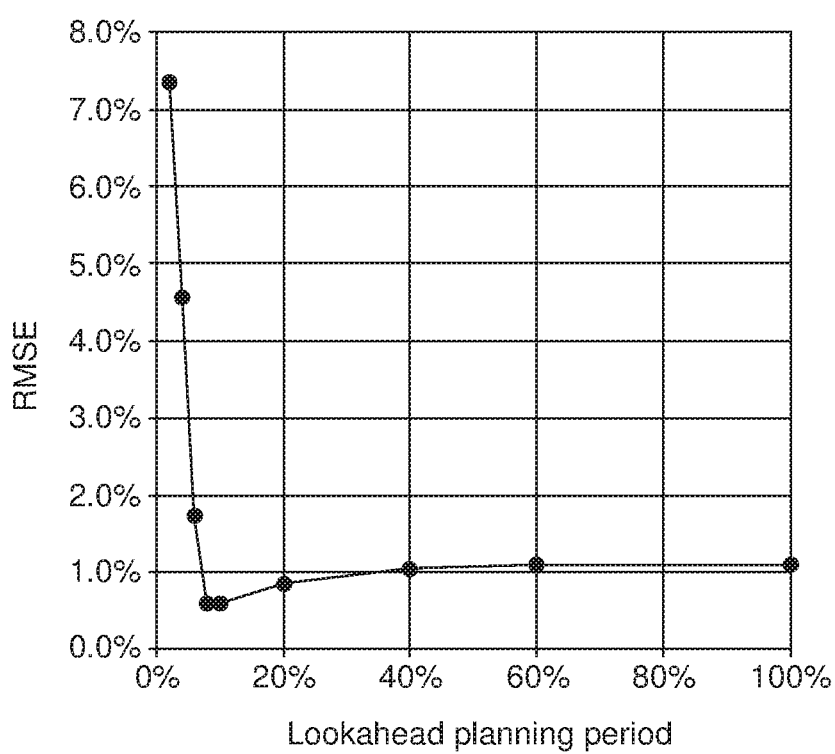
FIG. 23 shows Root Mean Squared Errors in accordance with Look-Ahead Integrated Error Feedback Control, in accordance with embodiments of the present invention.

In contrast, look-ahead strategy produces better results (FIG. 23, Table 17). As look-ahead period decreases from 100% (full period—the same as not using look-ahead) to 60% to 40%, RMSE error decreases. Minimum error in this simulation occurred at a look-ahead of 10% and 8%. However, if look-ahead is too short, then it can result in the control system over-compensating dramatically for noise. RMSE shows the degree of imperfection in the delivered KPI-pacing solution, and this graph shows this shows overall quality of the system given different lookahead periods. An ideal lookahead in the example shown here is approximately 10% of the overall time period. In the table below, the lowest error look-aheads are indicated by * (look-aheads at 10% and 8% of total period length in this simulation).

TABLE 17

Simulation results for "Look-ahead Integral Error Control"

| Look-ahead Cycles | Look-ahead Cycles % of period | KPI (100% perfect) | Pacing (100% perfect) | KPI Std | Pacing Std | RMSE |
|---|---|---|---|---|---|---|
| 50 | 100% | 99.50% | 98.53% | 1.22% | 1.78% | 1.10% |
| 30 | 60% | 99.49% | 98.52% | 1.22% | 1.80% | 1.11% |
| 20 | 40% | 99.58% | 98.57% | 1.18% | 1.80% | 1.05% |
| 10 | 20% | 99.75% | 98.81% | 1.15% | 1.84% | 0.86% |
| 5* | 10% | 99.73% | 99.21% | 0.88% | 1.29% | 0.59%* |
| 4* | 8% | 99.78% | 99.19% | 0.82% | 1.43% | 0.59%* |
| 3 | 6% | 99.96% | 97.55% | 2.30% | 11.27% | 1.73% |
| 2 | 4% | 100.29% | 93.57% | 2.69% | 19.33% | 4.55% |
| 1 | 2% | 99.68% | 89.62% | 6.08% | 24.56% | 7.34% |

Buy Above Original: Table 18, below, shows the results from Buy above original. The Dynamic constraint method usually over-performs on KPI (111%) and under-performs on pacing (77%). If we allow the system to buy above the original target, then the system overall behaves more like (unconstrained) px—99.48% KPI and 98.47% Pacing versus 99.41% and 98.44%. Therefore, one of the effects of "buying above original" is that the constraints are significantly loosened, and the system overall behaves more like unconstrained px.

TABLE 18

Simulation results for "Buy above original"

| Algorithm | KPI | Pacing | RMSE |
|---|---|---|---|
| Px (for comparison) | 99.41% | 98.44% | 1.179% |
| Dynamic + Buy Above Orig | 99.48% | 98.47% | 1.143% |
| Dynamic | 111.37% | 77.38% | 17.902% |

Squared error versus Absolute error: Table 19, below, shows that absolute error tends to behave better than squared error at least in our simulation.

TABLE 19

Squared errors

| Algorithm | KPI | Pacing | KPIStd | PacingStd | RMSE |
|---|---|---|---|---|---|
| Pbase | 99.45% | 98.49% | 1.22% | 1.84% | 1.14% |
| pbase ^2 | 99.48% | 98.40% | 1.30% | 1.89% | 1.19% |
| pbase ^4 | 99.47% | 98.46% | 1.27% | 1.84% | 1.15% |
| Pnash | 93.80% | 100.00% | 2.41% | 0.00% | 4.38% |
| pnash ^2 | 93.42% | 100.00% | 2.31% | 0.00% | 4.65% |
| pnash ^4 | 93.45% | 100.00% | 2.06% | 0.00% | 4.63% |

Speedup during Catch-up: Speed-up during catch-up adds logic to avoid unnecessary retardation from the pacing bid price when the system is in catch-up or slow-down, and the traffic is high (or low) performing. Table 20, below, shows that performance is significantly better under "speedup".

TABLE 20

Simulation results for "Speedup"

| Algorithm | KPI | Pacing | KPIStd | PacingStd | RMSE |
|---|---|---|---|---|---|
| PNash | 93.69% | 100.00% | 2.39% | 0.00% | 4.46% |
| PNash + Speedup | 95.10% | 100.00% | 2.10% | 0.00% | 3.46% |

Base Cut: (Table 21) Base cut is a method of dynamically "raising the drawbridge" on rate variables when the system is otherwise pacing well. Base cut shows a very slight improvement in KPI and Pacing solution. Base cut was rarely invoked because in our simulation, in general it was fairly easy to remain in good pacing.

TABLE 21

Simulation results for "Base Cut"

| Alg | KPI | Pacing | RMSE |
|---|---|---|---|
| Px | 99.41% | 98.44% | 1.179% |
| Px + BaseCut | 99.45% | 98.43% | 1.176% |
| PNash | 93.55% | 100.00% | 4.561% |
| PNash + BaseCut | 93.66% | 100.00% | 4.483% |

PBase versus Standard Multi-KPI: (Table 22) PBase alters the error function to calculate the desirability of traffic using all of the KPIs, and then multiplying that overall traffic assessment by the pacing price. In simulations, we found that this approach tended to result in good budget convergence, and much lower squared error.

TABLE 22

| | Pbase | | | | |
|---|---|---|---|---|---|
| | KPI | Pacing | KPIStd | PacingStd | RMSE |
| PBase | 99.45% | 98.49% | 1.22% | 1.84% | 1.14% |
| PNash | 93.80% | 100.00% | 2.41% | 0.00% | 4.38% |

Summary of Algorithm Comparisons

TABLE 23

Simulation results. Each configuration was tested on 121 starting parameters. Px shows lowest RMSE.

| | Kpi 1 | Imp 1 | Kpi 1 | Imp 1 | RMSE |
|---|---|---|---|---|---|
| Px | 0.99 | 0.98 | 0.012 | 0.019 | 0.0116 |
| Px adserver shutdown | 1.00 | 0.98 | 0.018 | 0.019 | 0.0137 |
| Px distrib | 1.00 | 0.97 | 0.004 | 0.034 | 0.0188 |
| px exact | 0.96 | 0.92 | 0.021 | 0.009 | 0.0604 |
| Accept all | 0.76 | 1.00 | 0.038 | 0.000 | 0.1684 |
| Accept all adserver shutdown | 0.74 | 1.00 | 0.035 | 0.000 | 0.1816 |
| Dynamic | 1.12 | 0.76 | 0.027 | 0.093 | 0.1871 |
| Hard | 1.18 | 0.61 | 0.054 | 0.027 | 0.3054 |

TABLE 24

Simulation parameter settings associated with each test point

| | Use Distrib | Con-straint | Dy-namic | Nash | Pid | Exact | Accept all | Adserver shutdown |
|---|---|---|---|---|---|---|---|---|
| px | 0 | 0 | 0 | 0 | 0 | 0 | 0 | 0 |
| px adserver shutdown | 0 | 0 | 0 | 0 | 0 | 0 | 0 | 1 |
| px distrib | 1 | 0 | 0 | 0 | 0 | 0 | 0 | 0 |
| px exact | 0 | 0 | 0 | 0 | 0 | 1 | 0 | 0 |
| acceptall | 0 | 0 | 0 | 0 | 0 | 0 | 1 | 0 |
| sccept all adserver shutdown | 0 | 0 | 0 | 0 | 0 | 0 | 1 | 1 |
| dynamic | 0 | 1 | 1 | 0 | 0 | 0 | 0 | 0 |
| hard | 0 | 1 | 0 | 0 | 0 | 0 | 0 | 0 |

User Controls

One aspect of embodiments described herein is that the user can control the degree of weight on each KPI. Equation 14, 14.1, 14.2, 14.3 all include a user weighting $u^k$, eg.

$$Err = \sum_k u^k \cdot \Delta_i^k \quad (14)$$

The weighting enables the user to vary weight on each KPI between 0 . . . 1. For convenience the weights can all sum to 1. Using user-defined weights $u^k$ effectively changes the "penalty function" that is being used to govern how much investment is made in each KPI and performance. The error feedback mechanism still works whether or not user-weights are loaded, but this simply provides the ability for the user to instruct the system whether to weight particular KPIs more than others.

FIGS. 24A-24E show experiments with different weight configurations on campaigns, and the resulting KPI results. These experiments show the actual performance of live ads when the weight on Viewability ranges from 0% . . . 100%, and Completion Rate 0% . . . 100%, and so on. By initializing the optimizer with different weights between KPI performance and Pacing, the system achieves different final results on each KPI and Pacing. Importantly, there is generally a monotonic relationship—as weight is increased on a KPI, the KPI result improves. This means that an advertiser could use slider controls to adjust weighting on each KPI, and they should see a proportional response from the optimization system (FIG. 25 shows example slider controls).

Figure 24A:
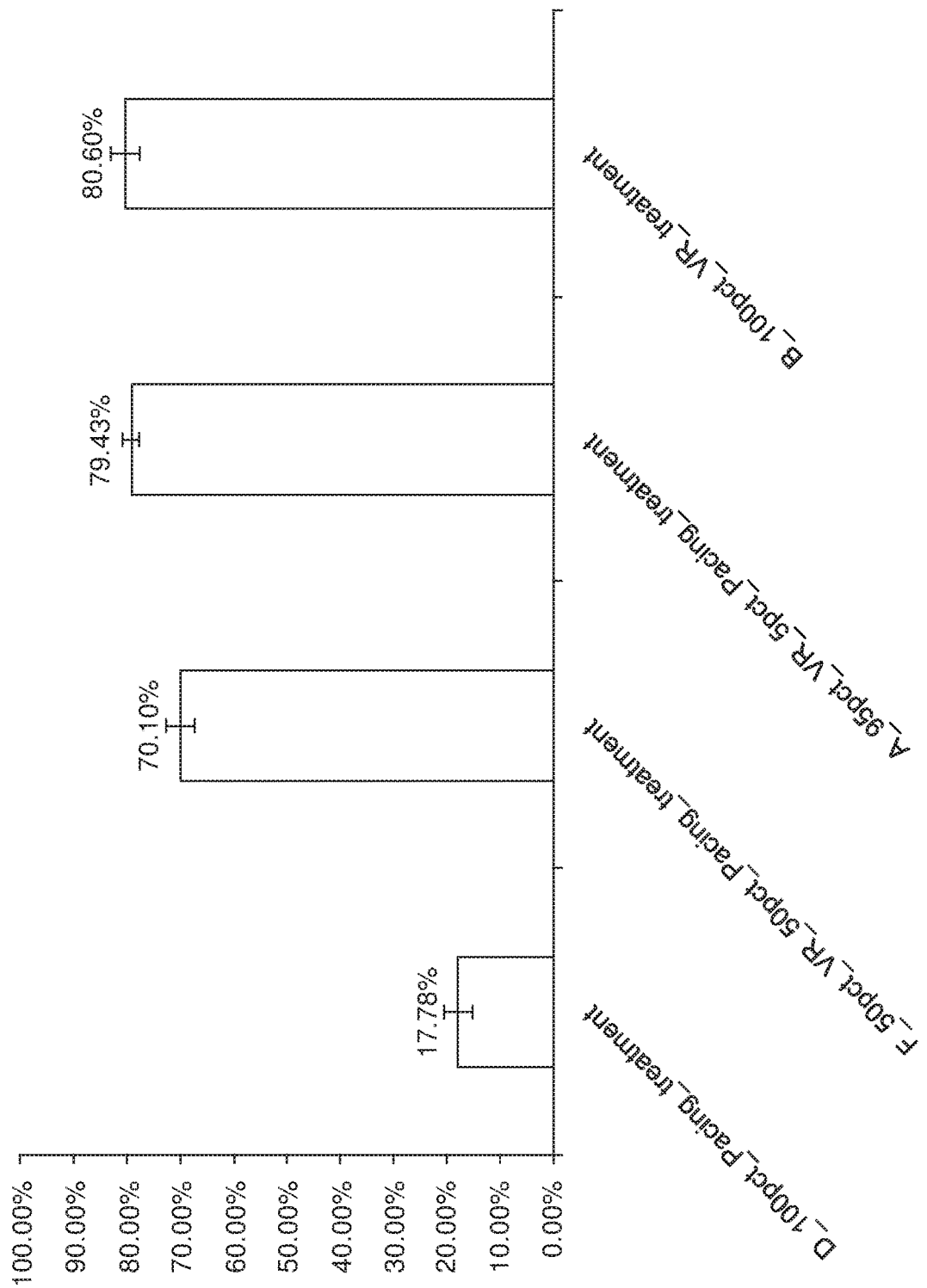
FIG. 24A-24E show experiments with different weight configurations on campaigns and the resulting KPI results, in accordance with embodiments of the present invention.
Figure 24B:
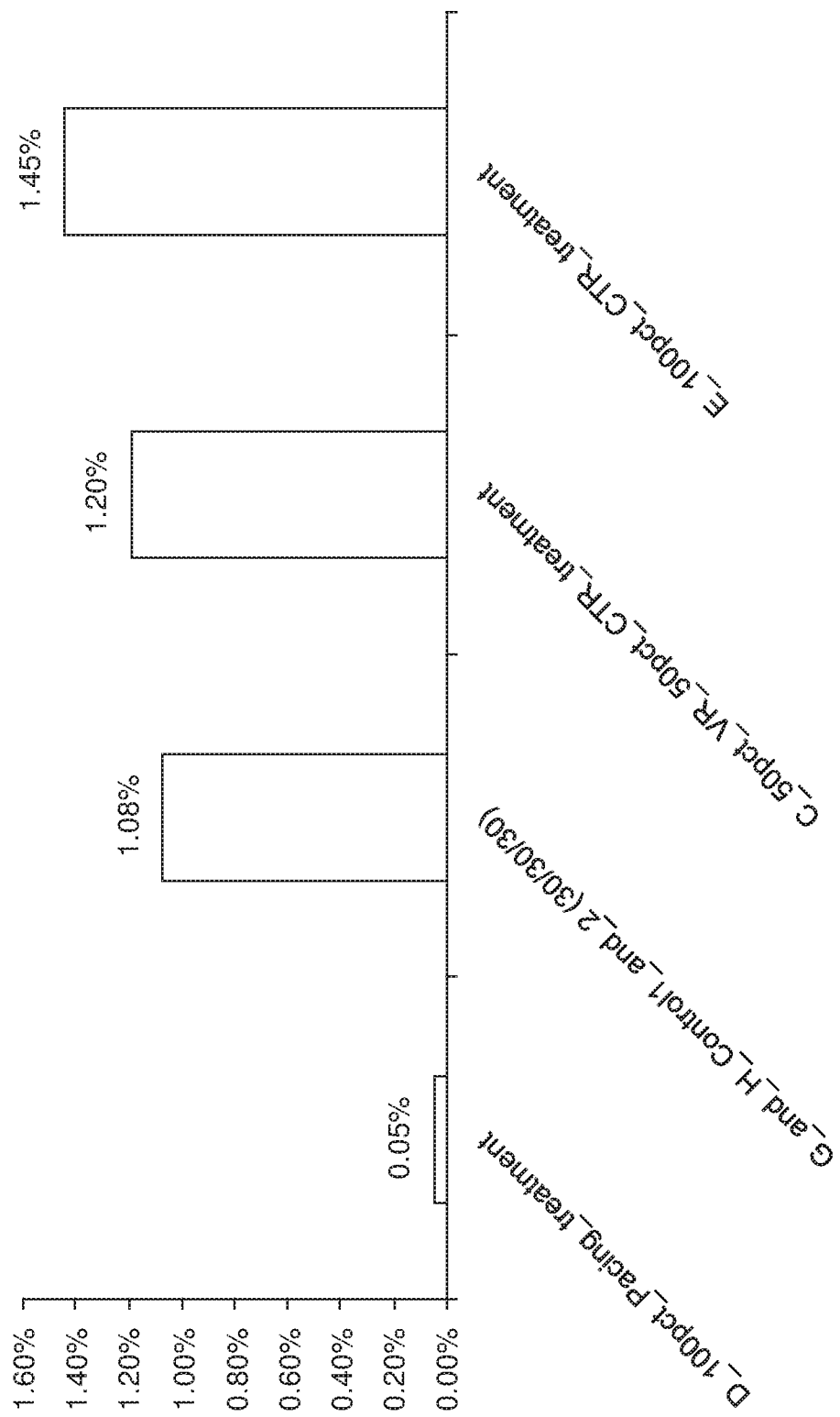
Figure 24C:
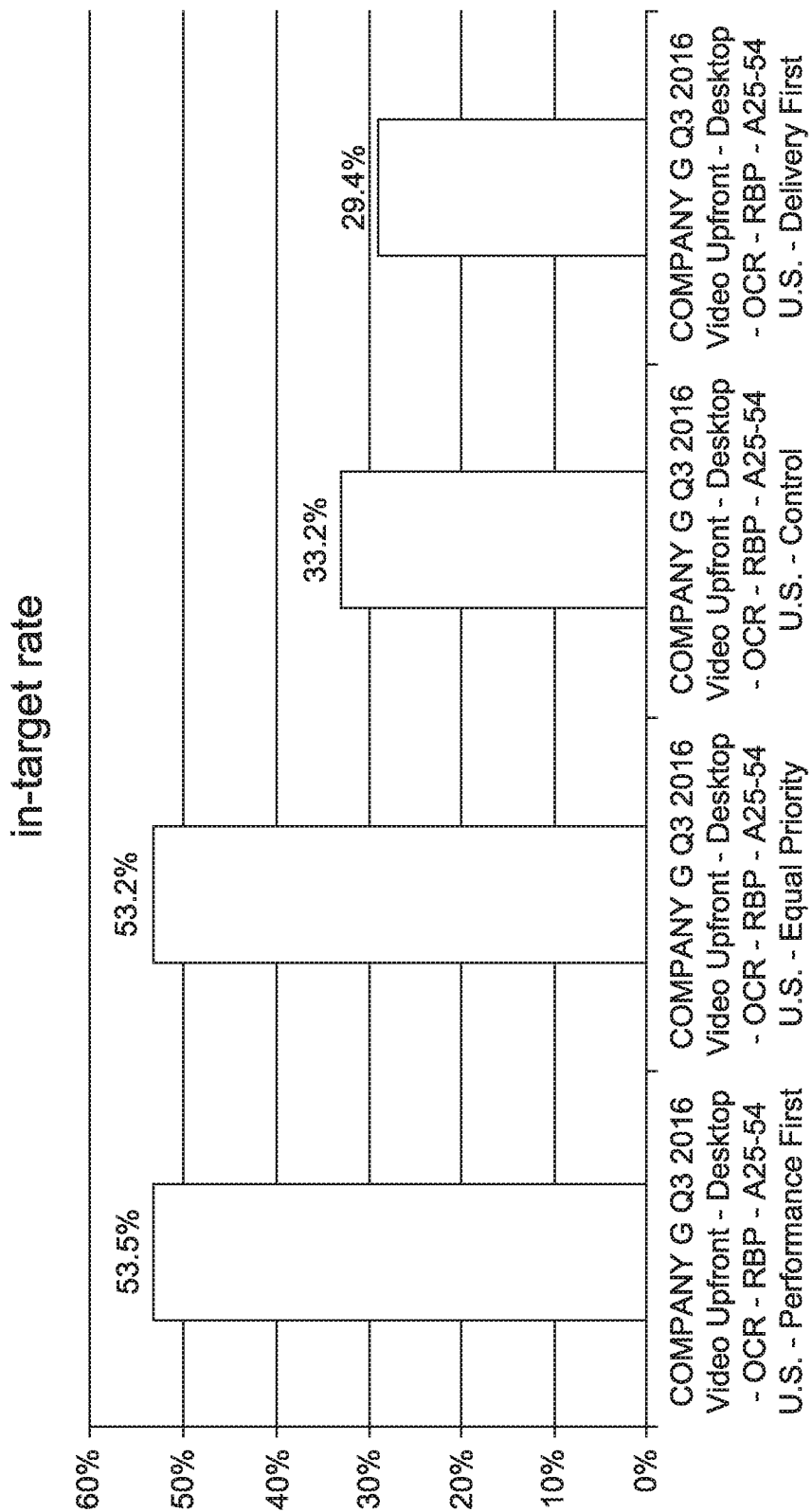
Figure 24D:
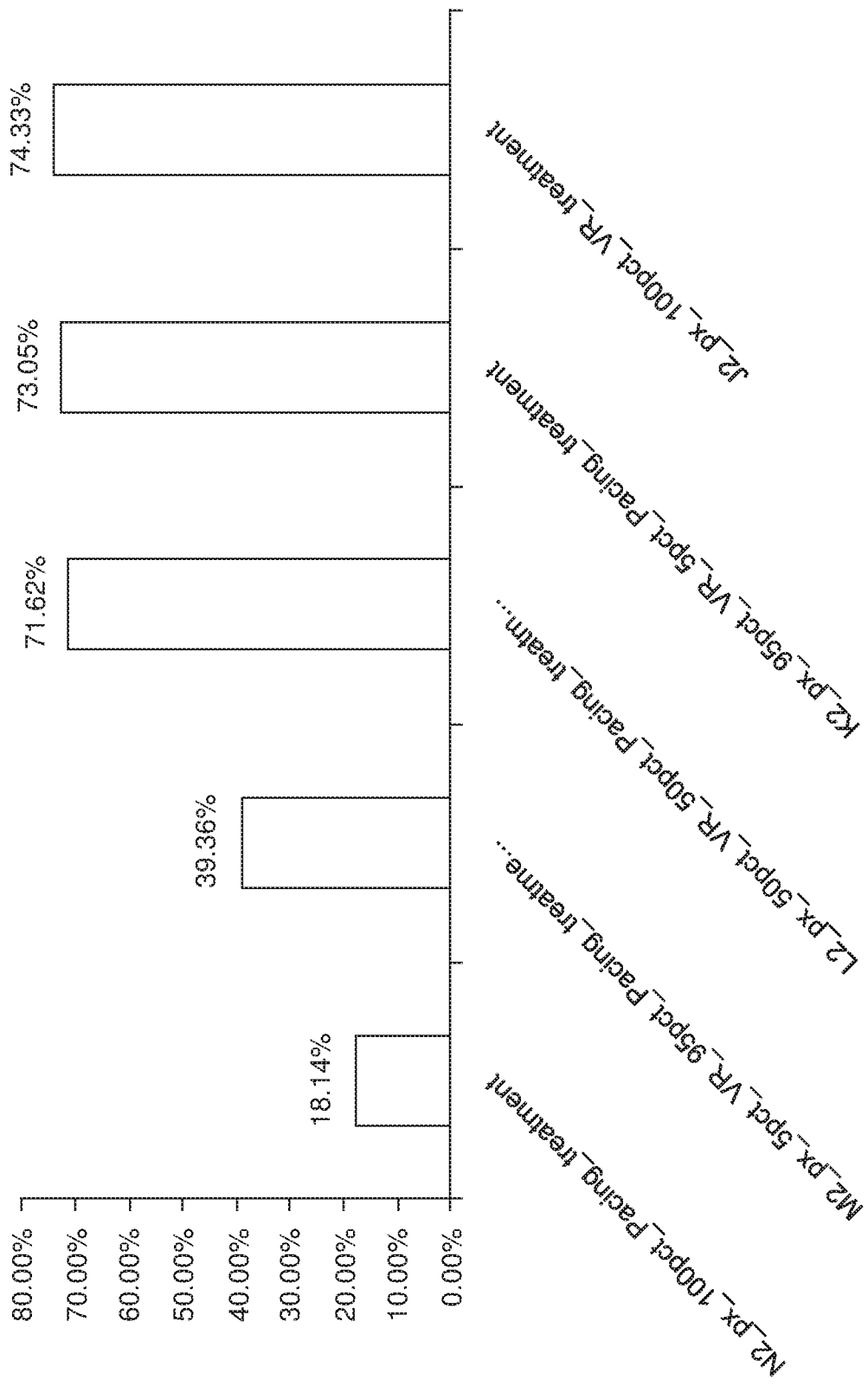
Figure 24E:
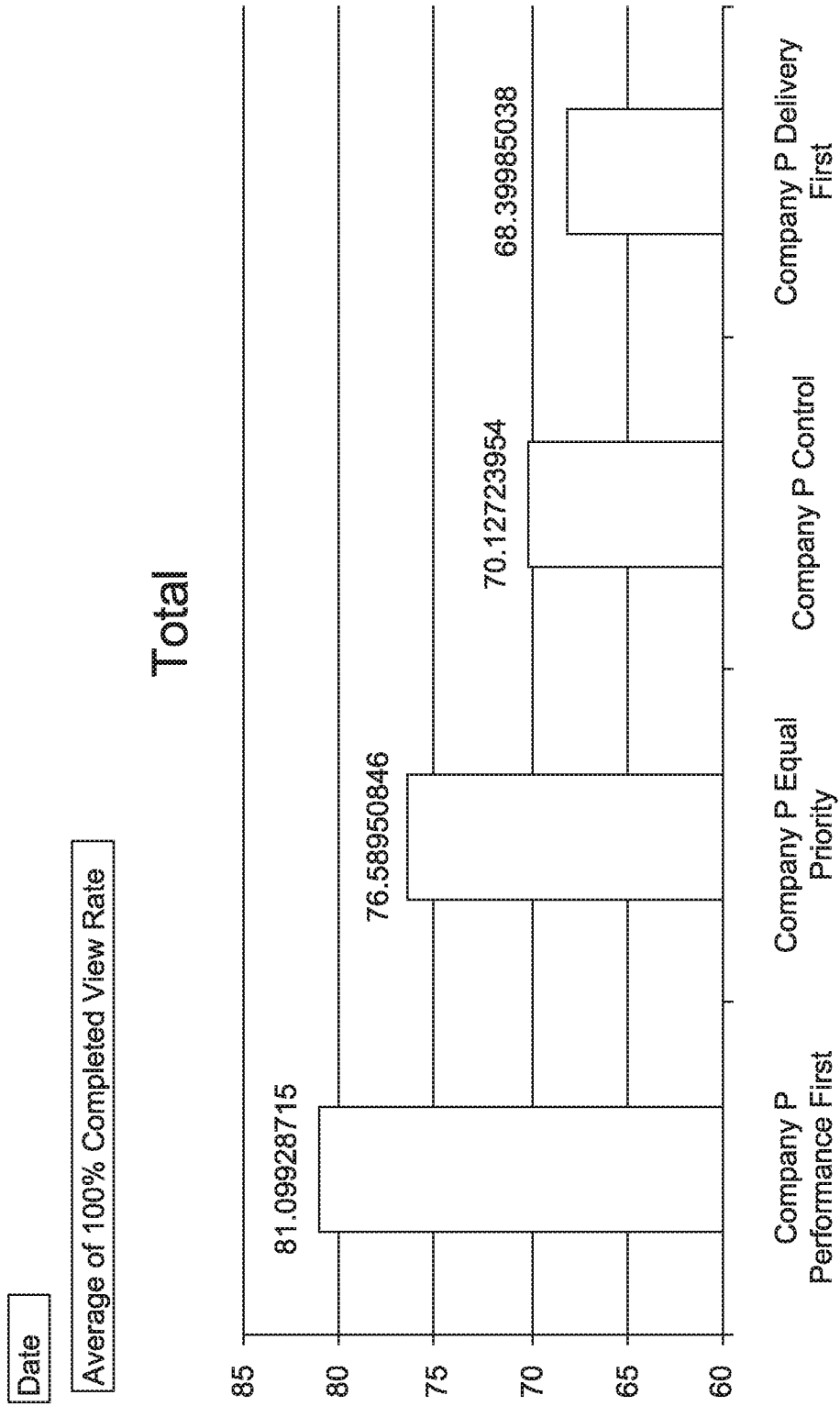
Figure 25:
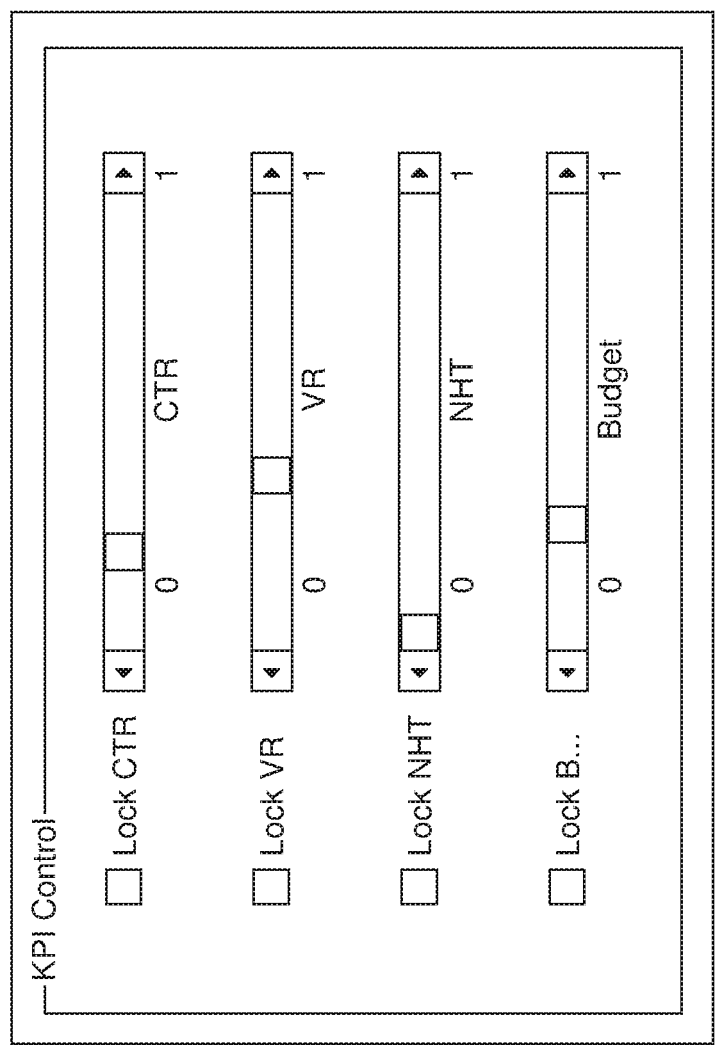
FIG. 25 is a user interface display showing example slider controls, in accordance with embodiments of the present invention.

FIG. 24A shows results from the system where ads were configured with 100% weight on Viewability, 95% weight on Viewability, 50% weight on Viewability, 0% weight on viewability. In response, the system's performance on viewability changes from high to low—this shows how a user can adjust their weights in order to achieve more performance on the KPIs that they care about. FIG. 24B shows a multi-KPI example where Viewability Rate, Clickthrough Rate and Pacing are all being optimized; weight is varied between 100% pacing to 50% on Viewability Rate and 50% on Clickthrough Rate, to 100% on Clickthrough Rate. In response, the performance of Clickthrough Rate increases predictably—again demonstrating the flexibility of being able to adjust weights for different KPIs. FIG. 24C shows the performance of Company G under Performance, Equal, Delivery and Control weighting configurations—these configurations are really "weight settings" or "saved weights". The Performance weighting configuration has KPI weight set to 100% and a hard constraint for KPI. Equal weighting configuration has KPI weight set to 50% and Pacing 50%, and no hard constraints. Delivery has 100% weight on pacing and 0% on KPI. FIG. 24D shows the resulting performance from setting an ad to 100% KPI, 0% pacing; 95% KPI, 5% pacing, 50% KPI, 50% Pacing, 5% KPI, 95% Pacing, and 0% KPI, 100% Pacing. Note that the viewability rate increases as the weight on viewability increases. FIG. 24E shows Advertiser performance for a different KPI metric—this time Completion Rate. Four ads were created and set to Performance, Equal, Control, and Delivery (prioritized KPI assignment). The Completion Rate achieved is highest on Performance, next highest on Equal, and Delivery and Control show similar results; this shows how it is possible for users to gear the system between KPI performance and pacing.

Figure 26:
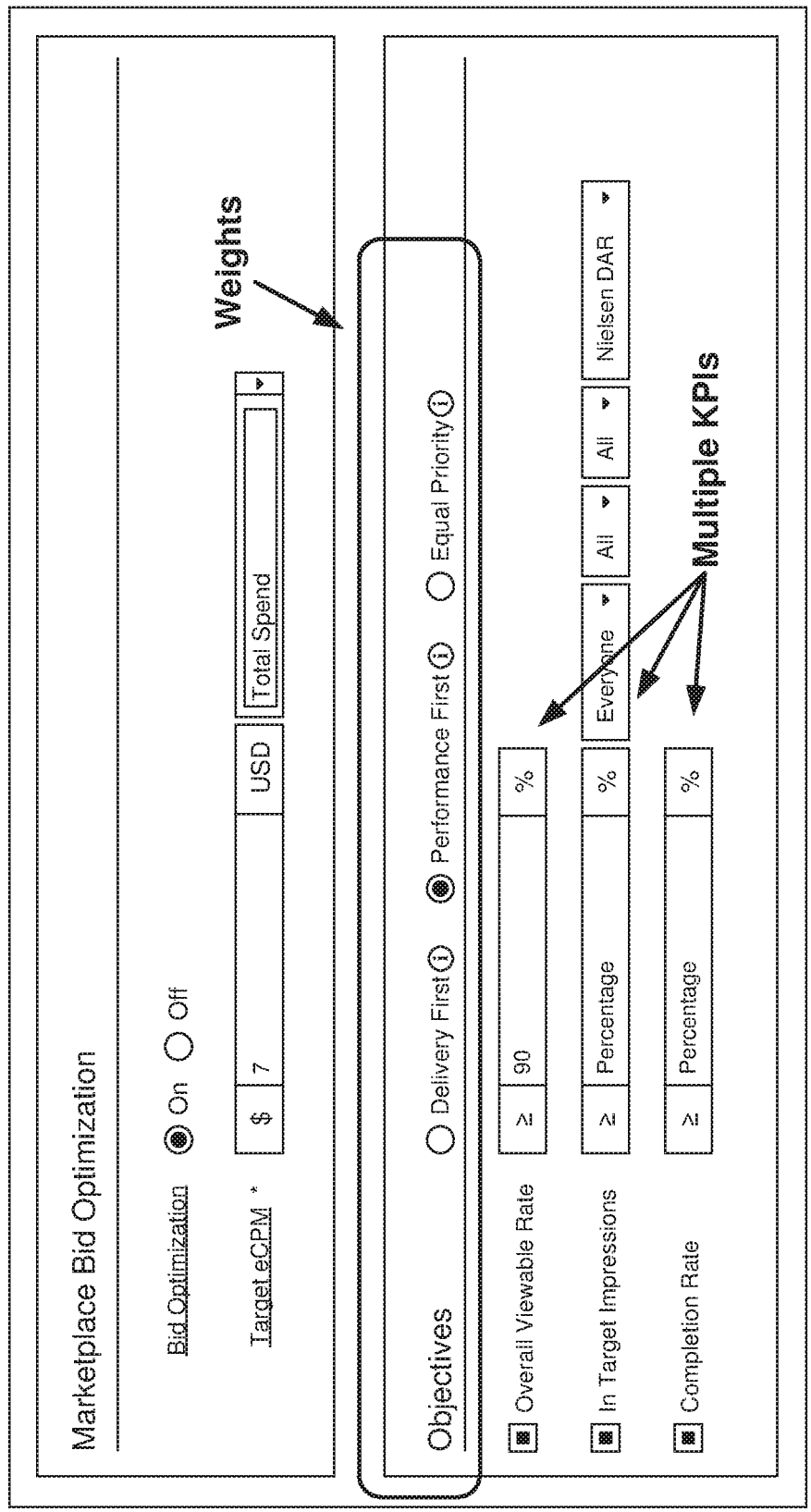
FIG. 26 is a user interface display that enables changing weights on different KPIs, in accordance with embodiments of the present invention.

FIG. 26 illustrates a graphical user interface that enables changing weights on different KPIs. In addition to specifying multiple KPIs, a user can specify a weighting scheme. A user may specify a setting of weight setting "performance," "equal," or "delivery." These may map to weight configurations of 100% KPI, 50%-50% KPI and Performance, and 100% Delivery. FIG. 27 illustrates another example of a graphical user interface that may be utilized in implementations. FIG. 27 depicts selecting two KPI targets: Viewability Rate and Demographic In-Target Rate, along with the pacing requirement for an eCPM of $12.01. The number of impressions to be delivered and timeperiod are on a separate screen (not shown). Several KPI targets can be specified by the user.

Reporting

Table 25 shows an example performance report for ads that were run on Px Error Minimization with a Viewability Target of 90%, under Px (error minimization), Px-Distrib (distribution algorithm Equation (x)), Px-HardCut (Equation (y)), Px-Dynamic-Cut (Equation (z)). The last two have maximum CPM of 7—which makes fulfillment very difficult. The performance report shows the actual viewability rate, upper and lower bound on viewability rate, impressions per day being delivered, and performance against target (viewability rate/viewability rate target and impressions-delivered/impressions-delivered-target).

TABLE 25

Experiment:

| Cell | VR | stderr | VR lower | VR upper | days so far | imps per day | CPM | imps/ Imps Targ | VR/ VR Targ |
|---|---|---|---|---|---|---|---|---|---|
| R_px w100_VRTarget90 | 85.2% | 3% | 82% | 88% | 22 | 185 | $5.20 | 11% | −5% |
| S_px_distrib w100_VRTarget90 | 86.1% | 3% | 83% | 89% | 22 | 171 | $5.23 | 3% | −4% |
| T_px_hardcut w100_VRTarget90 | 83.0% | 4% | 79% | 87% | 22 | 89 | $6.19 | −47% | −8% |
| U_px_dynamiccut w100_VRTarget90 | 84.6% | 4% | 81% | 88% | 22 | 101 | $6.01 | −39% | −6% |
| W_px_max7 w100_VRTarget90 | 74.9% | 3% | 72% | 78% | 22 | 185 | $3.86 | 11% | −17% |
| Y_px_dynamiccut_max7 w100_VRTarget90 | 86.1% | 7% | 79% | 93% | 22 | 31 | $6.28 | −82% | −4% |

Table 26 shows another performance report for ads with different KPI-Pacing weights. For example, at 100% pacing, the viewability rate delivered is only 18%, at 50% pacing-50% viewability, the viewability rate delivered is 70%. At 95% viewability, the viewability rate delivered is nearly 80%.

TABLE 26

Ads with different KPI-Pacing weights and resulting performance

| Cell | VR | Std err | VR_ lower | VR_ upper | days so far | imps per day | CPM | imps delivery % | VR/ VR Targ |
|---|---|---|---|---|---|---|---|---|---|
| H_Control2 | 72.96% | 2% | 71% | 75% | 35 | 141 | $11.94 | −4% | |
| G_Control1 | 72.47% | 2% | 70% | 75% | 35 | 142 | $11.81 | −3% | |
| D_100pct_Pacing_treatment | 18.00% | 1% | 17% | 19% | 35 | 147 | $9.34 | 0% | |
| F_50pct_VR_50pct_Pacing_treatment | 70.03% | 2% | 68% | 72% | 35 | 147 | $10.90 | 0% | |
| A_95pct_VR_5pct_Pacing_treatment | 79.65% | 3% | 77% | 82% | 35 | 129 | $14.39 | −12% | |
| B_100pct_VR_treatment | 80.06% | 3% | 77% | 83% | 35 | 129 | $15.33 | −13% | |
| C_50pct_VR_50pct_CTR_treatment | 77.54% | 3% | 75% | 80% | 35 | 133 | $17.04 | −10% | |
| E100pct_CTR_treatment | 65.24% | 3% | 63% | 68% | 35 | 101 | $19.97 | −31% | |
| N2_px_100pct_Pacing_treatment | 18.8% | 1% | 18% | 20% | 28 | 179 | $10.60 | 0% | −76% |
| M2_px_5pct_VR_95pct_Pacing_treatment | 52.5% | 2% | 50% | 54% | 28 | 179 | $9.98 | 0% | −34% |
| L2_px_50pct_VR_50pct_Pacing_treatment | 76.4% | 2% | 74% | 79% | 28 | 179 | $11.02 | 0% | −4% |
| K2_px_95pct_VR_5pct_Pacing_treatment | 78.6% | 2% | 76% | 81% | 28 | 179 | $11.07 | 0% | −2% |
| J2_px_100pct_VR_treatment | 78.9% | 2% | 76% | 81% | 28 | 179 | $11.13 | 0% | −1% |
| P_pxdynamiclimit_100pct_VR_treatment | 86.1% | 3% | 83% | 89% | 28 | 166 | $11.19 | 0% | 8% |
| O_pxhardlimit_100pct_VR_treatment | 89.8% | 3% | 87% | 92% | 30 | 163 | $11.17 | −2% | 12% |
| I2_Control_batch2 | 80.5% | 2% | 78% | 83% | 30 | 167 | $10.51 | 1% | 1% |
| Q_px_distrib_100pct_VR_treatment | 80.0% | 3% | 77% | 82% | 30 | 163 | $11.06 | −2% | 0% |

Table 27 shows an example performance report for ads under error minimization versus prioritized optimization. The target viewability goals specified by the two groups of advertisers were not statistically significantly different (63.5% vs 61% (ns)), suggesting that both groups had similar targets. Yet Viewability rate delivered versus desired was significantly higher in the error-optimized group: 1.07 versus 0.64. There was minimal difference in delivery in this case (0.82 versus 0.80). Therefore the Px group experienced a 1.7× increase in KPI volume (53%→88%) (Table 27).

TABLE 27

400 ads over 6 months

| 6 months | Value | | | |
|---|---|---|---|---|
| Metric | Con ⫽ | Px ⫽ | Con ⌈ | Px ⫽ |
| Ads | 274 | 126 | | |
| ImpsTarg | 2,174,652,928 | 274,418,086 | | |
| ImpsActual | 2,290,497,954 | 290,721,874 | | |
| ViewsTarg | 1,546,292,689 | 152,244,234 | | |
| ViewsActual | 236,438,173 | 126,524,237 | | |

TABLE 27-continued 400 ads over 6 months

| 6 months | Value | | | |
|---|---|---|---|---|
| Metric | Con ⌊ | Px ⫽ | Con ⫽ | Px ⌊ |
| Views/Targ | 0.532 | 0.882* | 0.499 | 0.539 |
| RMSE | 0.448 | 0.364* | 0.259 | 0.252 |
| Imps/Targ | 0.80 | 0.82 | 0.32 | 0.32 |
| VR/Targ | 0.64 | 1.07* | 0.52 | 0.49 |
| VRTarg | 61.0% | 63.5% | 0.13 | 0.15 |
| VRActual | 38.7% | 66.0%* | 0.31 | 0.32 |
| eCPM | 8.95 | 11.90* | 3.24 | 4.18 |
| vCPM | 23.12 | 18.03* | 3,392 | 65 |
| Pr(Success) | 29.3% | 60.5%* | | |

*indicates significantly different from Legacy at p < 0.05 under t-test.

It is also possible to report on the performance for multiple KPIs. Table 28 shows all KPI tuples selected. For example, "Pacing+VR+Demo+CR" shows results for advertisers who had targets for Viewability Rate (VR) and Demographics (Demo) and Completion Rate (CR).

These KPI combinations all have KPIs in different units, making comparisons difficult. For instance, the mean Click-through rate (CTR) is around 0.10%, where-as the mean Completion Rate (CR) is around 60%. In order to report a single number for performance, we therefore report the average KPI lift over the mean. For example, if Viewability Rate (VR) mean was 0.33 and CR mean 0.60, then an advertiser targeting VR and CR who achieved 0.66 and 0.70 would have lift of (0.66/0.33+0.70/0.60)/2=1.58×.

In the treatment group, Advertisers with 2 KPIs averaged about 2.54× lift (1.41× legacy). 3 KPIs averaged 1.44× and 1.28×(1.01× and 0.96× legacy), and 4 KPIs averaged 1.09×. Px therefore achieved higher lift in all comparable cases. It is also worth observing that as more KPIs are selected, the system produces lower lift. This is consistent with Lemma 5.

TABLE 28

Multi-KPI Results from 400 ads

| 6 months | Lift = Mean(KPI/Mean(KPI)) | | | | Ads | |
|---|---|---|---|---|---|---|
| Multi KPI Tuple[1] | Con ↳ $_L$ | Px ↳ $_L$ | Con ↕ $_L$ | Px ↳ $_L$ | Con ↕ | Px ↳ |
| Pacing + VR | 1.41 | 2.54 | 1.04 | 1.12 | 132 | 78 |
| Pacing + VR + CR | 1.01 | 1.44 | 0.50 | 0.47 | 45 | 30 |
| Pacing + VR + Demo | 0.96 | 1.28 | 0.55 | 0.39 | 81 | 11 |
| Pacing + VR + Demo + CR | | 1.09 | | 0.08 | 0 | 7 |
| Pacing + VR + CTR | 0.55 | | 0.13 | | 5 | 0 |
| Pacing + VR + CR + CTR | 1.26 | | 0.59 | | 11 | 0 |

[1] Multi-KPI Results from 400 ads over 6 months on Px versus Legacy algorithm ("Leg"). VR="Viewability Rate", CR="Completion Rate", CTR="Clickthrough Rate", Demo="Demographic In-Target Rate". N=number of ads with this KPI tuple as its target. Each cell shows average lift across the KPI tuple. Empty cells mean there were no ads with this configuration.

EXAMPLE APPLICATION: VIEWABILITY

We next discuss an example which uses viewability in particular.

Ad Viewability is one of the most controversial problems to emerge in on-line advertising in recent years. Rumors of problems in online ad viewability emerged as early as 2011. At this time the Internet Advertising Bureau (IAB) placed a "watch" on the issue for further study. In May 2014, the IAB released a set of standards for viewability. The definition they developed was that an ad would be deemed viewable if (a) at least 50% of the ad was visible on-screen for (b) at least 2 seconds. For large sized ads, only 30% of the ad needed to be visible (IAB, 2014). The IAB also proposed that impressions should be at least 70% viewable on average, in order to be regarded as "measured"—a technical term the IAB uses and which ad companies are audited against, and which is generally used for billing purposes.

In November 2014, Google released a report on the viewability of publisher web sites. The results were surprising: according to the 2 second, 50% on-screen IAB definition, over half of the ads were not viewable. The average viewability based on the IAB definition was a 43.9%. Soon afterwards many other companies released similar findings. Comscore released a similar report which concluded that IAB viewability was only 46% (REF). Integral Ad Science reported average viewability of 44% in Q2 2015. Tube Mogul reported a very low number—25% for the same period.

The standard approach to this problem has been to apply a hard constraint on inventory such that only inventory with greater than 70% viewability is considered. But such an approach results in sub-optimal bidding—by considering only inventory exceeding 70%, it results in overly high KPI with very low delivery. This also has many curious side-effects: Publishers who have a viewability rate of 69% may find that they are no longer winning any traffic. The amount of inventory that is above 70% viewability and also meets the other KPI criteria may be very small.

In contrast to the standard approach, we can instead define the various KPI targets that the advertiser wants to achieve: Viewability 70%, Demographic In-Target Rate 50% and Completion rate 60% for example. We now have 4 KPIs including the advertiser's desire to also Pace. We now can apply the new control loop to this problem. Embodiments described herein create viewability predictions, and then utilize those predictions during optimization. The optimization algorithm minimizes both error on viewability, pacing, and other objectives if they have been requested by the advertiser.

What is claimed is:

1. A computer-implemented method for dynamically adjusting a campaign of content delivery to achieve a plurality of objectives of the campaign, the method comprising:
   identifying, by an ad server controlling the campaign, two or more objectives of the campaign to meet in delivering content to a plurality of users;
   measuring, by the ad server, viewability of the content delivered in association with the campaign to client devices, wherein the measuring comprises determining that the content was displayed on-screen on the client devices for at least a minimum amount of time;
   determining, by the ad server, a first error for a first objective of the two or more objectives based on a difference between (i) a first objective value of the first objective that is derived from the measured viewability and (ii) a first target value of the first objective;
   measuring, by the ad server, completion of the content delivered in association with the campaign to the client devices, wherein the measuring comprises determining that the content was played on the client devices for a duration of the content;
   determining, by the ad server, a second error for a second objective of the two or more objectives based on a difference between (i) a second objective value of the second objective that is derived from the measured completion and (ii) a second target value of the second objective;
   calculating, by the ad server, a multi-objective value, associated with the first objective and the second objective, based on (i) the first error determined using the measured viewability of the content on the client devices and (ii) the second error determined using the measured completion of the content on the client devices;
   receiving, by the ad server and via a network, a web request, for an advertisement, of a user device;
   receiving, by the ad server, query parameters of the web request for the advertisement, wherein the query parameters comprise information associated with an IP address of the user device;
   in response to the web request for the advertisement, analyzing, by the ad server, historical data;
   based on the analysis of the historical data, determining, by the ad server, a probability of one or more events by at least one of player size, browser, time of day, segments that are detected as part of a user profile of the user device, or historical browsing behavior of the user device; and based upon the determined probability and the multi-objective value determined in association with the measured viewability of the content on the client devices and the measured completion of the content on the client devices, controlling delivery, by the ad server and via the network, of the advertisement to one or more user devices including the user device.

2. The method of claim 1, wherein the two or more objectives comprise viewability and smooth delivery.

3. The method of claim 1, wherein the two or more objectives comprise viewability.

4. The method of claim 1, wherein the two or more objectives comprise smooth delivery.

5. The method of claim 1, wherein the two or more objectives comprise demographic in-target rate.

6. The method of claim 1, comprising using a weighting scheme to assign a first weighting factor to each objective of the two or more objectives.

7. The method of claim 1, wherein calculating the multi-objective value comprises combining values for each objective of the two or more objectives.

8. The method of claim 1, wherein the controlling delivery of the advertisement comprises dynamically adjusting delivery of the advertisement based upon the multi-objective value.

9. The method of claim 1, comprising:
identifying completion of the first objective; and
changing a weighting factor of the first objective.

10. The method of claim 1, comprising de-weighting the first objective responsive to determining that the first objective has been successful in reaching the first target value.

11. The method of claim 1, comprising setting at least one of the first error or the second error based on a user-defined factor.

12. An ad server comprising:
a memory; and
a processor, the processor configured to perform operations for dynamically adjusting a campaign of content delivery to achieve a plurality of objectives of the campaign, the operations comprising:
identifying two or more objectives of the campaign to meet in delivering content to a plurality of users;
measuring viewability of the content delivered in association with the campaign to client devices, wherein the measuring comprises determining that the content was displayed on-screen on the client devices for at least a minimum amount of time;
determining a first error for a first objective of the two or more objectives based on a difference between (i) a first objective value of the first objective that is derived from the measured viewability and (ii) a first target value of the first objective;
measuring completion of the content delivered in association with the campaign to the client devices, wherein the measuring comprises determining that the content was played on the client devices for a duration of the content;
determining a second error for a second objective of the two or more objectives based on a difference between (i) a second objective value of the second objective that is derived from the measured completion and (ii) a second target value of the second objective;

calculating a multi-objective value, associated with the first objective and the second objective, based on (i) the first error determined using the measured viewability of the content on the client devices and (ii) the second error determined using the measured completion of the content on the client devices;

receiving, via a network, a web request, for an advertisement, of a user device;

receiving query parameters of the web request for the advertisement, wherein the query parameters comprise information associated with an IP address of the user device;

in response to the web request for the advertisement, analyzing historical data;

based on the analysis of the historical data, determining a probability of one or more events by at least one of player size, browser, time of day, segments that are detected as part of a user profile of the user device, or historical browsing behavior of the user device; and based upon the determined probability and the multi-objective value determined in association with the measured viewability of the content on the client devices and the measured completion of the content on the client devices, controlling delivery, via the network, of the advertisement to one or more user devices including the user device.

13. The ad server of claim 12, wherein the two or more objectives comprise viewability and smooth delivery.

14. The ad server of claim 12, wherein the two or more objectives comprise viewability.

15. The ad server of claim 12, wherein the two or more objectives comprise smooth delivery.

16. The ad server of claim 12, wherein the two or more objectives comprise demographic in-target rate.

17. The ad server of claim 12, the operations comprising using a weighting scheme to assign a first weighting factor to each objective of the two or more objectives.

18. The ad server of claim 12, wherein calculating the multi-objective value comprises combining values for each objective of the two or more objectives.

19. The ad server of claim 12, wherein the controlling delivery of the advertisement comprises dynamically adjusting delivery of the advertisement based upon the multi-objective value.

20. A computer-implemented method for dynamically adjusting a campaign of content delivery to achieve a plurality of objectives of the campaign, the method comprising:
identifying, by an ad server controlling the campaign, two or more objectives of the campaign to meet in delivering content to a plurality of users;
measuring, by the ad server, viewability of the content delivered in association with the campaign to client devices, wherein the measuring comprises determining that the content was displayed on-screen on the client devices for at least a minimum amount of time;
determining, by the ad server, a first error for a first objective of the two or more objectives based on a difference between (i) a first objective value of the first objective that is derived from the measured viewability and (ii) a first target value of the first objective, wherein the first error is set based on an advertiser-defined factor;
measuring, by the ad server, completion of the content delivered in association with the campaign to the client devices, wherein the measuring comprises determining that the content was played on the client devices for a duration of the content;

determining, by the ad server, a second error for a second objective of the two or more objectives based on a difference between (i) a second objective value of the second objective that is derived from the measured completion and (ii) a second target value of the second objective, wherein the second error is set based on an advertiser-defined factor;

calculating, by the ad server, a multi-objective value, associated with the first objective and the second objective, based on (i) the first error determined using the measured viewability of the content on the client devices and (ii) the second error determined using the measured completion of the content on the client devices;

receiving, by the ad server and via a network, a web request, for an advertisement, of a user device;

receiving, by the ad server, query parameters of the web request for the advertisement, wherein the query parameters comprise information associated with an IP address of the user device;

in response to the web request for the advertisement, analyzing, by the ad server, historical data;

based on the analysis of the historical data, determining, by the ad server, a probability of one or more events by at least one of player size, browser, time of day, segments that are detected as part of a user profile of the user device, or historical browsing behavior of the user device; and based upon the determined probability and the multi-objective value determined in association with the measured viewability of the content on the client devices and the measured completion of the content on the client devices, controlling delivery, by the ad server and via the network, of the advertisement to one or more user devices including the user device.

* * * * *